(12) United States Patent
Peters et al.

(10) Patent No.: US 12,006,188 B2
(45) Date of Patent: Jun. 11, 2024

(54) BUILDING ELEMENT LIFT ENHANCER

(71) Applicant: Construction Robotics, LLC, Victor, NY (US)

(72) Inventors: Scott Lawrence Peters, Pittsford, NY (US); Andrew Walter Beckmann, West Henrietta, NY (US); Glenn Dayton White, Conesus, NY (US); Timothy Riley Voorheis, Rochester, NY (US); Kimchua Heng, Rochester, NY (US)

(73) Assignee: Construction Robotics, LLC, Victor, NY (US)

( * ) Notice: Subject to any disclaimer, the term of this patent is extended or adjusted under 35 U.S.C. 154(b) by 830 days.

(21) Appl. No.: 16/638,463

(22) PCT Filed: Aug. 18, 2018

(86) PCT No.: PCT/US2018/047005
§ 371 (c)(1),
(2) Date: Feb. 11, 2020

(87) PCT Pub. No.: WO2019/040342
PCT Pub. Date: Feb. 28, 2019

(65) Prior Publication Data
US 2020/0369494 A1 Nov. 26, 2020

Related U.S. Application Data

(60) Provisional application No. 62/548,168, filed on Aug. 21, 2017.

(51) Int. Cl.
*B66C 23/02* (2006.01)
*B66C 1/44* (2006.01)
(Continued)

(52) U.S. Cl.
CPC ............ *B66C 23/022* (2013.01); *B66C 1/442* (2013.01); *B66C 1/447* (2013.01); *B66C 13/44* (2013.01);
(Continued)

(58) Field of Classification Search
CPC ....... B66C 1/442; B66C 1/447; B66C 23/022; B66C 23/26; B66C 23/48; B66C 23/485;
(Continued)

(56) References Cited

U.S. PATENT DOCUMENTS 1,974,892 A * 9/1934 Poliakoff ................ B66C 1/442
294/63.1
4,239,274 A * 12/1980 Linberg .................. B66C 1/422
294/114
(Continued)

OTHER PUBLICATIONS

Author Unknown, Binar Handling AB Website, Oct. 23, 2022, www.binarhandling.com/en/products/manipulator-arms, Trollhattan, Sweden.
(Continued)

*Primary Examiner* — Dean J Kramer
(74) *Attorney, Agent, or Firm* — Patent Technologies, LLC; Robert D. Gunderman, Jr.

(57) ABSTRACT

A Building Element Lift Enhancer is described. The Building Element Lift Enhancer provides for the movement and precise placement of building elements such as blocks or sheet products by one worker. The Building Element Lift Enhancer senses the force applied by a user to the building element and converts that user applied force to mechanically assisted force from the Building Element Lift Enhancer, allowing the user to precisely move and handle large, heavy or bulky building elements by direct interaction with the building element.

11 Claims, 61 Drawing Sheets

(51) Int. Cl.
    *B66C 13/44*     (2006.01)
    *B66C 15/00*     (2006.01)
    *B66C 23/26*     (2006.01)
    *B66C 23/62*     (2006.01)
    *B66C 23/88*     (2006.01)
    *B66D 3/20*     (2006.01)
    *B66D 3/26*     (2006.01)
    *G05B 19/042*     (2006.01)
    *B66C 1/02*     (2006.01)
    *B66C 23/36*     (2006.01)

(52) U.S. Cl.
    CPC .............. *B66C 15/00* (2013.01); *B66C 23/26* (2013.01); *B66C 23/62* (2013.01); *B66C 23/88* (2013.01); *B66D 3/20* (2013.01); *B66D 3/26* (2013.01); *G05B 19/042* (2013.01); *B66C 1/0243* (2013.01); *B66C 23/36* (2013.01); *B66C 2700/0335* (2013.01); *B66D 2700/025* (2013.01); *G05B 2219/2667* (2013.01)

(58) Field of Classification Search
    CPC ........... B66C 23/62; B66C 23/88; B66D 3/18; G01L 5/226; G01L 5/228
    USPC ......................................................... 294/114
    See application file for complete search history.

(56) References Cited

U.S. PATENT DOCUMENTS

| | | | | |
|---|---|---|---|---|
| 4,508,233 A | * | 4/1985 | Helms | B66C 23/48 212/199 |
| 4,708,574 A | * | 11/1987 | Conboy | B66D 3/18 414/908 |
| 4,714,393 A | * | 12/1987 | Betts | E01C 19/52 414/730 |
| 4,726,729 A | * | 2/1988 | Olson | B62D 1/28 414/730 |
| 4,878,705 A | * | 11/1989 | Arnquist | B25J 15/103 901/33 |
| 5,865,426 A | | 2/1999 | Kazerooni | |
| 6,073,496 A | * | 6/2000 | Kuhn | G01G 19/14 73/862.56 |
| 6,299,139 B1 | | 10/2001 | Kazerooni | |
| 6,386,513 B1 | | 5/2002 | Kazerooni | |
| 6,622,990 B2 | | 9/2003 | Kazerooni | |
| 7,467,723 B2 | * | 12/2008 | Zaguroli, Jr. | B66D 3/18 212/331 |
| 7,559,533 B2 | | 7/2009 | Stockmaster et al. | |
| 8,496,279 B2 | * | 7/2013 | Aoki | B66C 1/34 294/82.15 |
| 9,061,868 B1 | * | 6/2015 | Paulsen | B66D 3/18 |

OTHER PUBLICATIONS

Author Unknown, Ergonomic Partners Website, Oct. 23, 2022, www.ergonomicpartners.com/bobb-concrete-block-wall-builder, Bridgeton, MO, USA.

Author Unknown, Gorbel Website, Oct. 23, 2022, www.gorbel.com/products/ergonomic-lifting, Victor, NY, USA.

\* cited by examiner

SECTION A-A

SECTION A-A

SECTION B-B

BUILDING ELEMENT LIFT ENHANCER

CROSS REFERENCE TO RELATED PATENT APPLICATIONS

This application claims priority to U.S. Patent Application Ser. No. 62/548,168 filed Aug. 21, 2017 entitled "Building Element Lift Enhancer" by Peters et al., and to International Application Number PCT/US2018/047005 filed Aug. 18, 2018, the entire disclosures of which are incorporated herein by reference in their entirety.

BACKGROUND OF THE INVENTION

1. Field of the Invention

The present invention relates generally to construction equipment, and more particularly to a Building Element Lift Enhancer for assisting with the lifting and placement of building elements such as masonry block, brick, sheet products, pipe, conduit, beams, form work and the like.

2. Description of Related Art

In the construction industry, the repetitive lifting and placement of various building units is commonplace. Building units such as concrete building elements and forms must be lifted, moved into position, and precisely placed during construction of footings, walls, and the like. Building units such as bricks, sheet products, and even pipe and metal supports and beams often must be handled by workers on a continued and repetitive basis. This repeated handling of building units causes strain and fatigue on the worker, resulting in reduced productivity and job based injuries. In addition, the repetitive handling of building units causes worker fatigue that results in less precise placement of the building unit and resulting job quality degradation.

With many larger and bulkier building units, particularly sheet products such as drywall, cement board, stone and composite sheets, and the like, handling and placement requires multiple workers and oftentimes necessitates some type of mechanical fixture or tool to facilitate the proper placement of the building unit once the building unit is carried to the tool or fixture.

What is needed is a device that both moves and places a building unit. What is also needed is a device that allows one worker to handle large, heavy and bulky building units. What is also needed is a device that moves and places a building unit that is under the direct control of the worker where movement of the building unit by the worker is assisted by the device.

BRIEF SUMMARY OF THE INVENTION

In accordance with the present invention, there is provided a building element lift enhancer having a base with a modular upright section; a building element gripper; a boom connecting the mobile base to the building element gripper; a force sensor that detects force applied to a building element by a user; and a force amplifier that converts user applied force received by the force sensor to mechanical force applied to the building element.

The foregoing paragraph has been provided by way of introduction, and is not intended to limit the scope of the invention as described by this specification, claims and the attached drawings.

BRIEF DESCRIPTION OF THE DRAWINGS

The invention will be described by reference to the following drawings, in which like numerals refer to like elements, and in which.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification, claims and drawings attached hereto.

DESCRIPTION OF THE PREFERRED EMBODIMENTS

The Building Element Lift Enhancer, as described herein, allows a worker to directly interact with a building element to control the movement and placement of that building element without the necessity of an interface. The worker moves the building element in the direction required, be it up, down, to either side, or some combination thereof. This movement is done directly with the worker contacting and moving the building element as if weight were not an issue. The Building Element Lift Enhancer senses, collects, processes and amplifies the forces applied by the worker to the building element to create a sense of ease and weightlessness. In one embodiment of the present invention, the Building Element Lift Enhancer provides lift assistance in the vertical axis, while horizontal movement is accomplished through human force and associated movement thereof. While some embodiments of the present invention also have an interface for the worker to control building element movement, the Building Element Lift Enhancer of the present invention provides for direct interaction and amplification of force applied by the worker to the building element through sensing and control, as will be further described herein.

A building element may be any component or item that is used in the construction, improvement, reconfiguration or demolition of a building or other structure. Building elements include, but are not limited to, building elements such as blocks, bricks, sheet products such as drywall, cement board or composite board, plywood, oriented strand board (OSB), as well as pipes, conduit, beams, building panels and facades, and the like. Building elements may also include tools, formwork, rebar cages, temporary support structures, and the like.

Turning now to the drawings, detailed views of the Building Element Lift Enhancer can be seen. It should be noted that the drawings and specification describe the Building Element Lift Enhancer in use with a masonry block and a sheet product as an example, and not a limitation, of the present invention. After a review of this specification and drawings, one can appreciate that the applications of the Building Element Lift Enhancer are numerous, and are not limited to the examples depicted herein.

Figure 1:
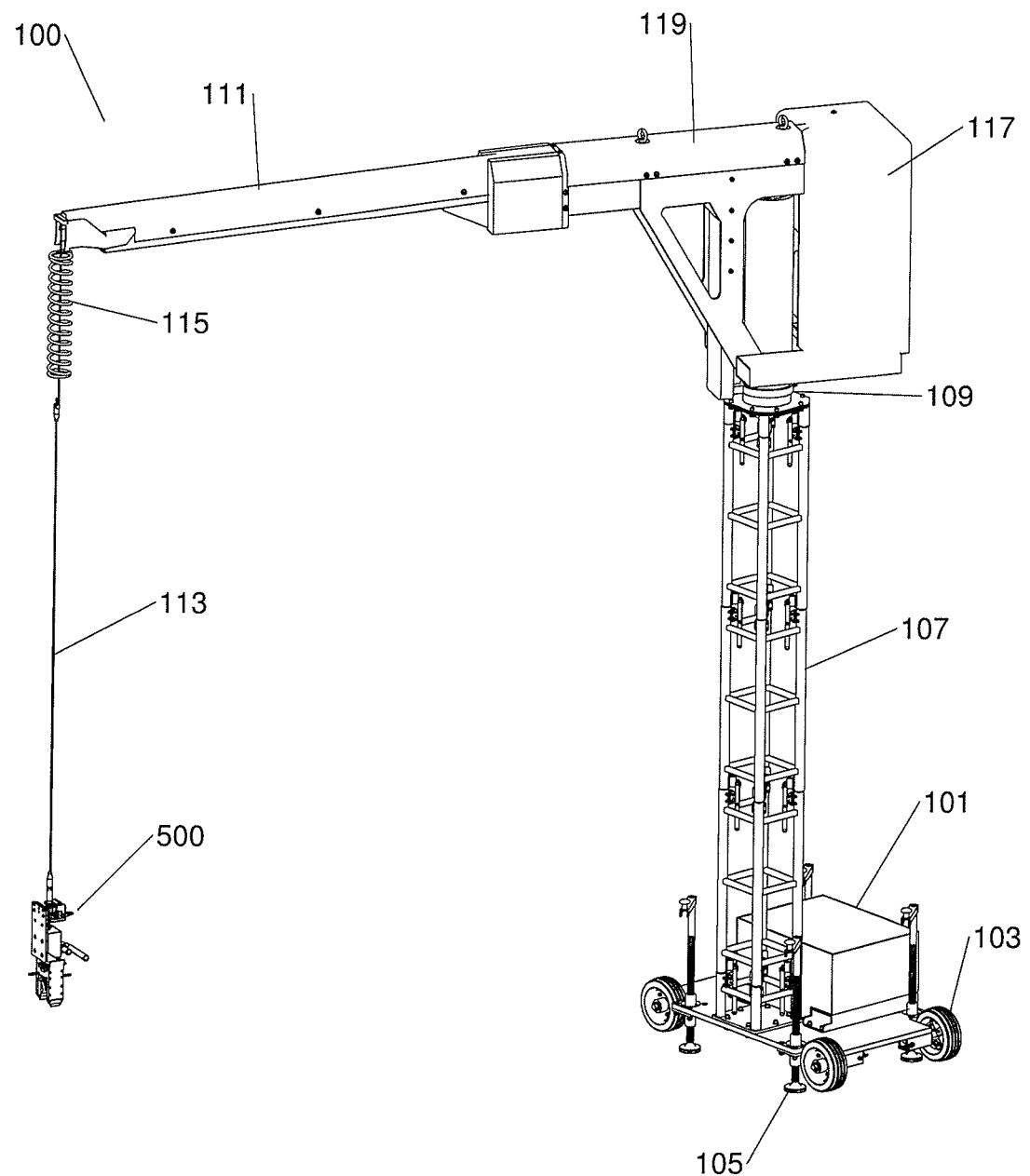
FIG. 1 is a perspective view of a building element lift enhancer.

In FIG. 1, a perspective view of a building element lift enhancer configured for building elements can be seen. The lift enhancer depicted is a cable based version. Other embodiments employ an arm based system, as further described herein. The building element lift enhancer 100 has a platform 101 such as a mobile platform, a scaffold arrangement, or the like. The mobile platform may include tires 103 and a leveler jack or jacks 105. Other platforms that include tracks, skids, or the like may also be employed. An upright section 107 such as the truss upright section 107 joins the mobile platform 101 with a boom or arm arrangement. In some embodiments the upright section 107 is modular or otherwise configurable to allow for the establishment of various heights to meet the needs of a variety of construction projects. Further, in some embodiments, the upright section 107 may be omitted or otherwise replaced. In some embodiments, for example, the platform or base is directly connected to the boom or similar horizontal element. A rotation section 109 can be seen which allows the boom or arm to swing or rotate with respect to the truss upright section 107. The rotation section 109 may include moving plates, discs, bearings, or the like. A drive housing 117 can also be seen which retains and protects a drive motor or motors, gears and drive components, compressor(s), pumps such as vacuum pumps, and related electronics. The drive housing may be weatherproof or weathertight to allow for operation and extended use in an outdoor environment. A weatherproof enclosure or cabinet, for example may be employed that has weatherproof seals, gaskets, shields, covers, or is otherwise configured to prevent the entry of water, dirt, or other contaminants. A fixed boom section 119 can be seen with a cover to house and protect the cable 113. A boom section 111 can also be seen moveably attached to the fixed boom section 119. The boom section 111 and the fixed boom section 119 act together similar to the action of a double pendulum. There is at least one joint between the boom sections, and in some embodiments there may be more than two boom sections. The cable 113 may be a braided or stranded steel, stainless steel, fiber, or rope product that terminates at a building element gripper 500. Air lines and wires are connected to the building element gripper 500 and traverse a coil arrangement 115 through the boom sections and to electronics and pneumatic equipment contained within the drive housing 117. In some embodiments of the present invention, the coil arrangement is replaced with a retractable and deployable reel arrangement or the like. Further embodiments may eliminate wires, hoses, or other such connecting structures.

The operator controls movement of the building element gripper 500 and retention, movement and placement of building elements. A drive motor (contained within the drive housing 117) moves the cable 113 to create vertical displacement of the building element being moved, while the boom section 111 provides for horizontal displacement of the building element. Movement of the building element retained by the building element gripper is controlled by the operator through interaction with either the building element directly, a force sensing device such as a handle, or simply a handle or grasp for the operator to manipulate the movement of the building element.

Figure 2:
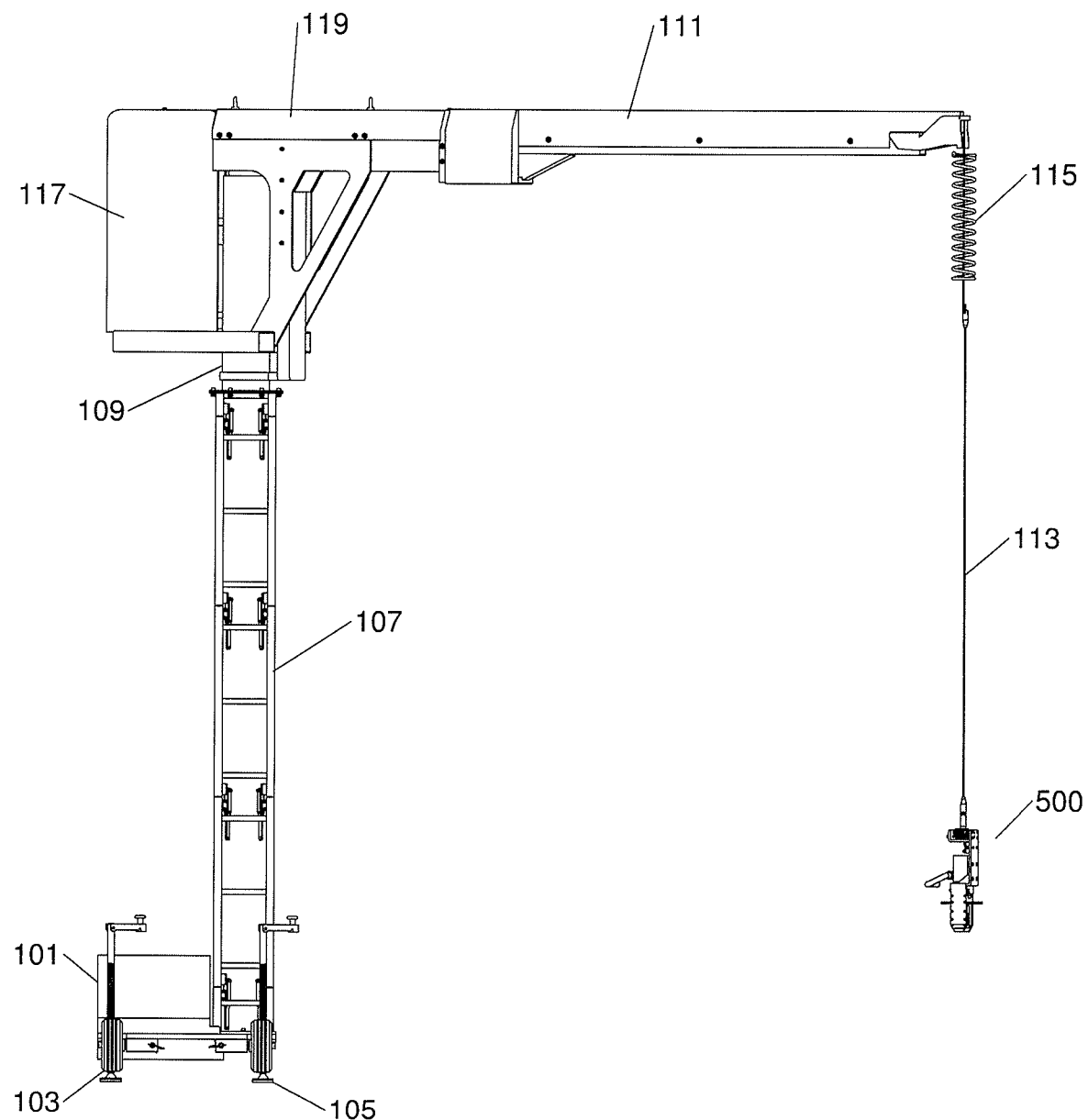
FIG. 2 is a side plan view of the building element lift enhancer of FIG. 1.

FIG. 2 is a side plan view of the building element lift enhancer of FIG. 1 that clearly shows the interconnection of the various components. It should be noted that while the upright section 107 is affixed to the mobile platform 101 at a side, the upright section 107 may also be affixed to the mobile platform 101 at a center point, off-centered, or at an alternate side. In some embodiments of the present invention, the upright section 107 may also be attached to the mobile platform 101 at an angle or even horizontally to accommodate various applications such as work under a bridge or the like.

Figure 3:
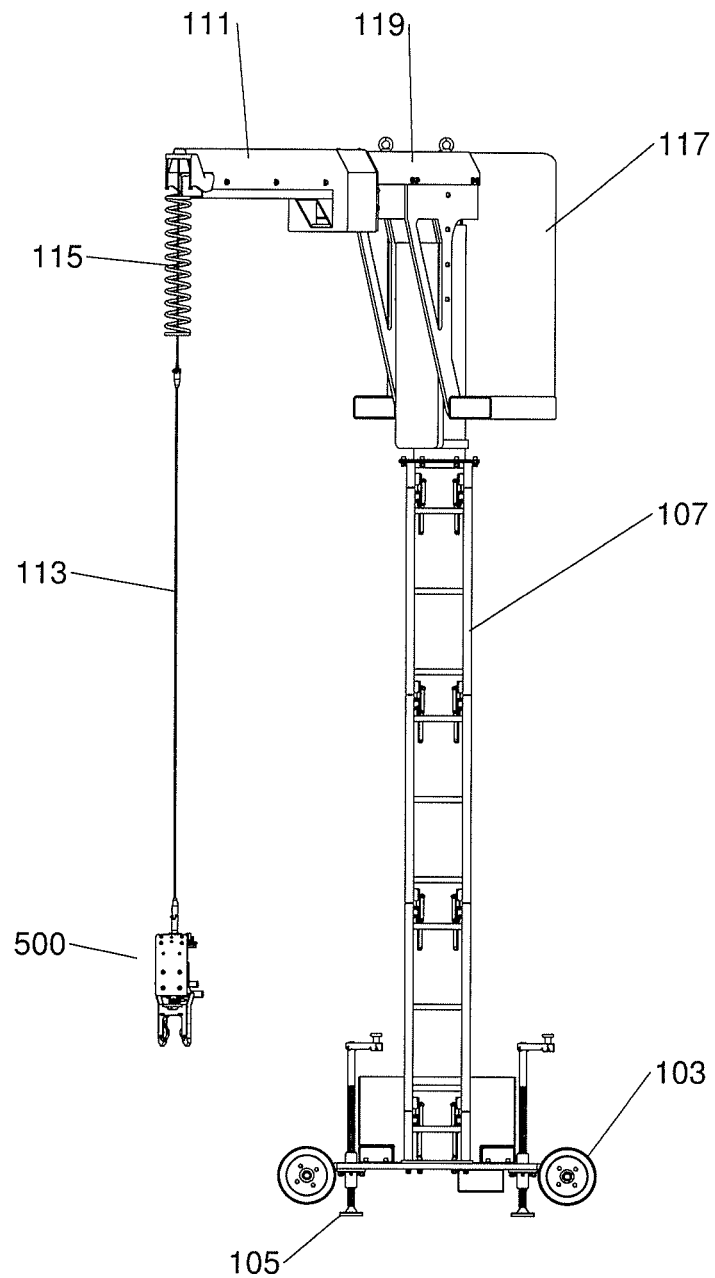
FIG. 3 is a rotated side view of the building element lift enhancer of FIG. 1.

FIG. 3 is a rotated side view of the building element lift enhancer of FIG. 1 showing the various components and their interconnectivity. Also depicted are the leveler jacks shown in a deployed or extended position.

Figure 4:
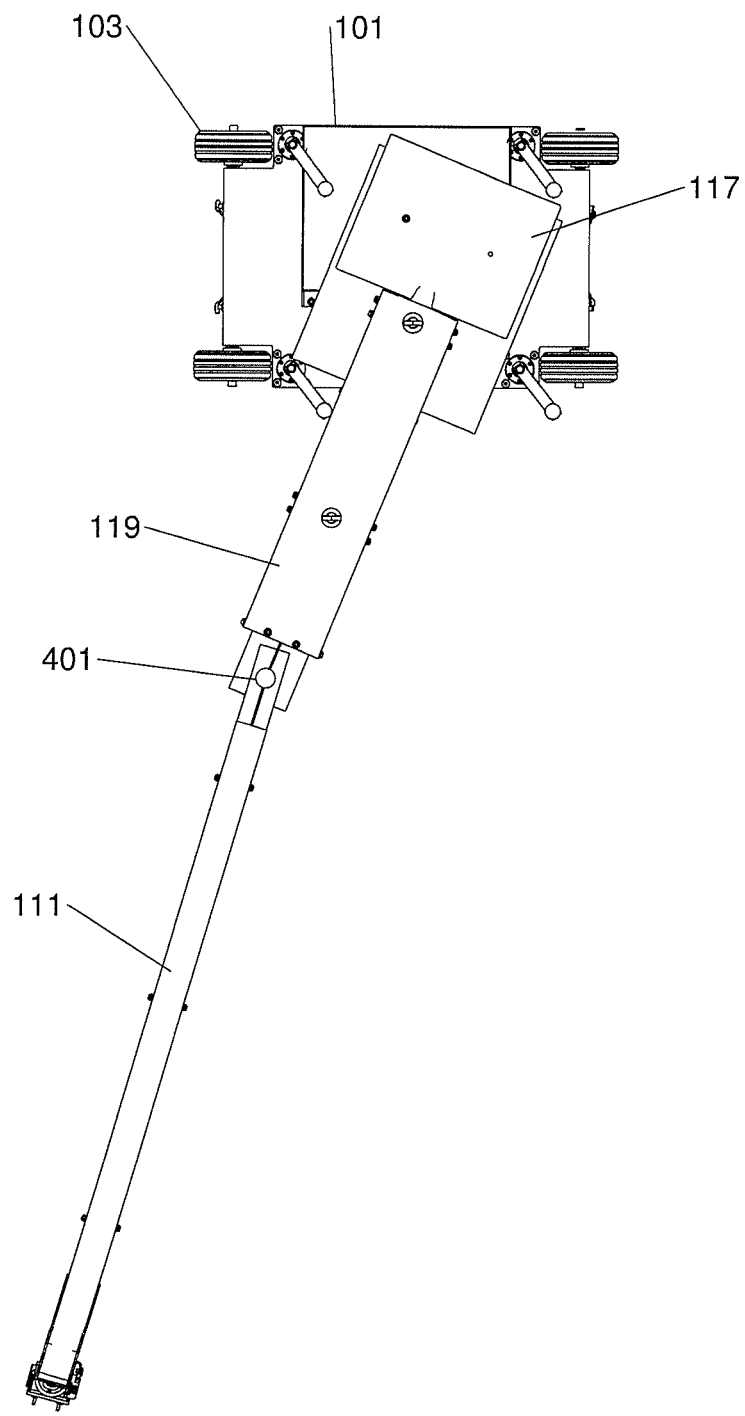
FIG. 4 is a top plan view of the building element lift enhancer of FIG. 1.

FIG. 4 is a top plan view of the building element lift enhancer of FIG. 1. In FIG. 4, the cover between the boom section 111 and the fixed boom section 119 has been removed to show the hinge joint 401 which allows rotational movement of the boom section 111.

FIGS. 5-14 show a building element gripper in accordance with one embodiment. The building element gripper depicted retains and secures building elements by interaction with and retention of the webbing element of a concrete block or similar building element.

Figure 5:
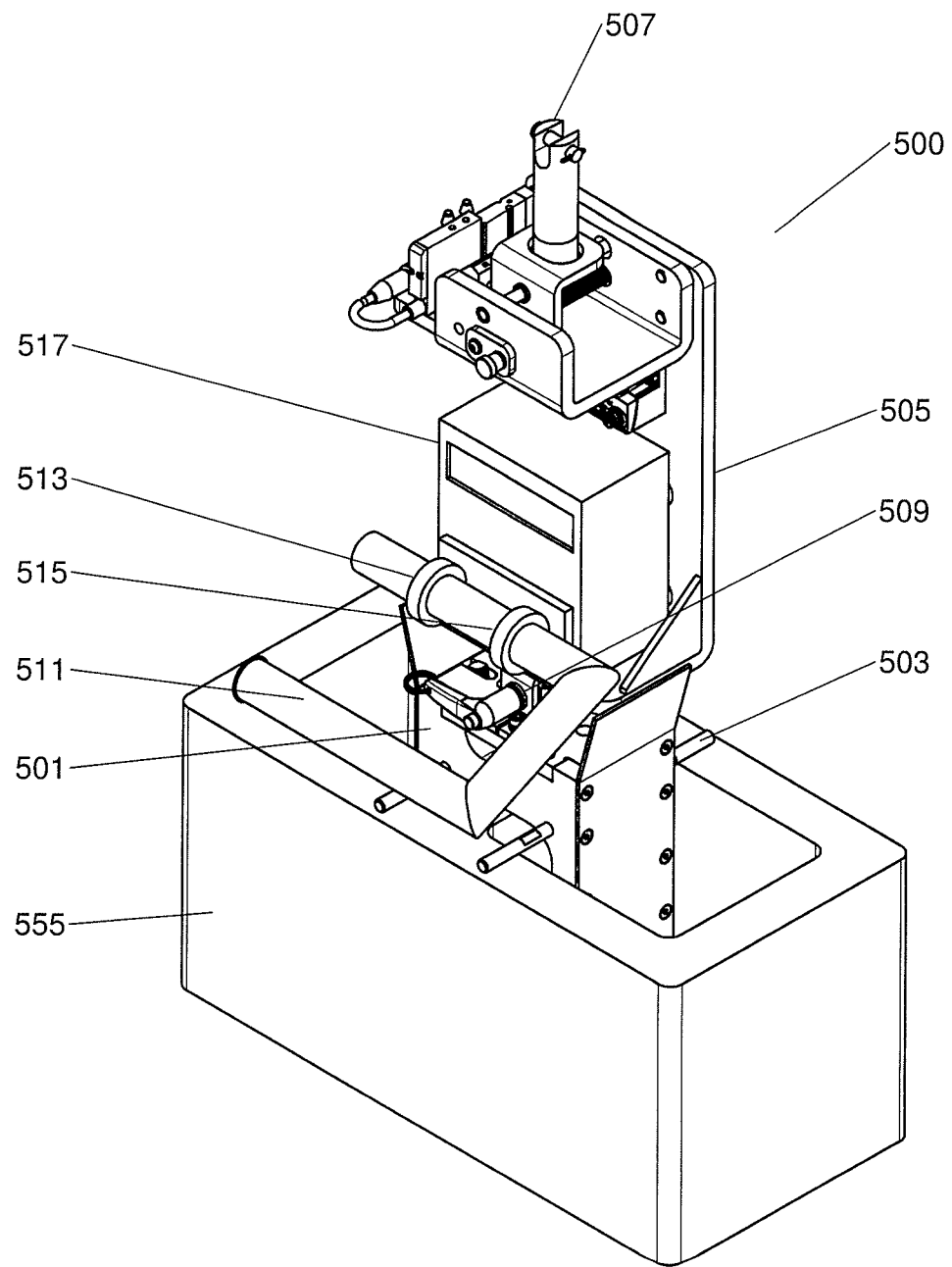
FIG. 5 is a perspective view of a building element gripper.

FIG. 5 is a perspective view of a building element gripper. The building element gripper 500 that can be seen provides for grasping, retention, movement and release of a building element through either direct user interaction with the building element or interaction with the force sensing handle 511.

A bifurcated appendage 501 can be seen straddling a building element 555 and in turn providing a cam based platform to interact with a building element feature such as the center webbing of the block that is shown in FIG. 5. Pins 503 can also be seen attached to the bifurcated appendage 501 that provide a stop and level arrangement for the overall building element gripper as it is lowered onto a building element. The pins 503 may be rounded, squared, or have other geometric attributes to facilitate leveling and balance during grasping. The pins 503 may also be threaded or otherwise featured to allow for removal and replacement with new pins or pins with differing geometries to accomplish a specific task. In some embodiments of the present invention, the pins may not be necessary or may not contact the building element. An end effector body 505 can also be seen to provide attachment and structure to the overall building element gripper 500. To secure the building element gripper to a cable or arm in the overall system described and depicted herein, an attachment joint 507 can be seen. The attachment joint may have a pin or similar device to facilitate removal and reattachment. The attachment joint 507 also may have a changeable center of mass to facilitate proper balance and movement of the gripped building element 555. Such an arrangement can be seen in FIG. 5 below the attachment joint 507.

To provide for necessary movement of the building element gripper 500, a universal joint 509 or similar arrangement can be used. A control box 517 can also be seen that contains the electronics to sense the application of force applied by a user on the building element and amplify the user applied force to move the building element 555 by way of the motor or motors that are contained within the overall building element lift enhancer 100. In some embodiments of the present invention, the electronics may be distributed throughout the system or may be located in several locations. The sensing of force applied by a user to the building element 555 and subsequent response of the system allows for direct interaction of the user with the building element 555, negating the need for a control panel or other form of intermediary user interface. Essentially, the user moves the building element at will, with the overall system responding by reducing the weight of the building element such that there is little user effort required to lift, move and place the building element during a construction operation.

Alternatively, a force sensing handle 511 can be seen that allows a user to move the force sensing handle to facilitate motion of the gripped building element 555. The force sensing handle 511 can be configured in a variety of geometries, such as the u shaped arrangement depicted in FIG. 5. A first force ring 513 and a second force ring 515 retain the force sensing handle 511 to the control box 517 or similar attachment point. Load cells, strain gauges, piezoelectric devices, or similar force sensors are contained with the force ring and handle arrangement such that when force is applied by the user to the force sensing handle, a change of resistance, change of current, change of voltage, or similar variable occurs and can be used by the control electronics of the system to determine how much force assistance or lift assistance to apply to the gripped building element. The force sensing rings thus transmit handle force to the force sensors.

Force sensors may also include electric motor current sensors as well as load cells, strain gauges, piezoelectric devices or similar devices that may sense force on the load cable without the need for the force ring and force sensing handle arrangement. In both instances, a force amplifier or other such arrangement converts user applied force received by the force sensor to mechanical force applied to the building element.

Figure 6:
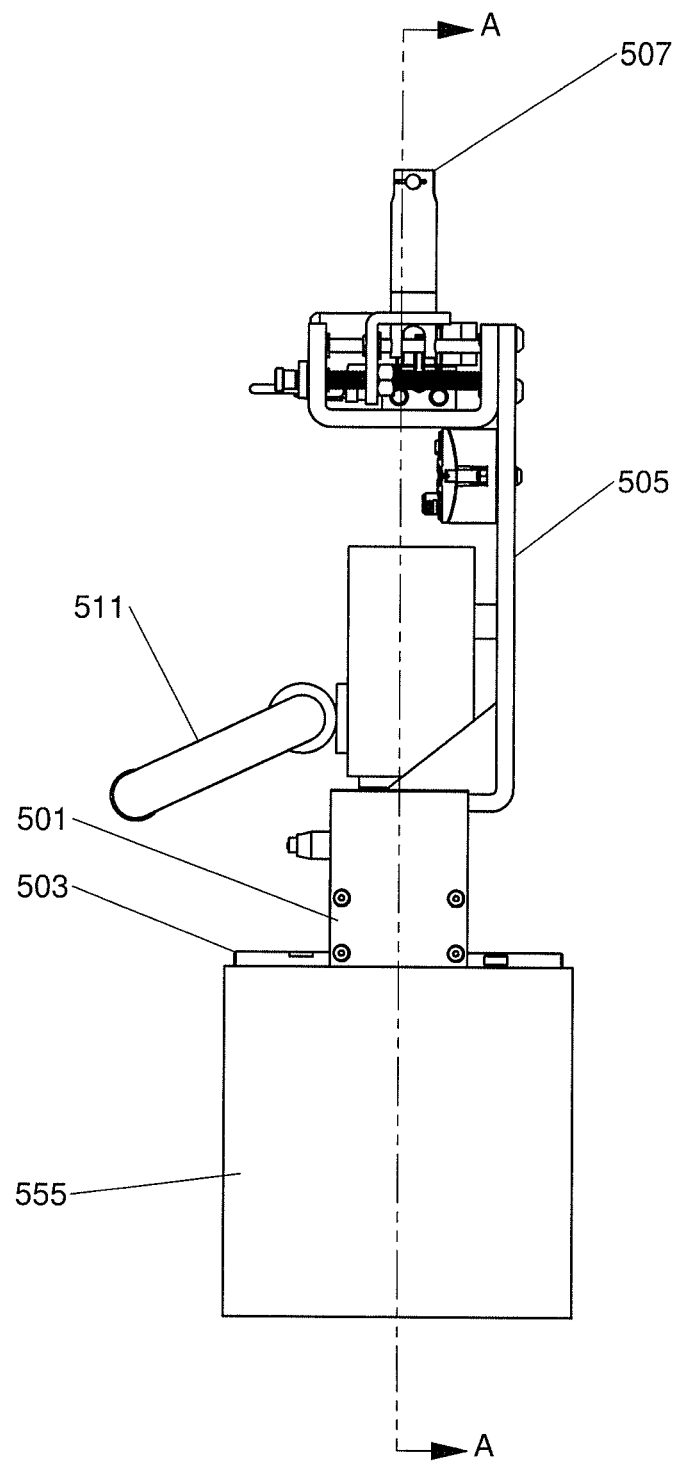
FIG. 6 is a side plan view of the building element gripper of FIG. 5.

FIG. 6 is a side plan view of the building element gripper of FIG. 5 that more clearly shows the force sensing handle 511 as well as a building element under retention by the building element gripper. In some embodiments of the present invention, a passive handle is employed.

Figure 7:
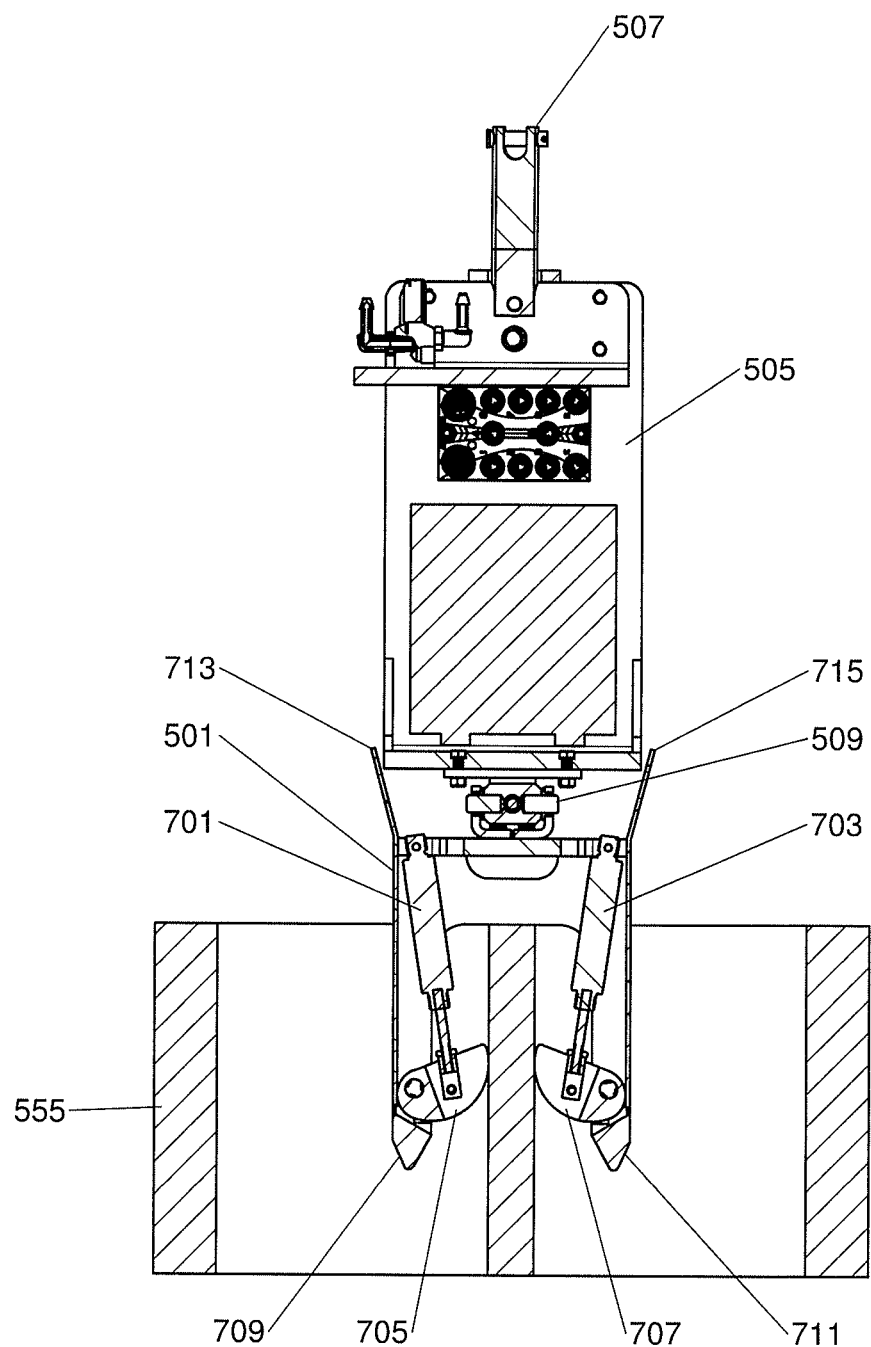
FIG. 7 is a cutaway view of the building element gripper taken along line A-A of FIG. 6 in an engaged position.

FIG. 7 is a cutaway view of the building element gripper taken along line A-A of FIG. 6 in an engaged position showing a building element under retention and the mechanism by which the building element is retained and subsequently released. In the embodiment depicted in FIG. 7, a first pneumatic actuator 701 and a second pneumatic actuator 703 can be seen, each mechanically coupled to a safety cam such as the first safety cam 705 and the second safety cam 707. The shape of the safety cams provides for secure retention of the building element 555. The webbing or center wall of the building element 555 is in this case secured by the cams with the pneumatic actuators in an extended position. In some embodiments of the present invention, the pneumatic actuators are pressurized in both the extended and the retracted positions. With the shape of the safety cams as depicted in FIG. 7, a loss of air pressure to the pneumatic actuators will not cause the building element to be released and fall. The safety cams further engage and direct force to the webbing or center wall through the weight of the building element acting on the cam structure, providing for a very important safety feature. Additionally, springs or friction enhancing failsafes may be incorporated into the pneumatic actuator and safety cam arrangement to provide further assurance that the building element will continue to be retained in the event of a loss of air pressure. In some embodiments of the present invention, other forms of cam actuation may be employed, such as electromechanical actuation with solenoids or the like.

To ensure that the building element gripper 500 properly straddles the webbing or center wall of the building element when grasping the building element, a first guide tip 709 and a second guide tip 711 can be seen at the end of each branch or fork of the bifurcated appendage 501. The guide tips may be removable and replaceable and may be made from a material such as a metal, hard durometer plastic, a plastic or polymer, or the like. The guide tips have angled faces to allow the bifurcated appendage 501 to easily straddle or encompass the webbing center wall of the building element 555. Optionally, but in many embodiments importantly, a first re-bar deflector 713 and a second re-bar deflector 715 may be installed or integrated with the building element gripper to prevent re-bars or other reinforcing material from hanging up the building element gripper 500 during operation. The re-bar deflectors comprise a mechanical structure that prevents building components such as re-bars, wire, rods, or the like from damaging, fouling or hanging up the gripper. Re-bars are commonly used to provide structural integrity and reinforcement between building elements, and often protrude through the openings in a block or other such building element during construction, creating the potential for unwanted and problematic interference with the building element gripper 500 during placement of a building element on a wall or similar structure under construction. The re-bar deflectors may be made from a metal and may be fabricated as a plate or sheet with an angle to deflect or otherwise move the building element gripper when it encounters a re-bar or other reinforcing element, preventing hang up or damage to the building element gripper.

Figure 8:
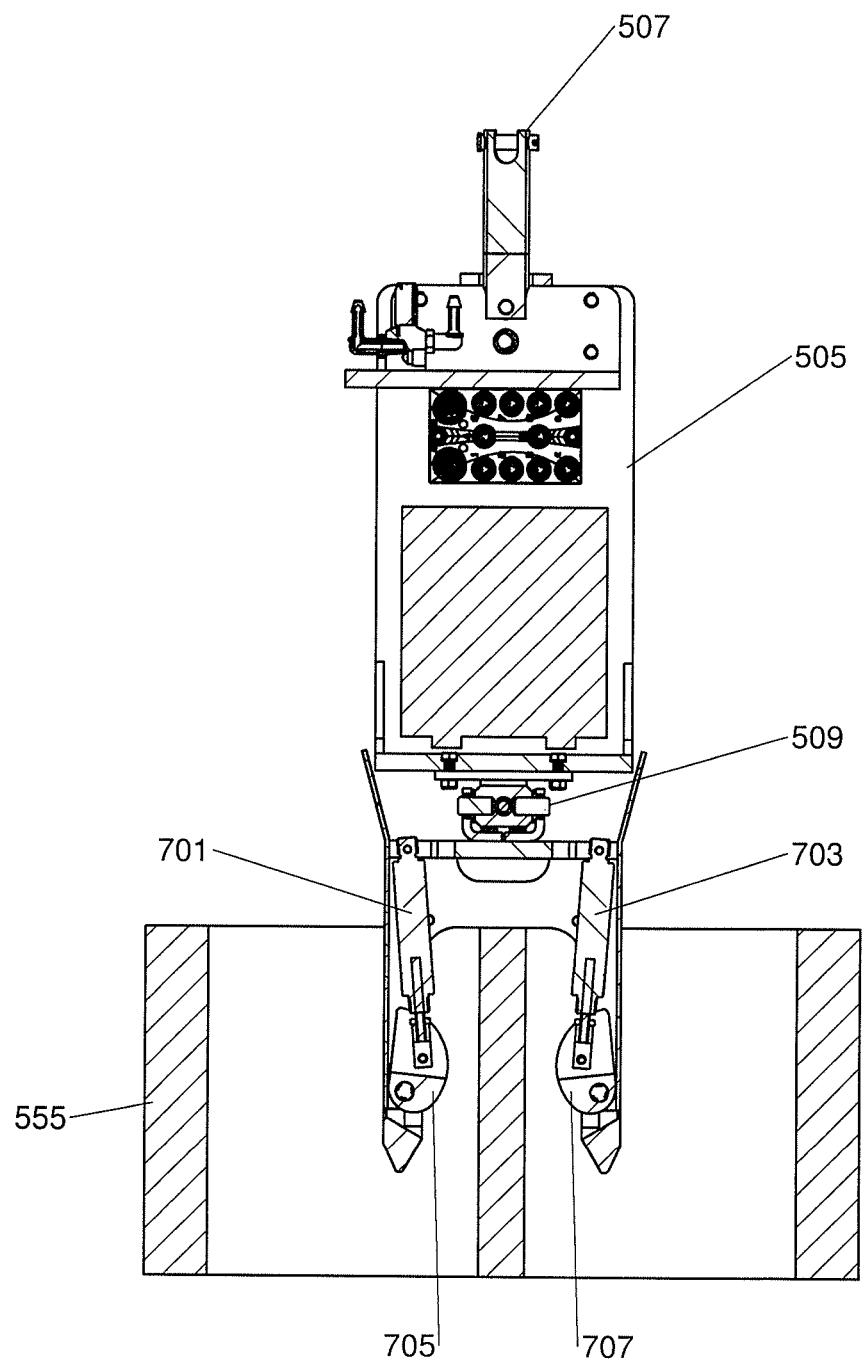
FIG. 8 is a cutaway view of the building element gripper taken along line A-A of FIG. 6 in a released position.

FIG. 8 is a cutaway view of the building element gripper taken along line A-A of FIG. 6 in a released position either ready to grasp a building element or after placement of the building element and release thereof.

Figure 9:
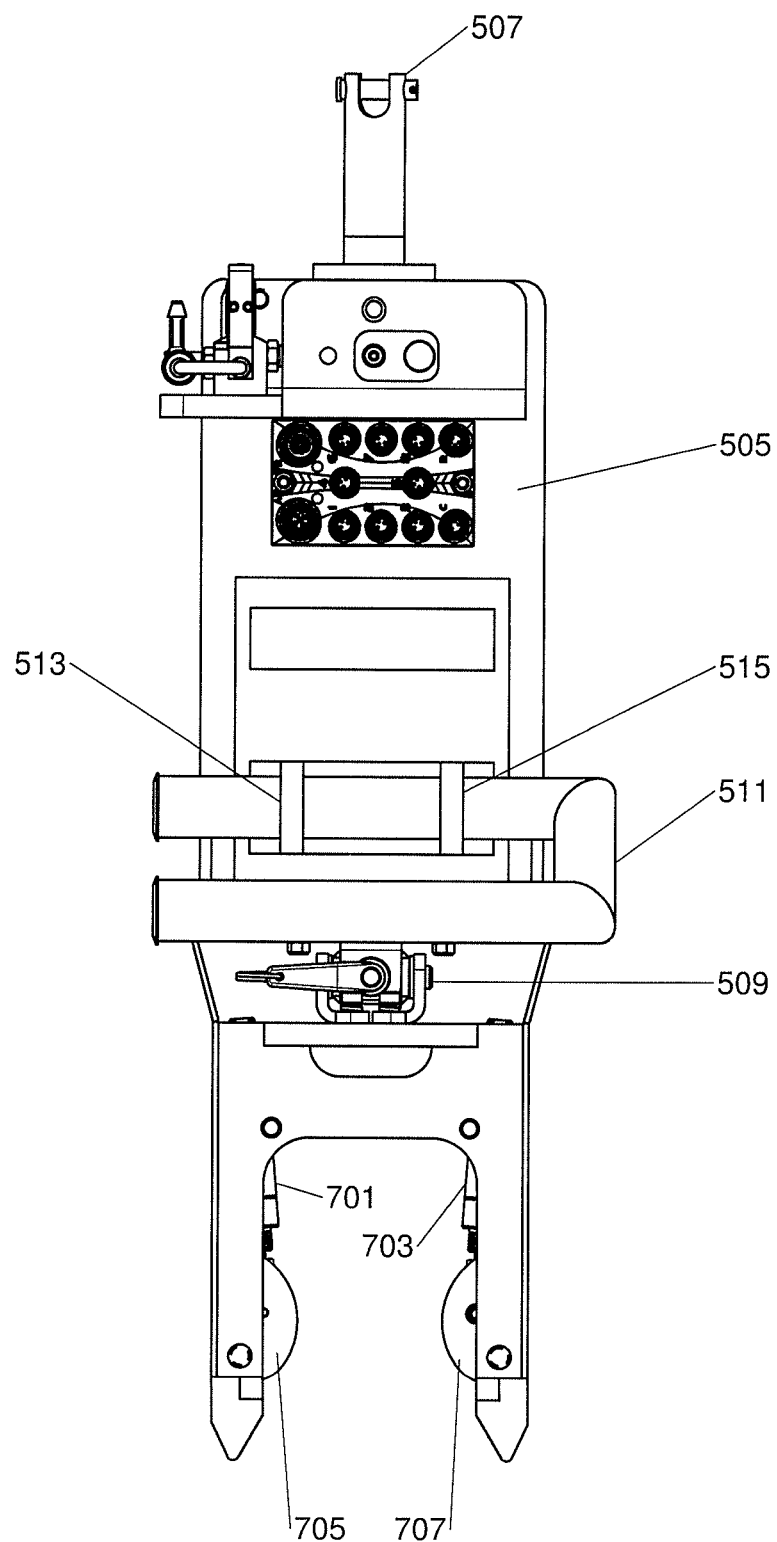
FIG. 9 is a side plan view of the building element gripper in the released position.
Figure 10:
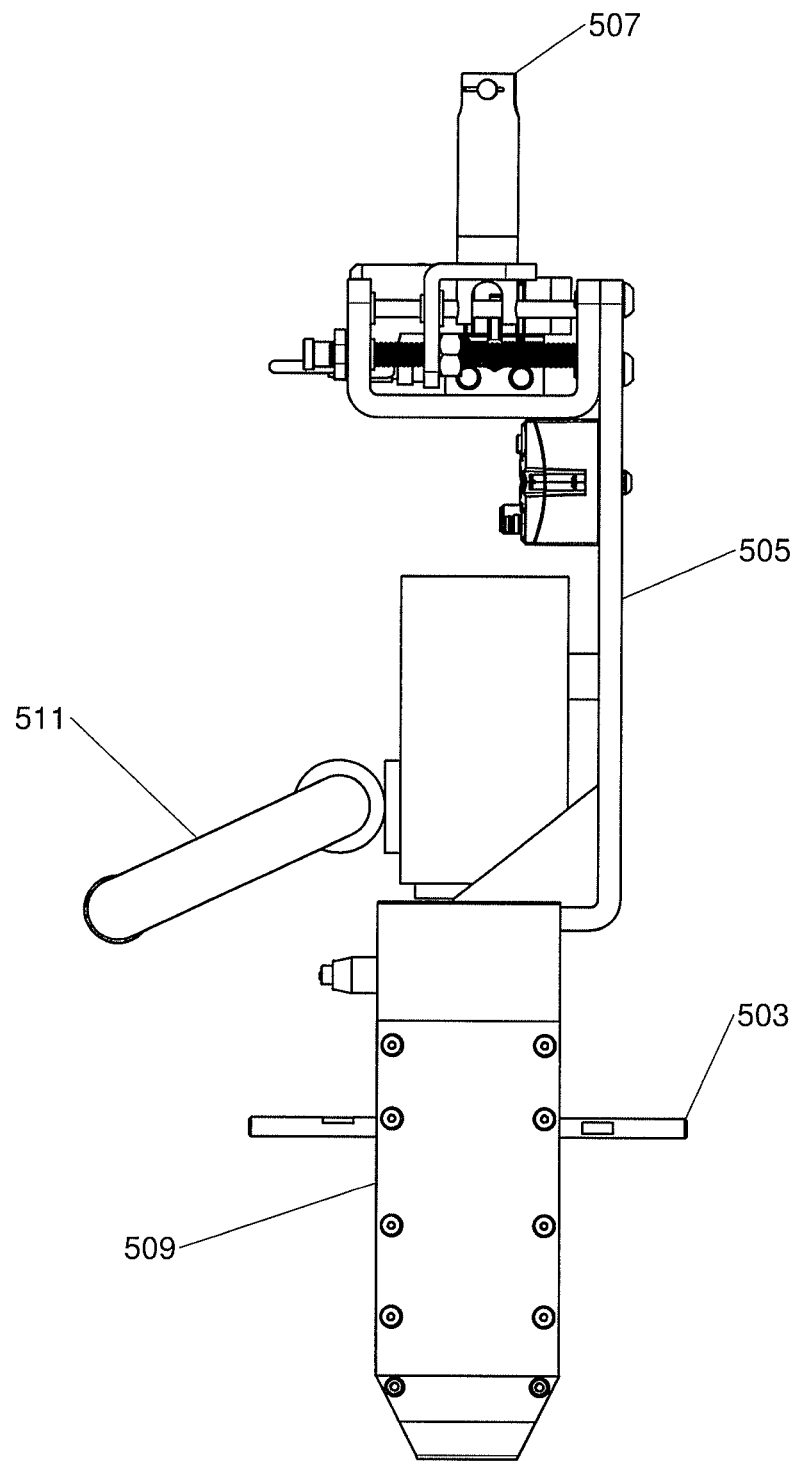
FIG. 10 is a rotated side plan view of the building element gripper.
Figure 11:
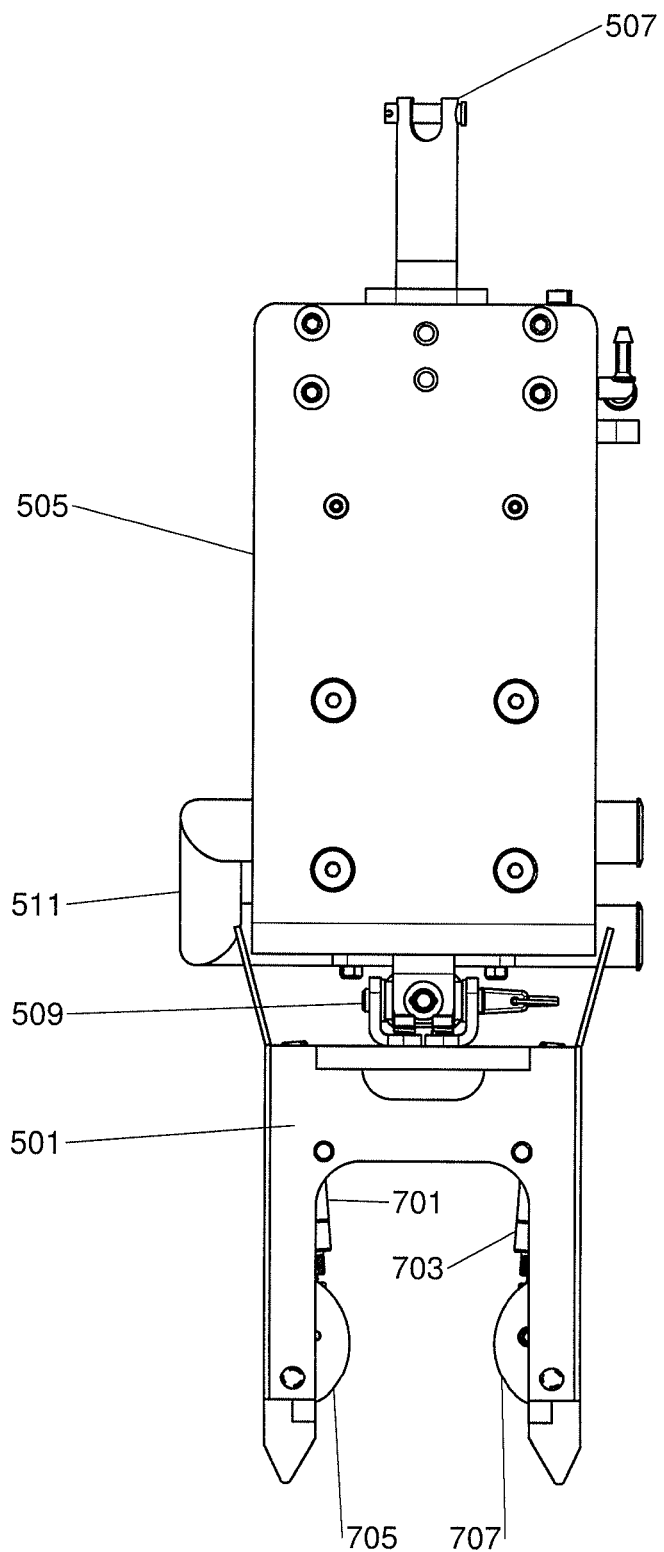
FIG. 11 is a further rotated side plan view of the building element gripper.
Figure 12:
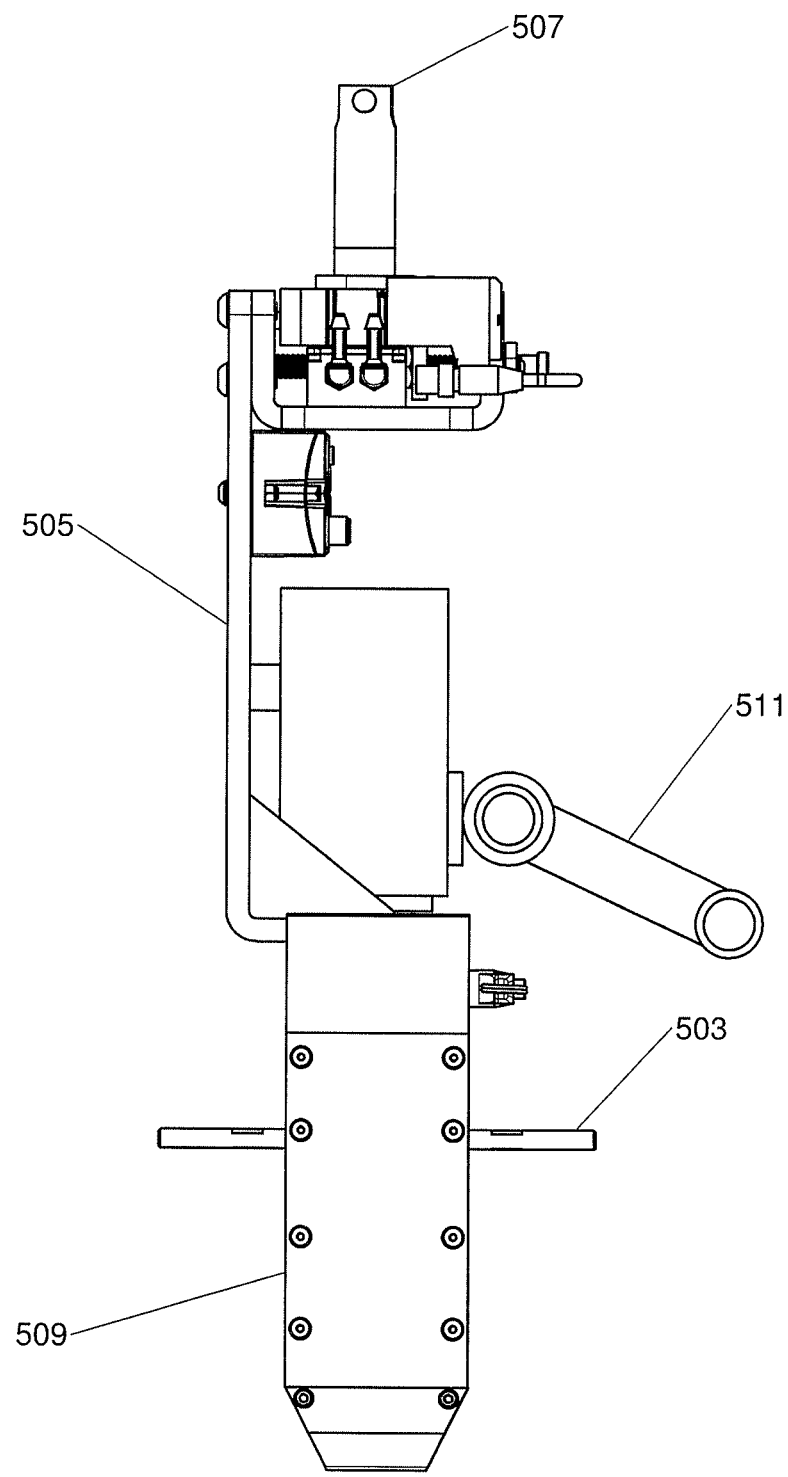
FIG. 12 is another rotated side plan view of the building element gripper.
Figure 13:
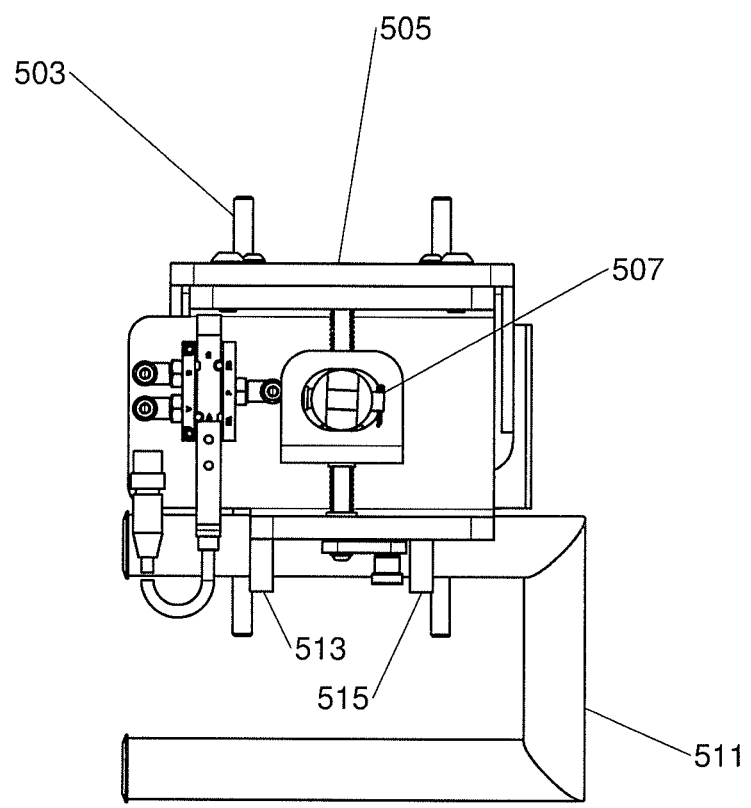
FIG. 13 is a top plan view of the building element gripper.
Figure 14:
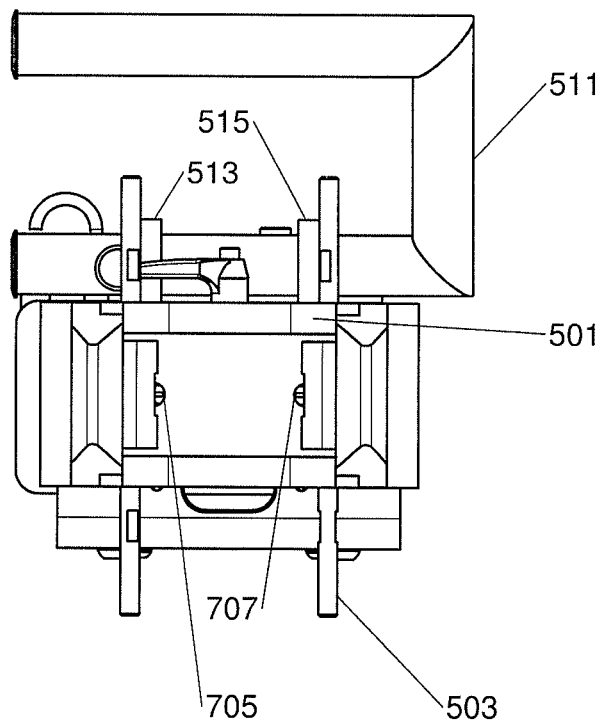
FIG. 14 is a bottom plan view of the building element gripper.

FIG. 9 is a side plan view of the building element gripper in the released position and FIG. 10 is a rotated side plan view of the building element gripper. FIG. 11 is a further rotated side plan view of the building element gripper. FIG. 12 is another rotated side plan view of the building element gripper that clearly shows the force sensing handle 511 and level pins 503. FIG. 13 is a top plan view of the building element gripper and FIG. 14 is a bottom plan view of the building element gripper.

Figure 15:
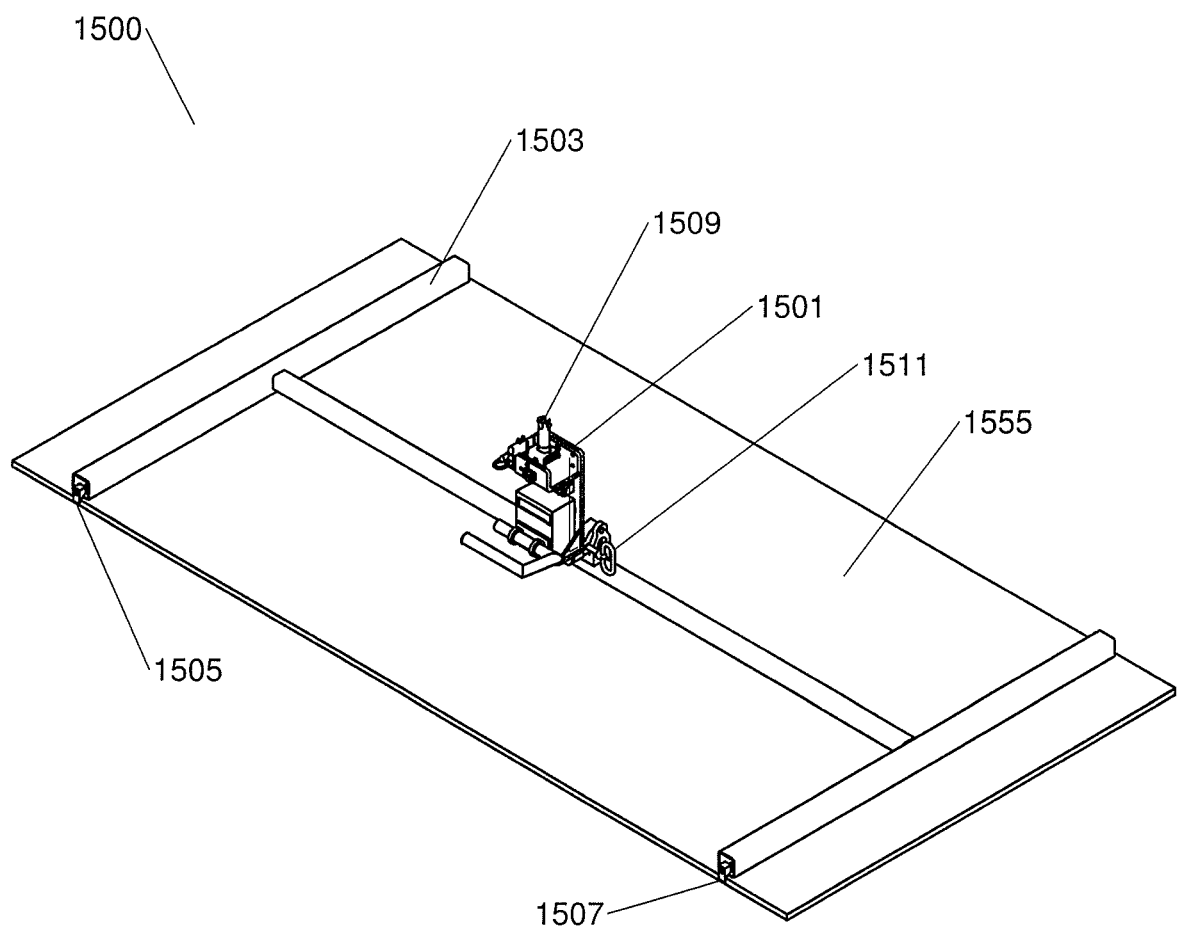
FIG. 15 is a perspective view of a sheet retainer.

In addition to a building element gripper, the Building Unit Lift Enhancer of the present invention also incorporates a detachable sheet retainer such as that depicted in FIGS. 15-22. FIG. 15 is a perspective view of a sheet retainer that depicts a sheet retainer end effector body 1501 with similar components to that of the building element gripper previously described. An H fixture 1503, preferably made from a metal such as steel, aluminum or the like, can be seen retaining a sheet product 1555 such as drywall, plywood, OSB, cement or concrete board, natural or manmade stone, or the like. Additionally, concrete forms, tools and other objects can be retained. In the embodiment depicted, retention tabs 1505 and 1507 can be seen that removably secure the sheet product 1555 to the H fixture 1503. Retention tabs on the opposing arms of the H fixture 1503 are also present, but cannot be seen in the view depicted. A sheet retainer attachment joint 1509 can be seen to facilitate attachment of the sheet retainer 1500 to an extension arm, platform, cable, or the like.

It is important to note that the sheet retainer 1500 and the various embodiments described and depicted herein has pins, brackets, fixturing and hardware to allow the user to change the center of gravity and balance points of the sheet retainer 1500, thus facilitating ease of use. The sheet retainer 1500 can change orientation of the retained sheet product 1555 from horizontal to vertical, from vertical to horizontal, and angles in between those positions. This allows for ease of pickup and placement of the sheet product 1555. Proper balance is important for ease of use and transition, and optionally springs may be incorporated to facilitate change of orientation, placement, retention of position, and the like.

Figure 16:
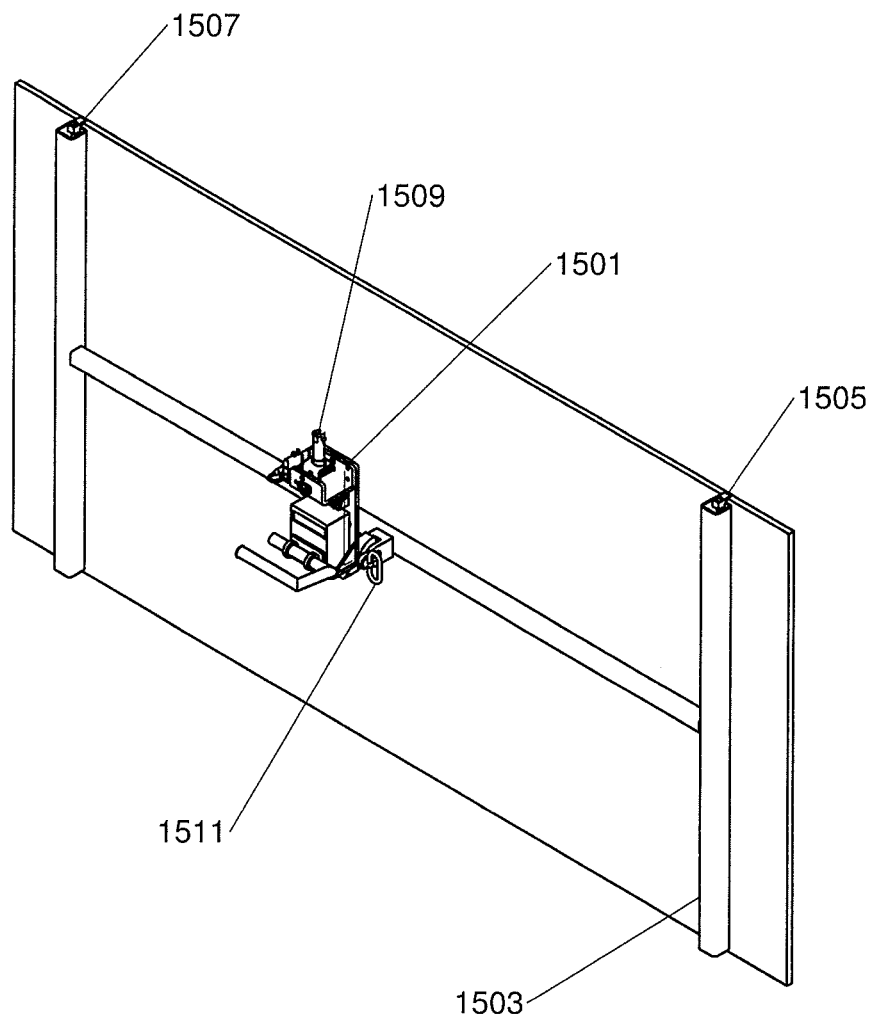
FIG. 16 is a perspective view of the sheet retainer with the retained panel in a vertical position.
Figure 17:
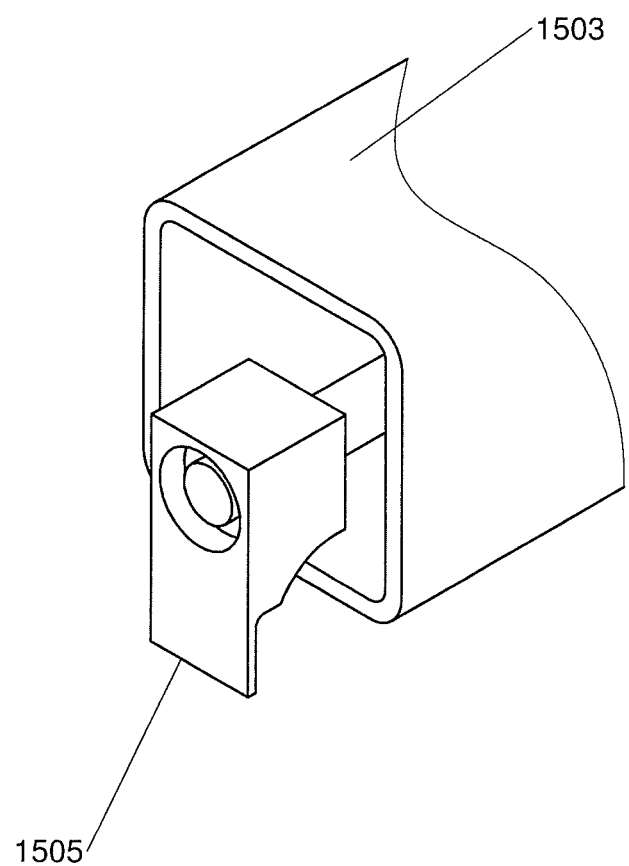
FIG. 17 is a close up perspective view of a retention tab of the sheet retainer depicted in FIG. 15 in a retention position.

FIG. 16 is a perspective view of the sheet retainer with the retained panel in a vertical position FIG. 17 is a close up perspective view of a retention tab of the sheet retainer depicted in FIG. 15 in a retention position showing the retention tab 1505 rotated to engage a sheet product (not shown in FIG. 17, see FIGS. 15 and 16). The retention tab 1505 is mechanically coupled to the H fixture 1503 by a rod, screw, pin or the like that is in turn hingeably or rotationally coupled to the retention tab 1505. The retention tab 1505 may have a bevel, step, or other transition to facilitate secure retention of a sheet product to the H fixture 1503.

Figure 18:
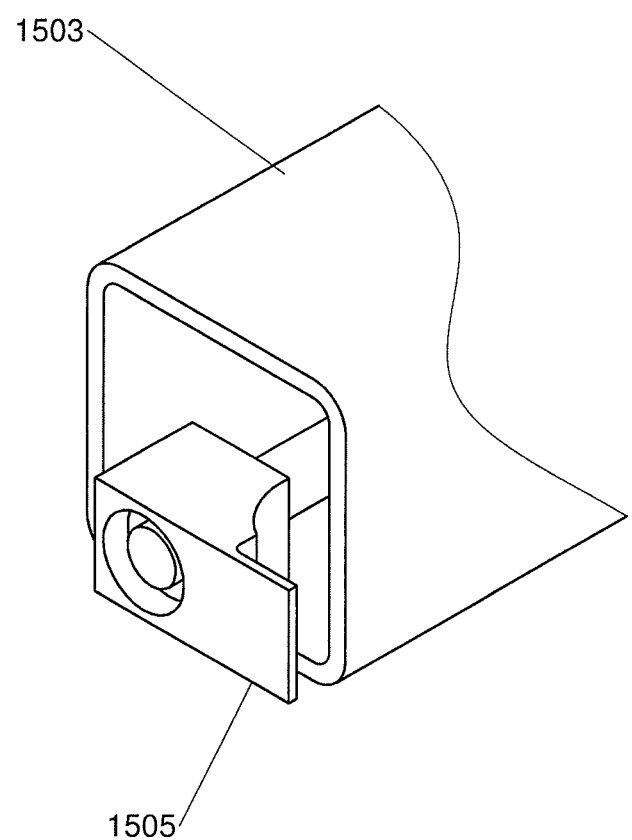
FIG. 18 is a close up perspective view of a retention tab of the sheet retainer depicted in FIG. 15 in a release position.

FIG. 18 is a close up perspective view of a retention tab of the sheet retainer depicted in FIG. 15 in a release position where the retention tab 1505 has been rotated 90 degrees from the retention position. The retention tab may not always be necessary, or may be configured in such a way that it provides an expansion gap between installed sheet products that can also vary based on the profile thickness of the retention tab. In some embodiments of the present invention, the retention tabs may displace in a linear manner.

Figure 19:
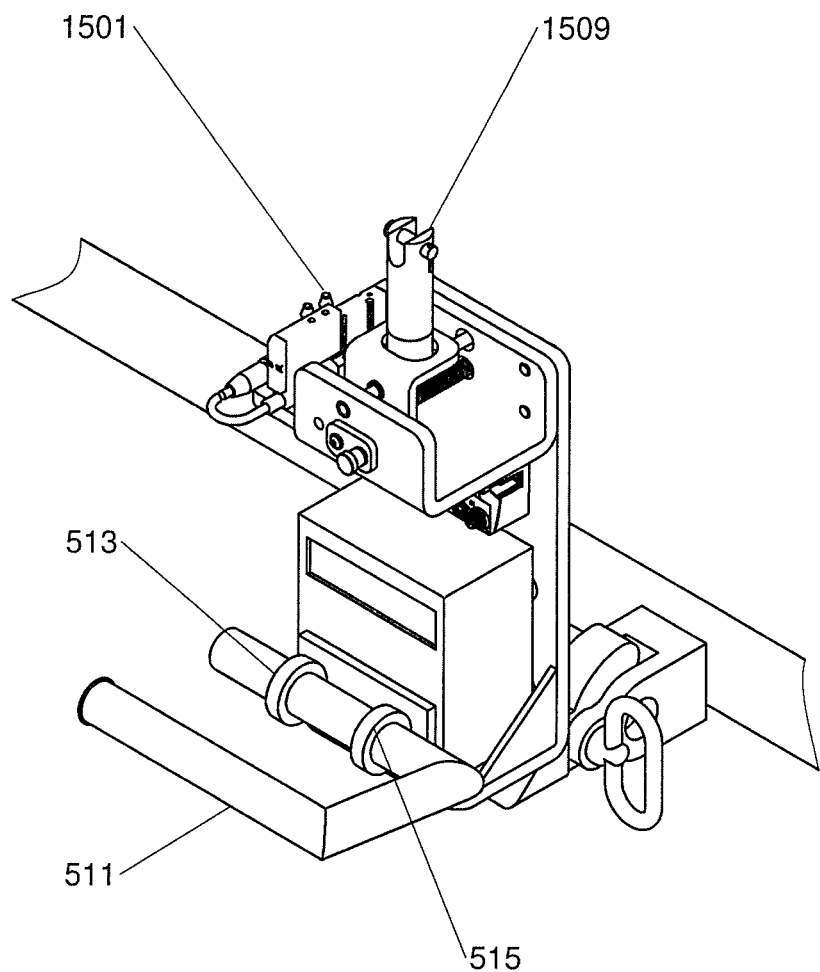
FIG. 19 is a close up perspective view of the sheet retainer end effector body.

FIG. 19 is a close up perspective view of the sheet retainer end effector body 1501 showing the force sensing handle 511 and associated force rings 513 and 515. The H fixture has been cut away for clarity in FIG. 19.

Figure 20:
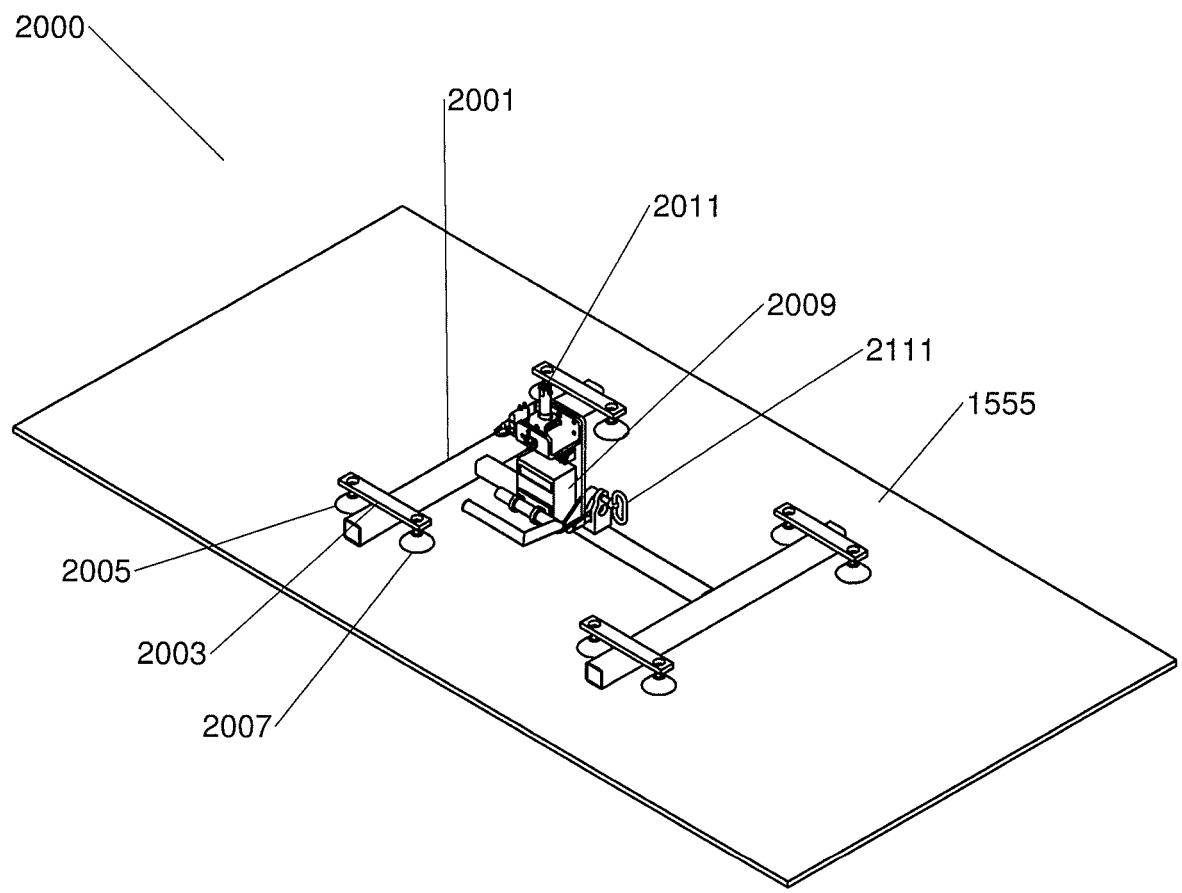
FIG. 20 is a perspective view of a vacuum sheet retainer in use.

FIG. 20 is a perspective view of a vacuum sheet retainer 2000 in use grasping and retaining a sheet product 1555 with vacuum cups 2005 and 2007 located on each of the four appendages of the vacuum H fixture 2001. A vacuum bracket 2003 connects the vacuum cups on each appendage and may also serve as a conduit for vacuum, or otherwise contain vacuum lines from a vacuum pump (not shown) to each of the vacuum cups. A vacuum sheet retainer end effector body 2009 which employs similar components to the previous end effectors described and depicted herein, can also be seen. A vacuum sheet retainer attachment joint 2011 can also be seen to facilitate attachment of the vacuum sheet retainer 2000 to an extension arm or platform.

Figure 21:
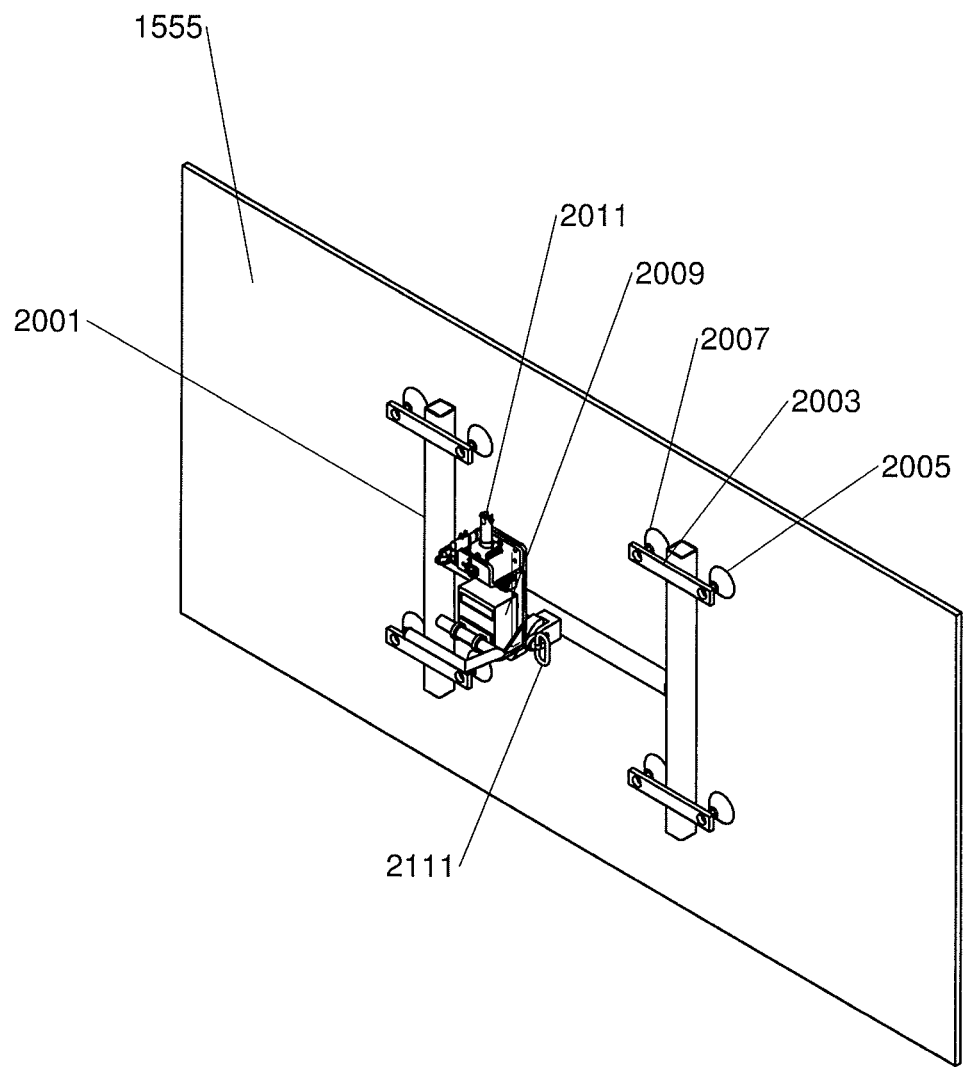
FIG. 21 is a perspective view of the vacuum sheet retainer of FIG. 20 with the retained sheet in a vertical position.
Figure 22:
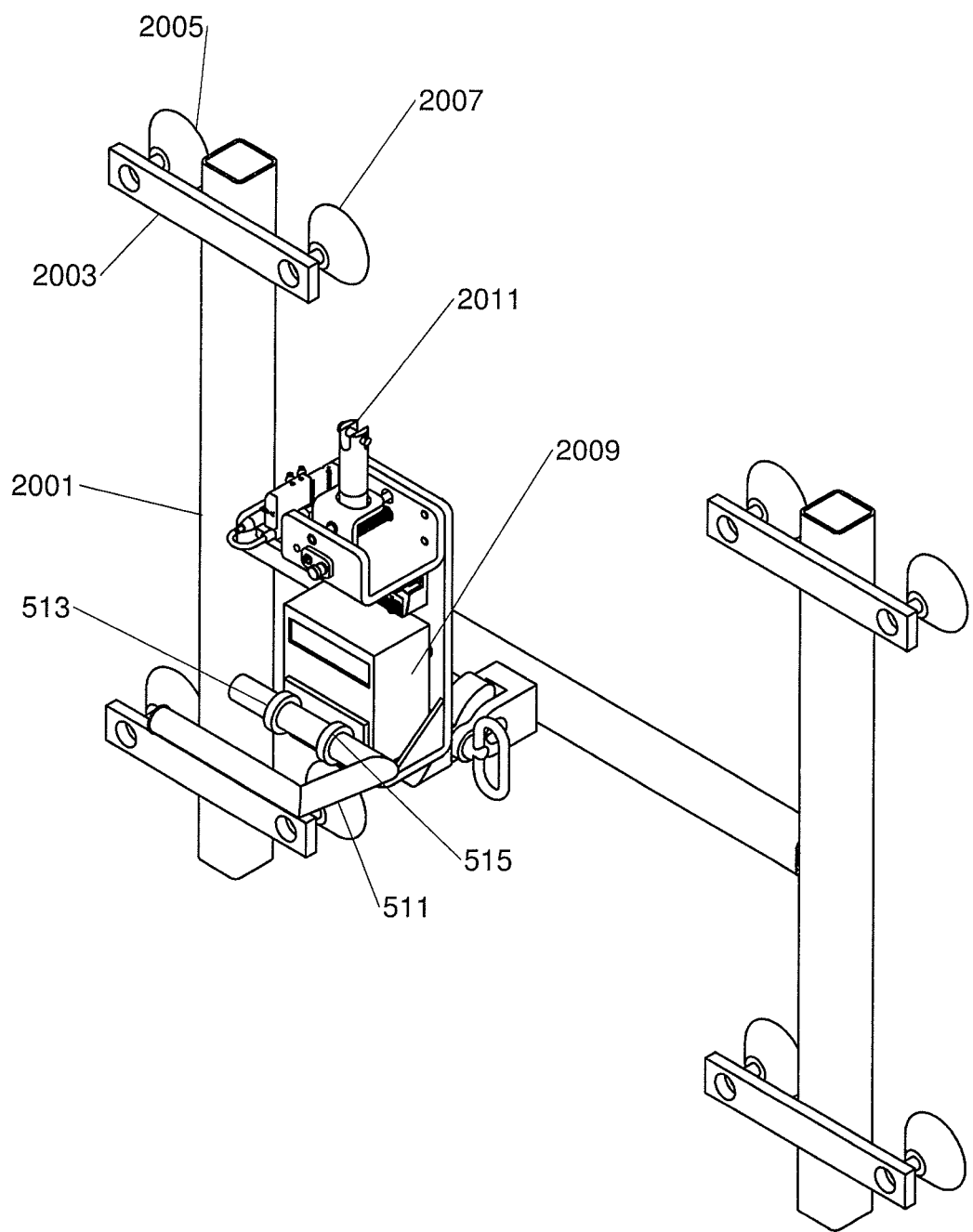
FIG. 22 is a perspective view of the vacuum sheet retainer of FIG. 20.

FIG. 21 is a perspective view of the vacuum sheet retainer of FIG. 20 with the retained panel in a vertical position. For clarity, an extension arm or platform is not depicted. FIG. 22 is a perspective view of the vacuum sheet retainer of FIG. 20 that shows the various components in detail. It should be noted that vacuum lines cannot be seen, but a vacuum conduit, plenum or line is required for operation of each vacuum cup, and may be contained by the vacuum brackets 2003 and H fixture 2001 so as not to be visible, and to provide protection of the line, plenum or conduit from mechanical abuse during operation of the system.

Figure 23:
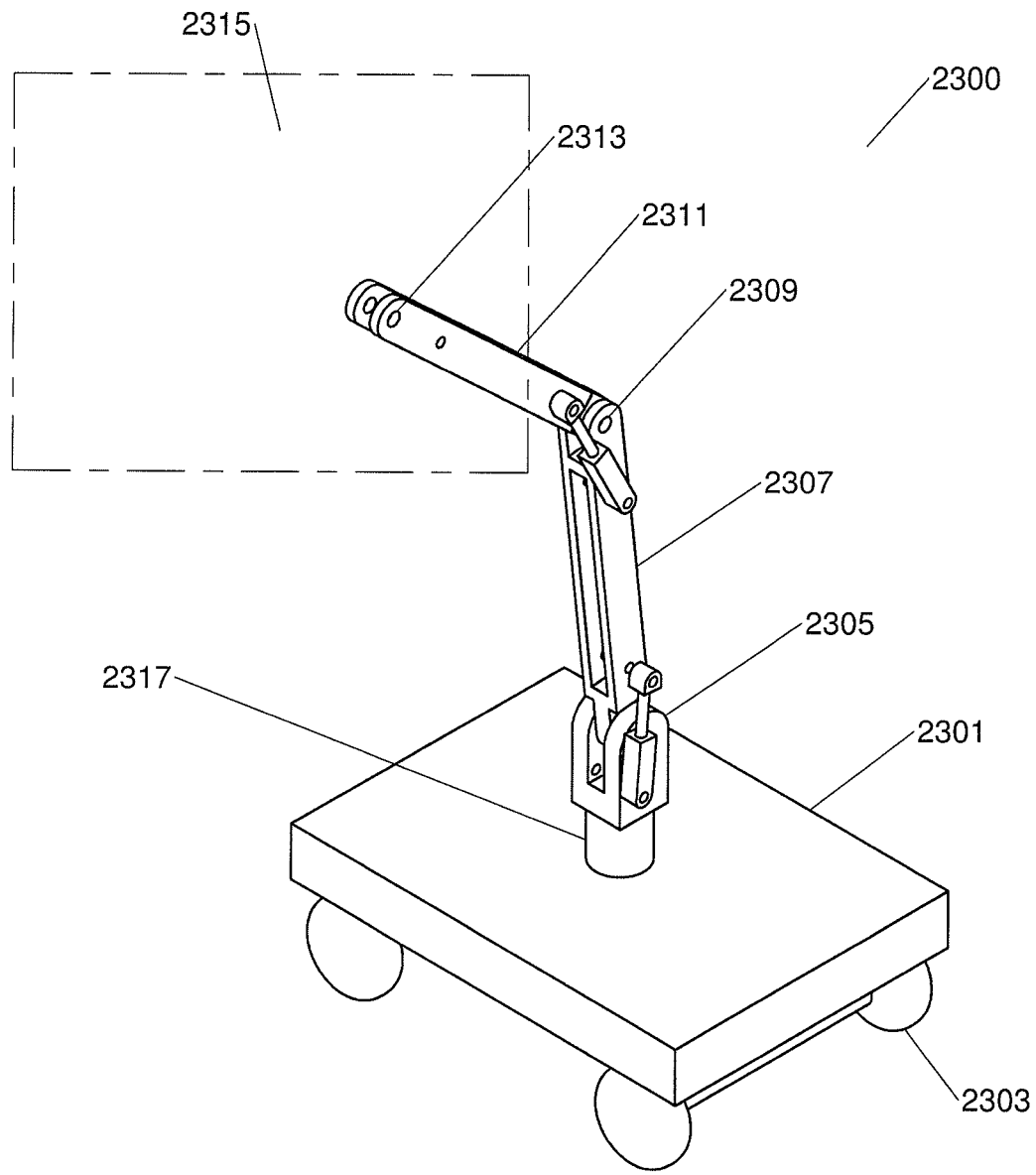
FIG. 23 is a perspective view of an arm based platform.

The building element lift enhancer may also comprise a platform with arms or cables or a combination thereof. The various building element grippers and sheet retainers described herein are operatively coupled to a platform such as the arm based platform 2300 depicted in perspective view in FIG. 23. In FIG. 23 a platform 2301 such as the moveable platform with tires and wheels 2303 has affixed to its upper side a platform joint 2305 that allows for rotational or moveable coupling of the platform 2301 to the arms and in turn to a building element gripper, a sheet retainer, or other building element retention device. Of course should the building element lift enhancer be employed in a tunnel, pit or similar topology, the term upper side may not be entirely descriptive as "upper side" may not always be up in relation to gravity. In some embodiments of the present invention, the platform 2301 is weighted or otherwise counterbalanced either throughout or in specific locations to prevent tipping or instability of the platform under load. The platform 2301 may also be motorized or may, in some embodiments, be manually configured where an operator pushes or pulls the platform around the job site.

A rotary joint 2317 can also be seen to allow side to side movement. The rotary joint 2317 may be a passive joint, or may be an active joint controlled by a motor or the like.

Figure 24:
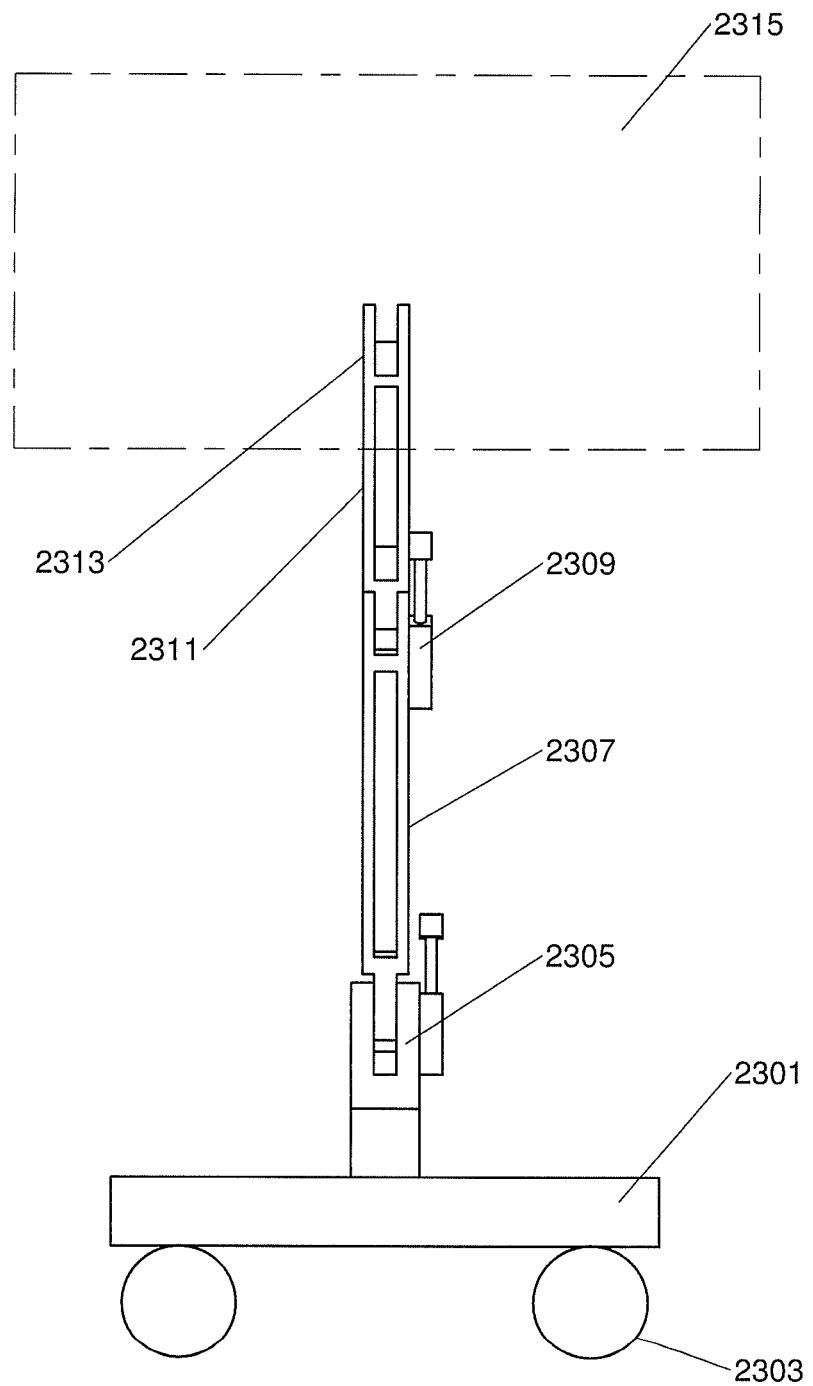
FIG. 24 is a side plan view of the arm based platform of FIG. 23.

FIG. 24 is a side plan view of the arm based platform of FIG. 23. There are one or more arms that are hingably connected to the platform joint 2305 and each other, allowing for a range of motion while moving a building element. The arms may move pneumatically, hydraulically, or manually, or may move with a gear, belt, cord, or direct coupling to a motor such as an electric motor. A lower arm 2307 can be seen in FIG. 24 hingably coupled by an intermediate joint 2309 to an upper arm 2311. The upper arm 2311 has an attachment point or mechanism 2313 that provides for an attachment or coupling point for a building element gripper, sheet retainer or similar building element retention device (depicted as a dashed line box 2315). In some embodiments of the present invention, the arms are telescopic or otherwise extendable and retractable.

Figure 25:
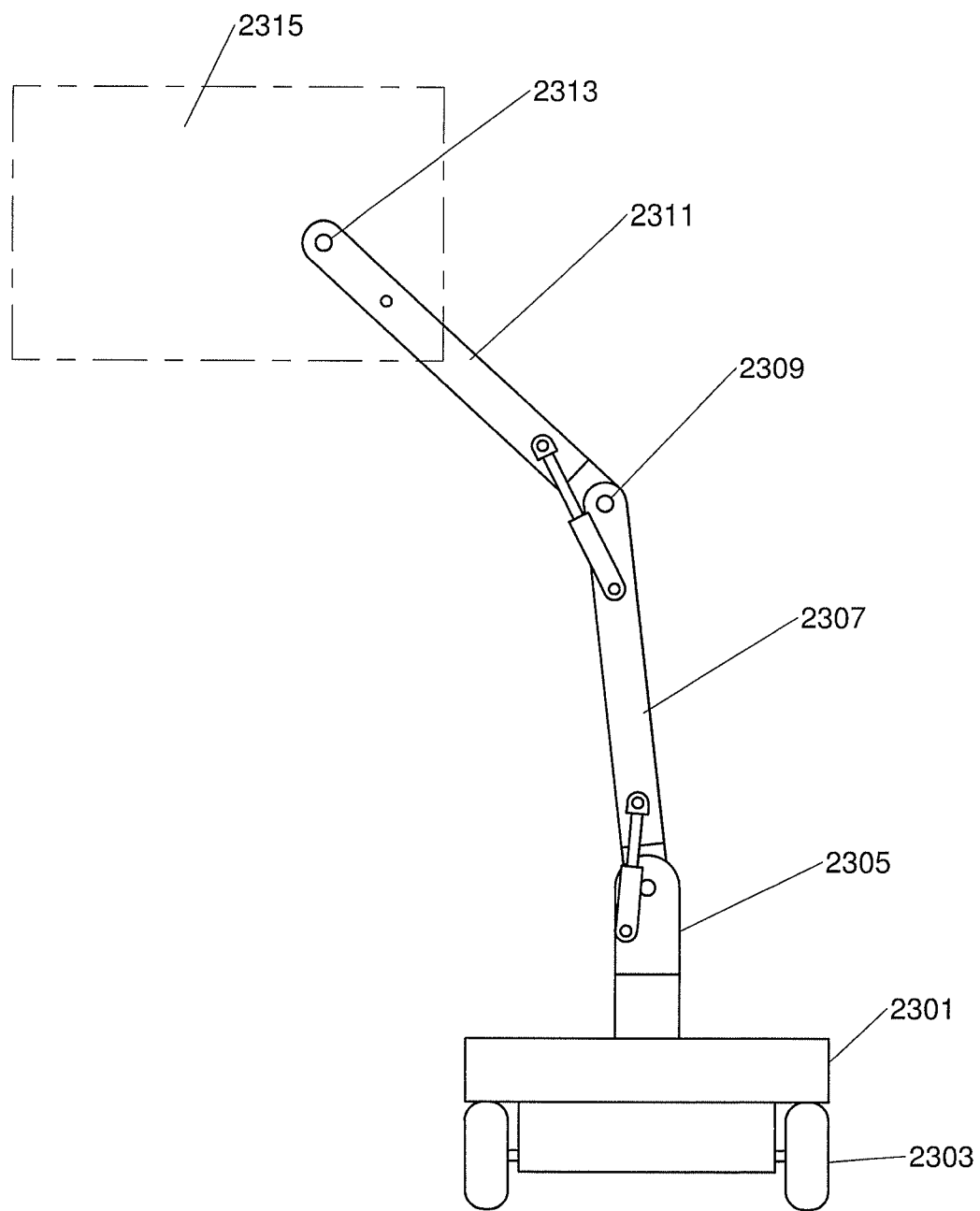
FIG. 25 is a rotated side plan view of the arm based platform of FIG. 23.
Figure 26:
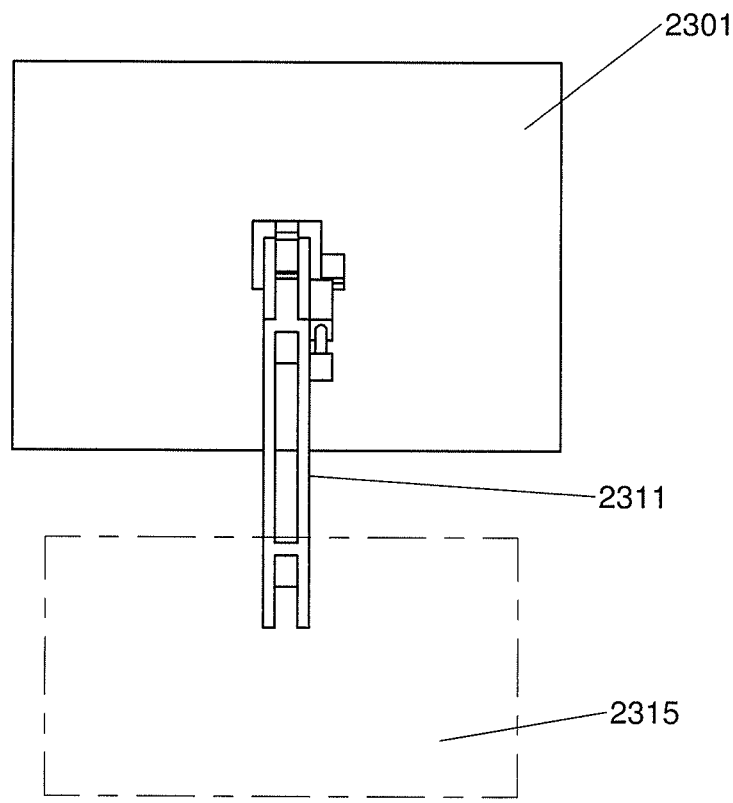
FIG. 26 is a top plan view of the arm based platform of FIG. 23.
Figure 27:
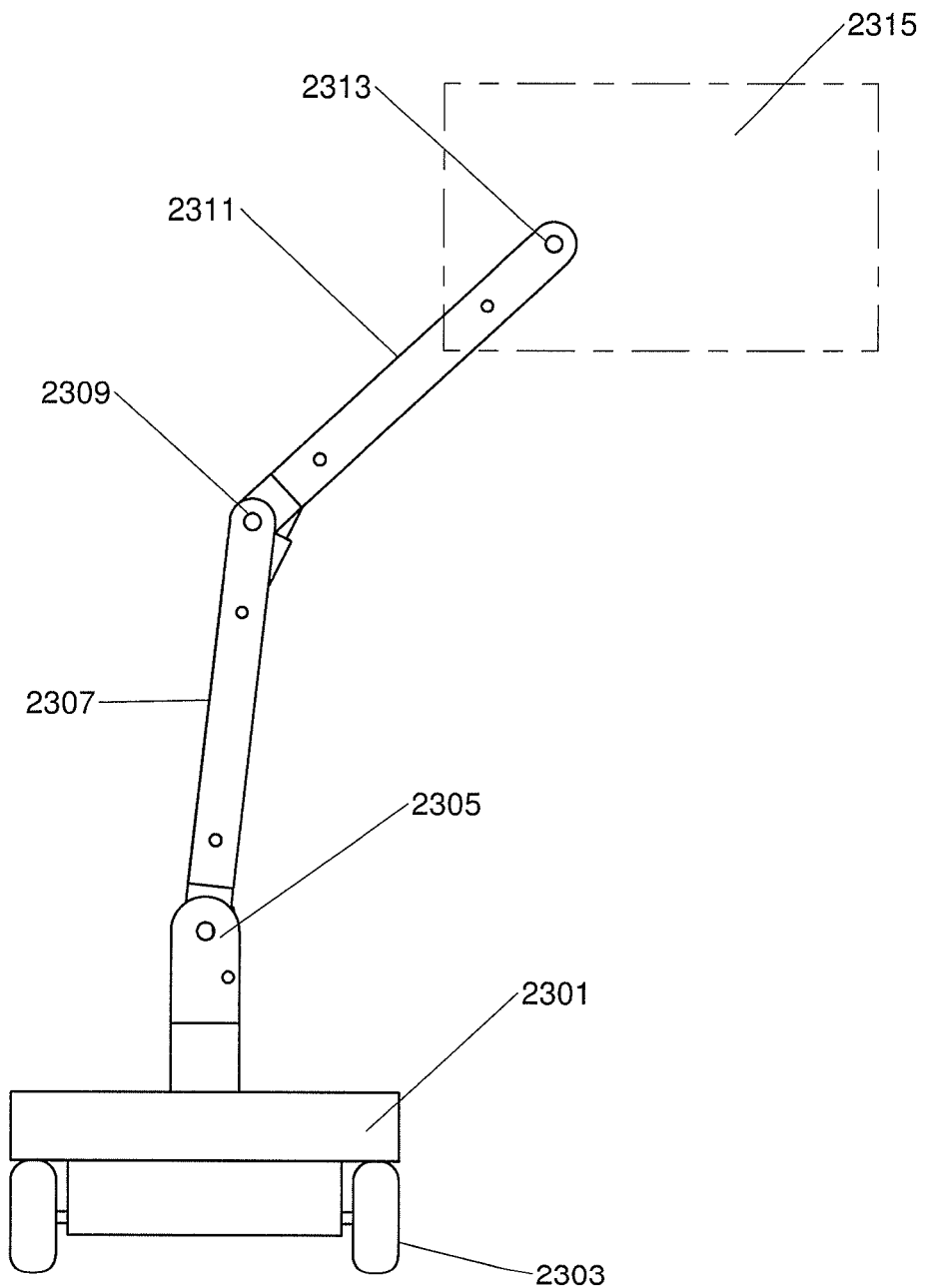
FIG. 27 is an alternate side plan view of the arm based platform of FIG. 23.

FIG. 25 is a rotated side plan view of the arm based platform of FIG. 23. FIG. 26 is a top plan view of the arm based platform of FIG. 23. FIG. 27 is an alternate side plan view of the arm based platform of FIG. 23.

Figure 28:
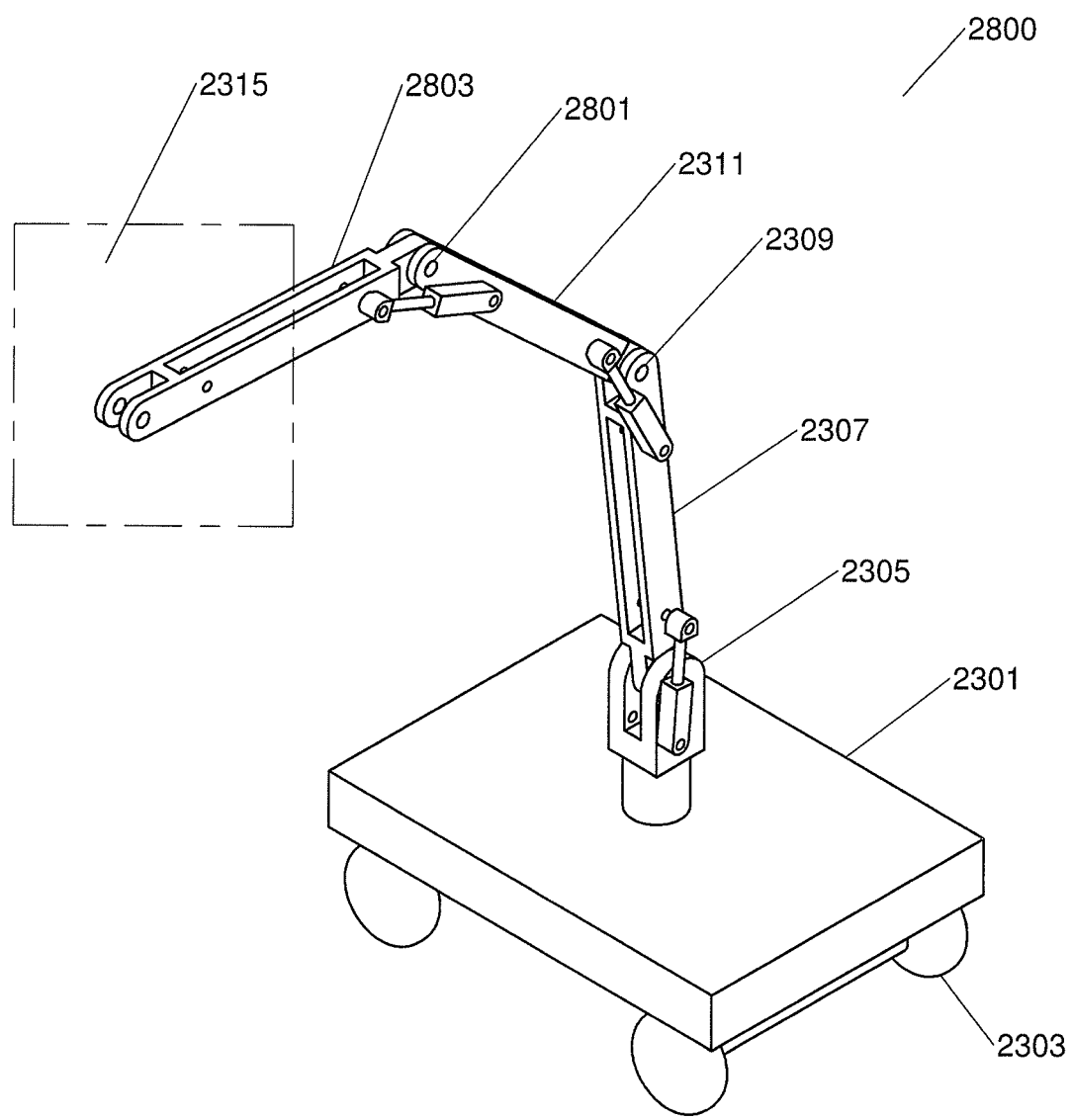
FIG. 28 is a perspective view of an arm based platform with an extender arm included.

In another embodiment, an additional arm is included. For example, FIG. 28 depicts a perspective view of an arm based platform 2800 with an extender arm included. The extender arm 2803 is coupled to the upper arm 2311 by way of an extender joint 2801, and may move pneumatically, hydraulically, or manually, or may move with a gear, belt, cord, or direct coupling to a motor such as an electric motor. In some embodiments of the present invention, the arms are telescopic or otherwise extendable and retractable.

Figure 29:
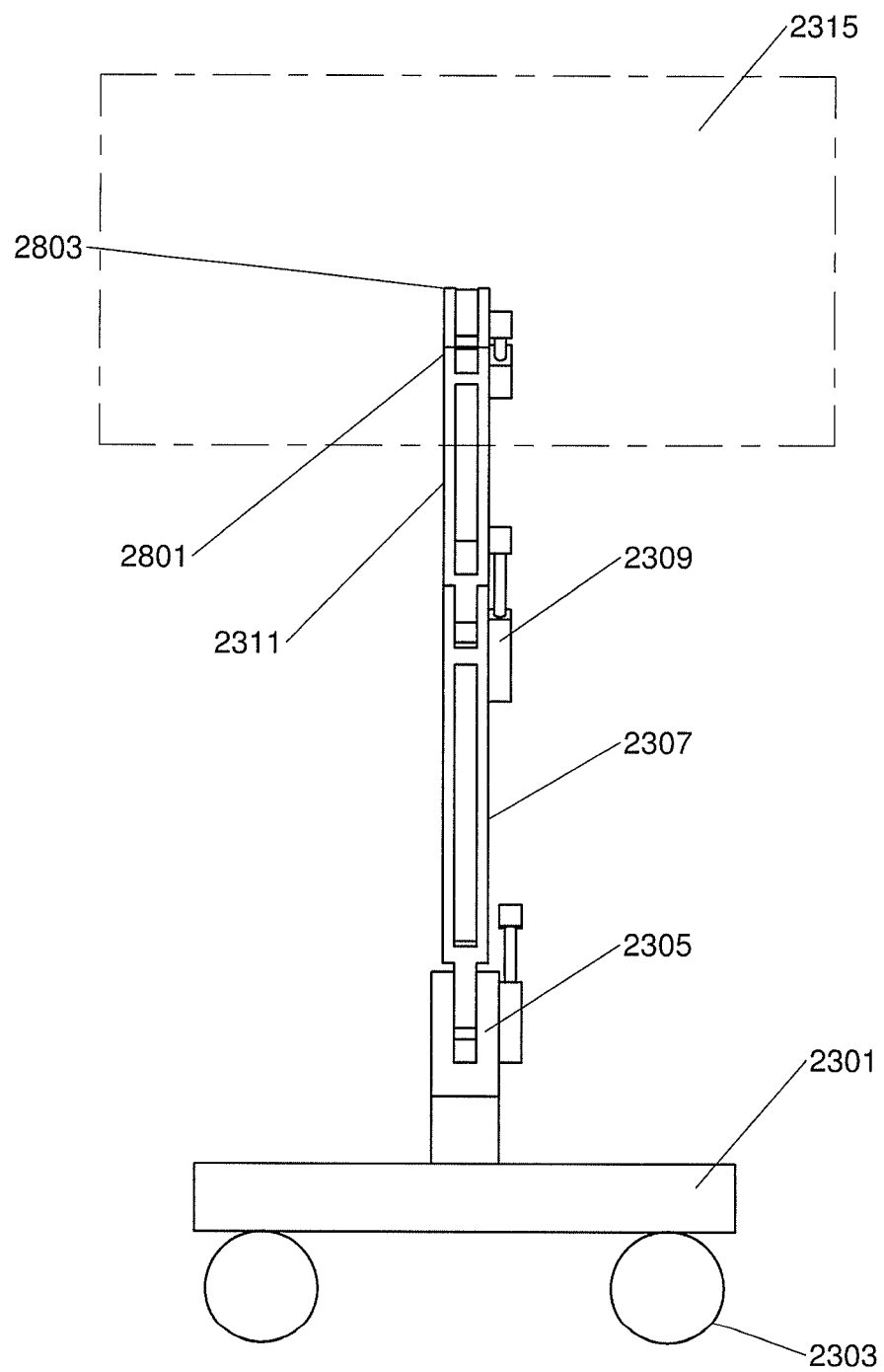
FIG. 29 is a side plan view of the arm based platform of FIG. 28.
Figure 30:
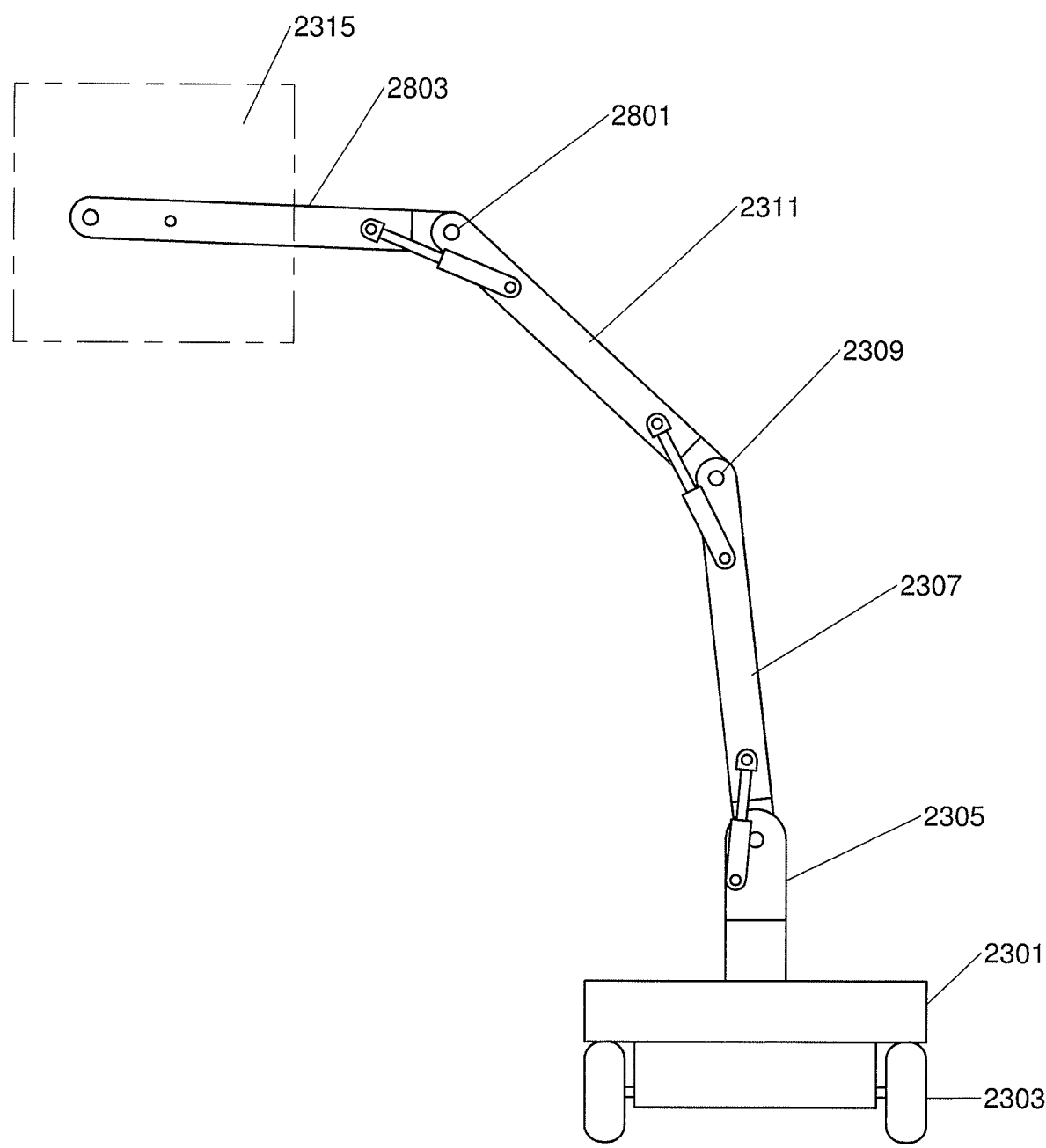
FIG. 30 is a rotated side plan view of the arm based platform of FIG. 28.
Figure 31:
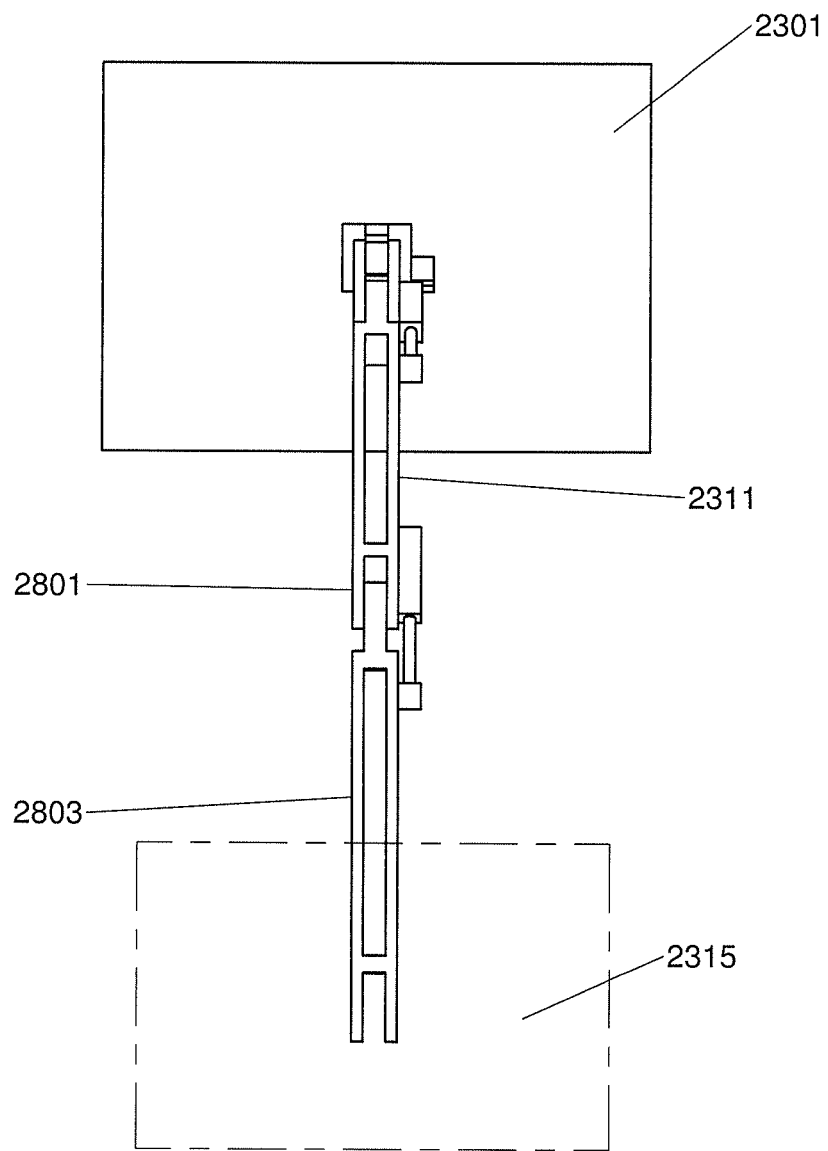
FIG. 31 is a top plan view of the arm based platform of FIG. 28.
Figure 32:
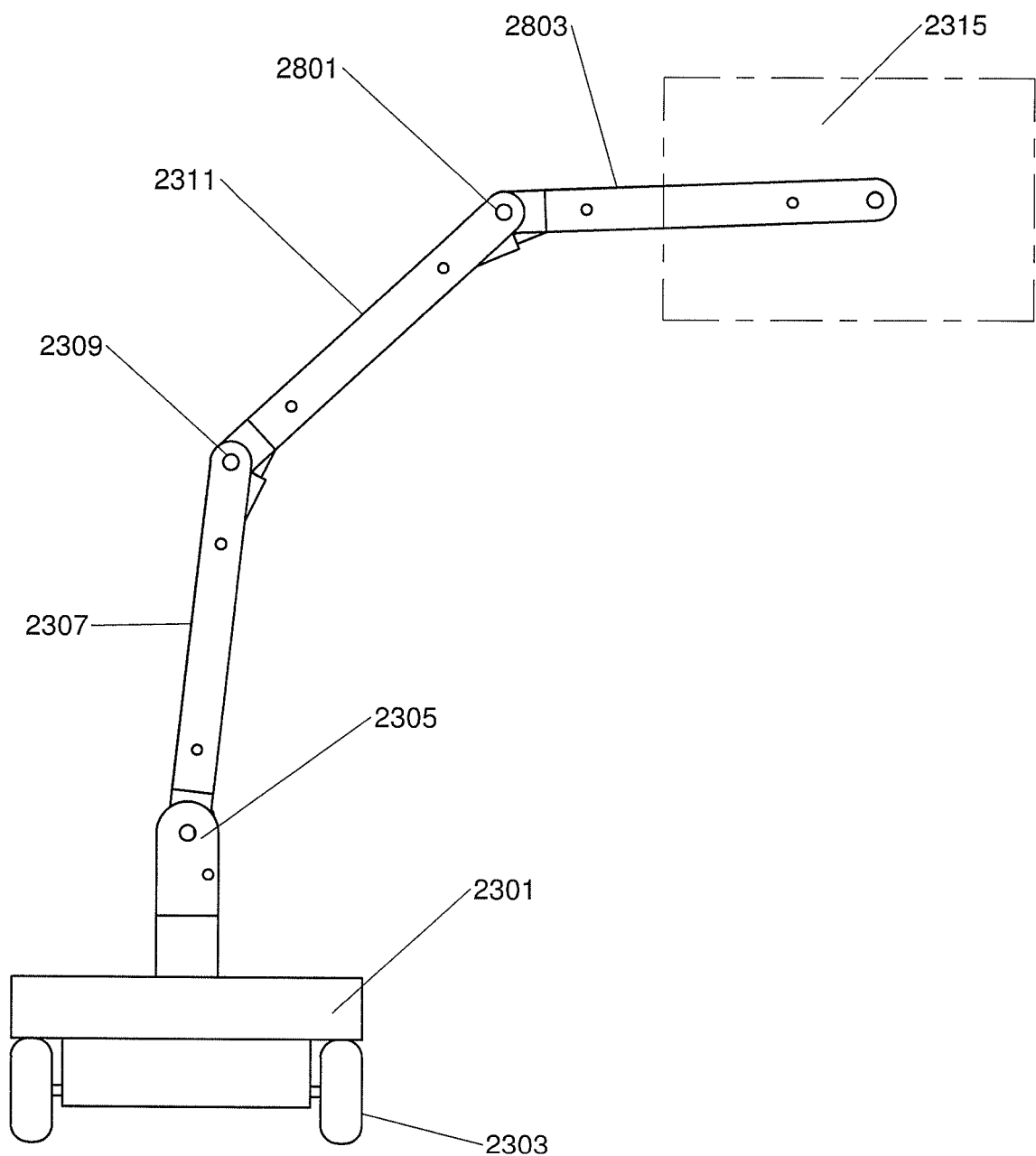
FIG. 32 is an alternate side plan view of the arm based platform of FIG. 28.

FIG. 29 is a side plan view of the arm based platform of FIG. 28. FIG. 30 is a rotated side plan view of the arm based platform of FIG. 28. FIG. 31 is a top plan view of the arm based platform of FIG. 28. FIG. 32 is an alternate side plan view of the arm based platform of FIG. 28. The arm based platform as depicted, for example, in FIGS. 23-32, provides lift enhancement or assistance similar to that of the cable based version heretofore described and depicted. One can employ similar force sensing and force assisting techniques and systems to those described herein for a cable based building element lift enhancer. For example, force sensors may be contained or coupled to the joints between the arms or may be included with a drive cable and motor arrangement, a pneumatic or electrical actuator arrangement, or the like. The disclosure provided herein provides guidance to those skilled in the art to construct an arm based building element lift enhancer based on the cable based disclosure provided herein.

Figure 33:
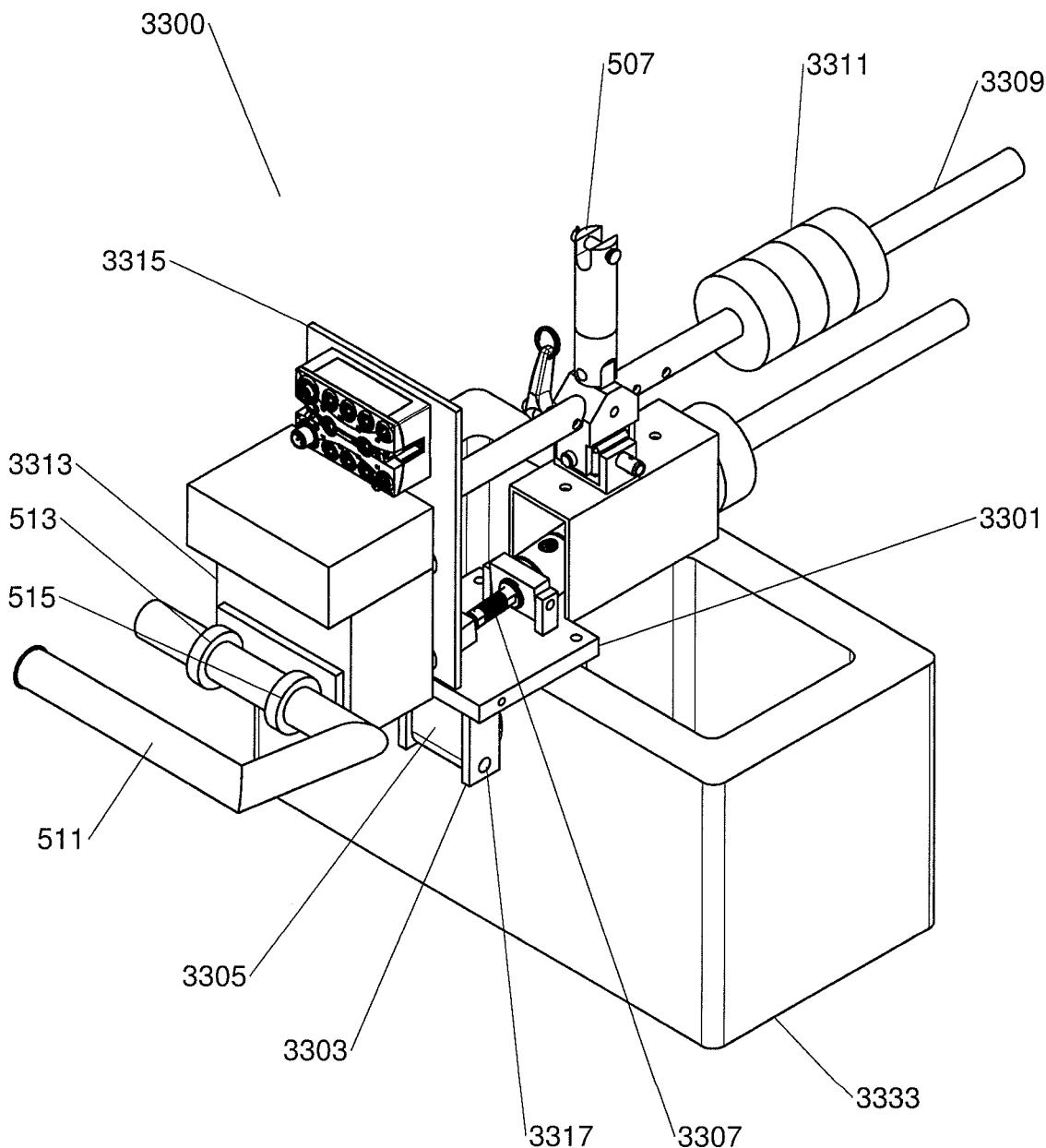
FIG. 33 is a is a perspective view of a building element side gripper.

While a building element gripper has been heretofore described that grasps and retains a building element such as a block through interaction with the center webbing or center wall of the block, it can be envisioned that other grasping or gripping locations on the building element are also possible. For example, FIG. 33 is a perspective view of a building element side gripper 3300. The building element side gripper 3300 also operates by grasping a wall of a building element, in this case an outer wall. This approach may require counterweights 3311 to level the gripper while in use. The counterweights 3311 are retained on a counterweight shaft 3309 that allows for adjustment of the counterweights by movement of individual weight plates or removal of a specified number of weight plates. A base plate 3301 can be seen that has attached a cam bracket or brackets 3303 and a side cam 3305. An actuator 3307 such as, but not limited to, a pneumatic actuator, is mechanically coupled to the side cam 3305 and upon actuation forces the side cam 3305 into a wall of the building element where backing pins (see FIG. 34) prevent the building element from moving under side cam rollout. The side cam 3305 is retained between the cam brackets by a side cam pin 3317 or the like. A side plate 3315 provides for attachment of a control box 3313 with a force sensing handle 511 and a first force ring 513 and a second force ring 515, as previously described herein. As will be later described herein, the handle may also be a passive handle. Further, a displacement sensing handle may be used where the movement or displacement of the handle provides control similar to that of a force sensing handle. As the handle moves or displaces its position through actions of the user, a signal is generated by way of a force sensor such as a load cell, piezoelectric cell, or the like, or by way of a displacement detector or sensor arrangement such as a coil, inductive sensor, capacitive sensor, resistive sensor, or the like. Thus handle displacement or movement is correlated to lift assist force. The displacement sensing handle may also contain switches or actuators that provides further control functionality. When an operator takes actions to grasp a building element 3333, the side cam 3305 rolls out, thus applying force to the building element wall that is backed by backing pins as shown in FIG. 34.

Figure 34:
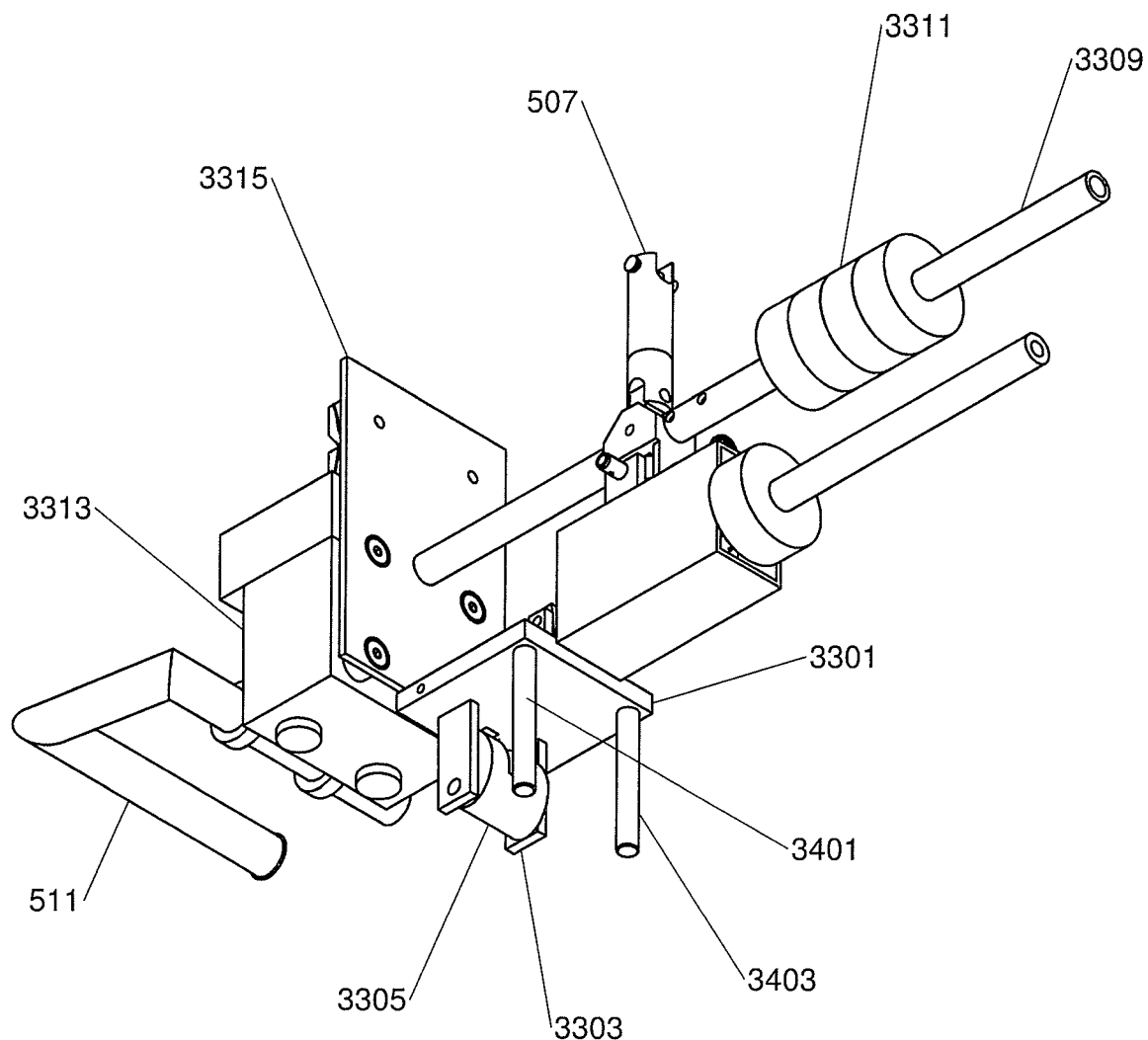
FIG. 34 is a rotated perspective view of the building element side gripper without a building element.

FIG. 34 is a rotated perspective view of the building element side gripper without a building element retained. The grasping mechanism can be clearly seen, in particular the first backing pin 3401 and the second backing pin 3403.

Figure 35:
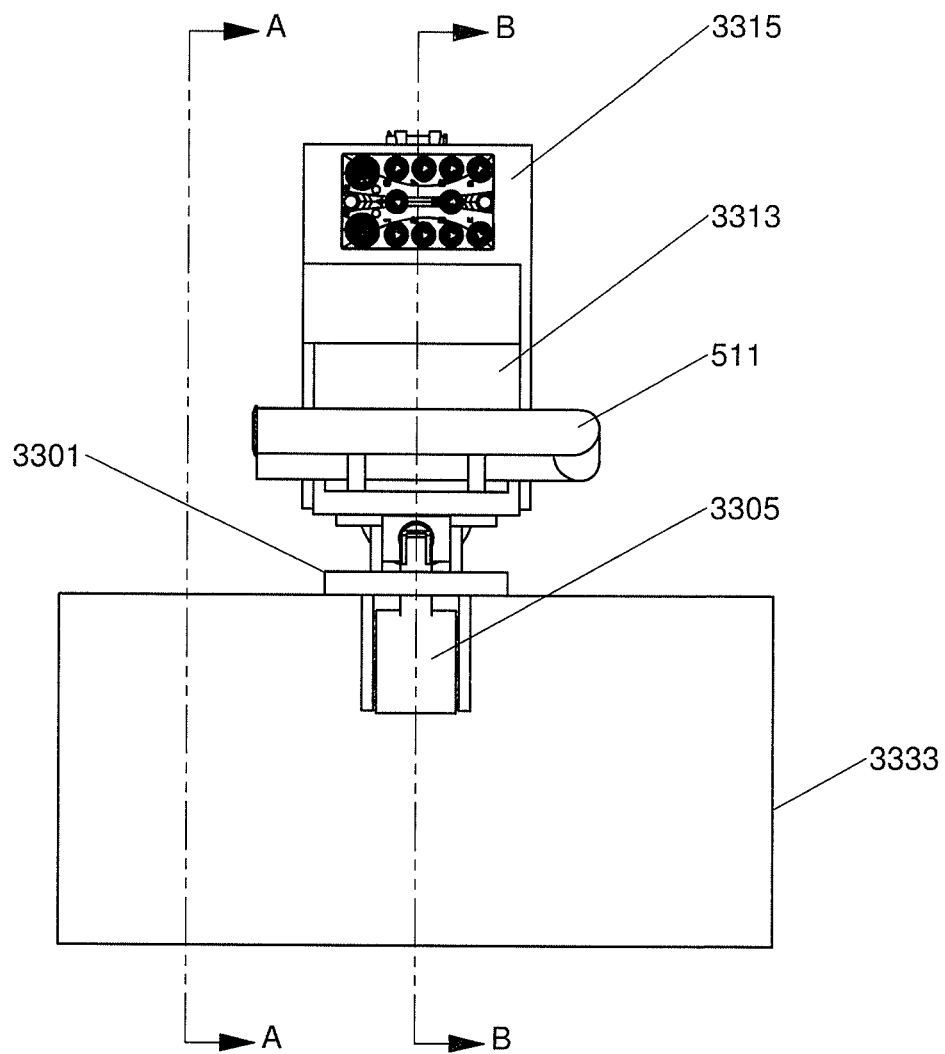
FIG. 35 is a side plan view of the building element side gripper.
Figure 36:
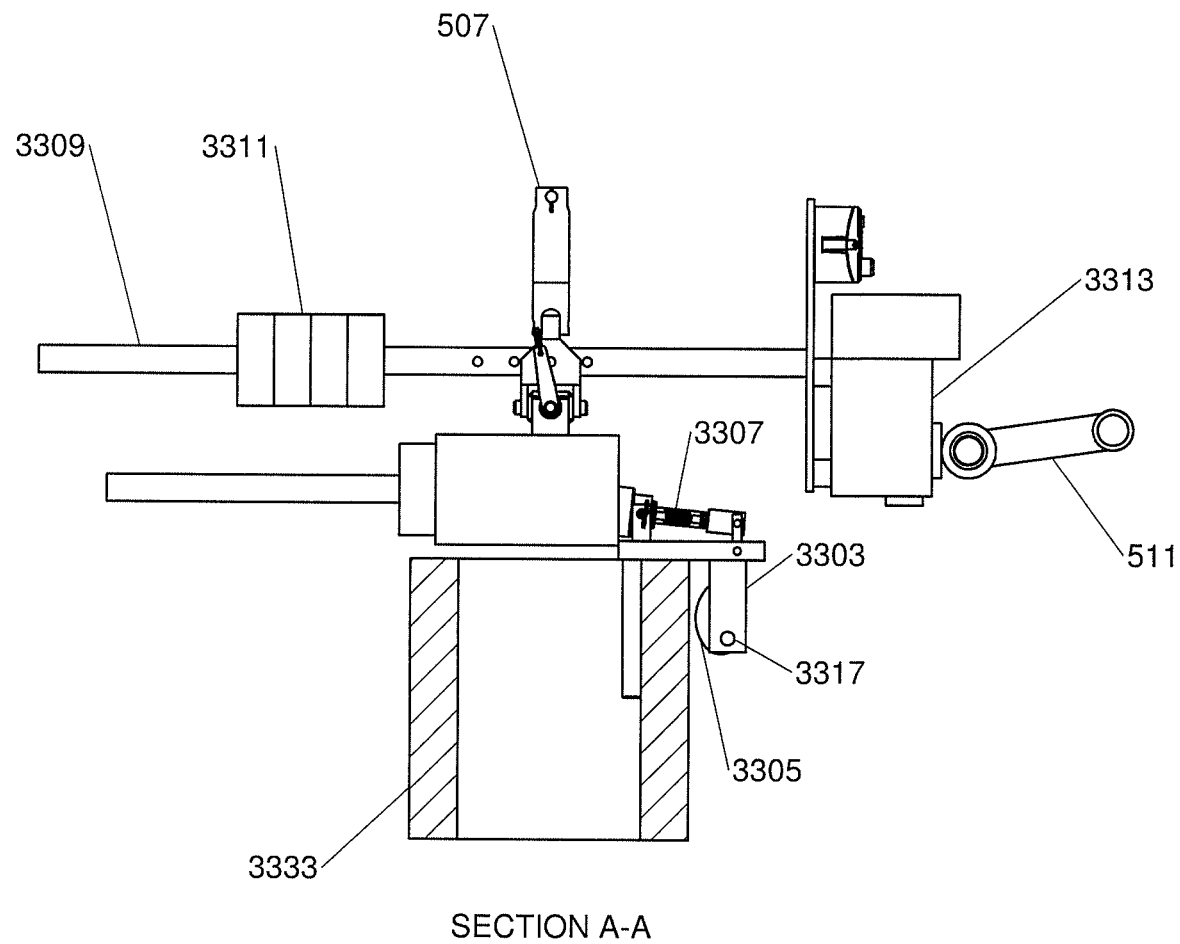
FIG. 36 is a cross sectional view of the building element side gripper taken along line A-A of FIG. 35.

FIG. 35 is a side plan view of the building element side gripper retaining a building element 3333. FIG. 36 is a cross sectional view of the building element side gripper taken along line A-A of FIG. 35. In FIG. 36, the mechanism that grasps the building element can be clearly seen.

Figure 37:
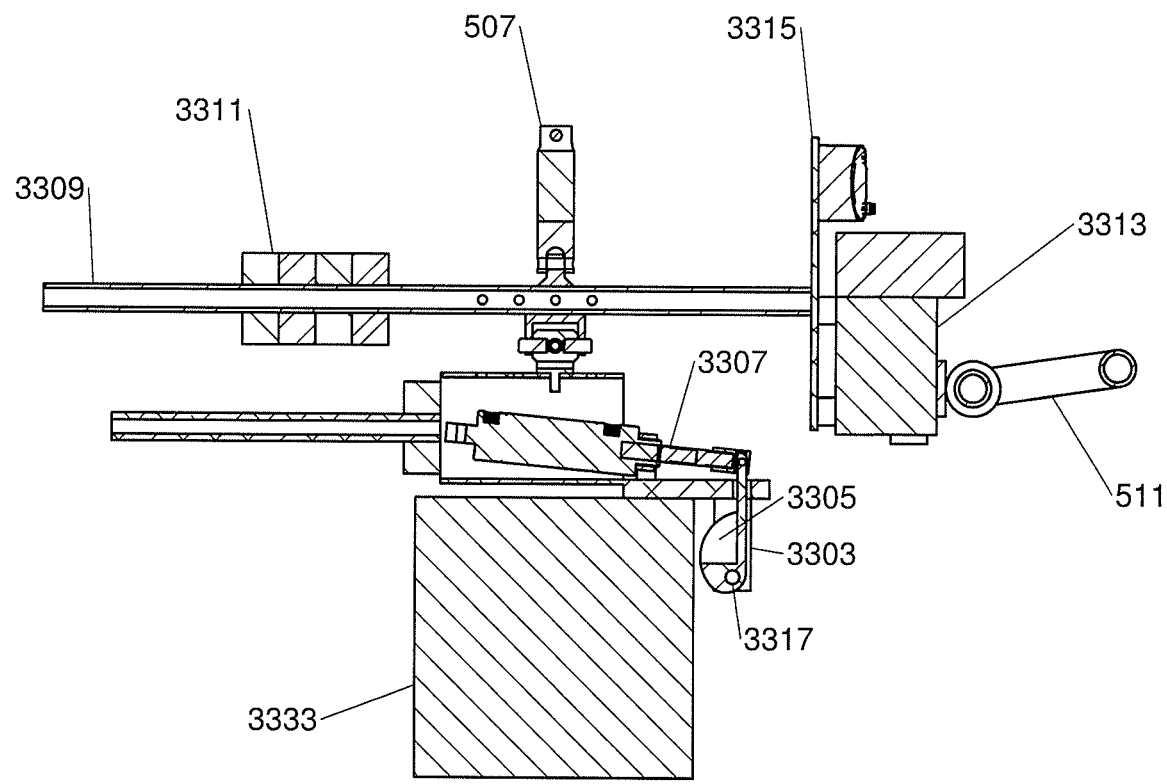
FIG. 37 is a cross sectional view of the building element side gripper taken along line B-B of FIG. 35.

FIG. 37 is a cross sectional view of the building element side gripper taken along line B-B of FIG. 35.

Figure 38:
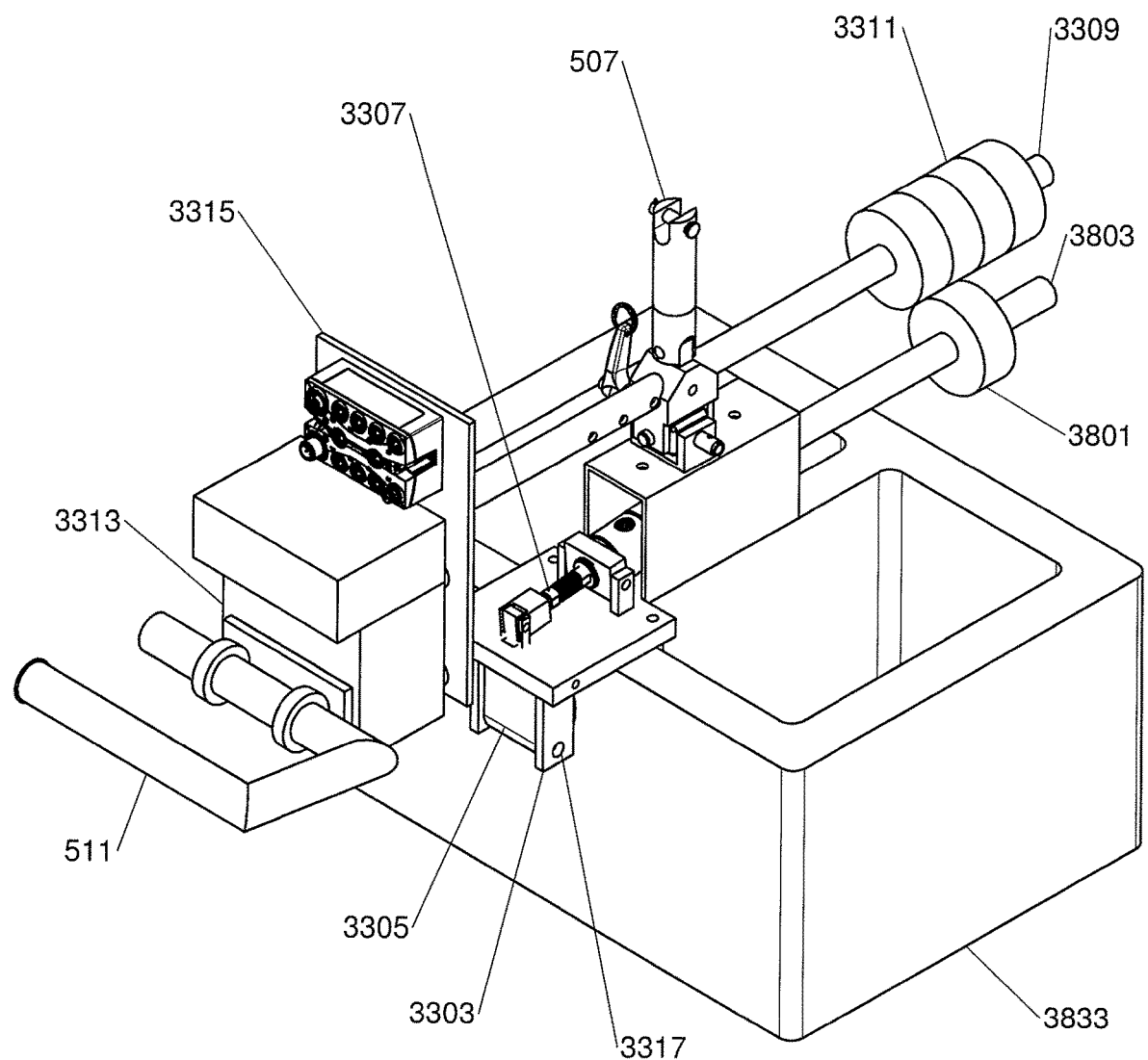
FIG. 38 is a perspective view of the building element side gripper retaining a larger building element.
Figure 39:
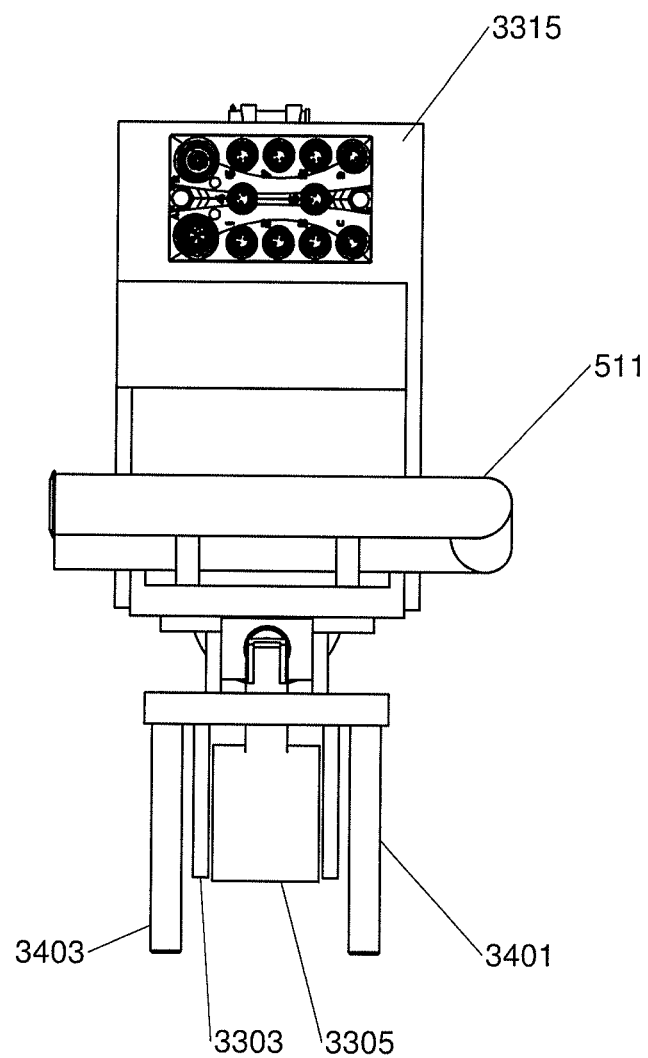
FIG. 39 is a side plan view of the building element side gripper without a building element.
Figure 40:
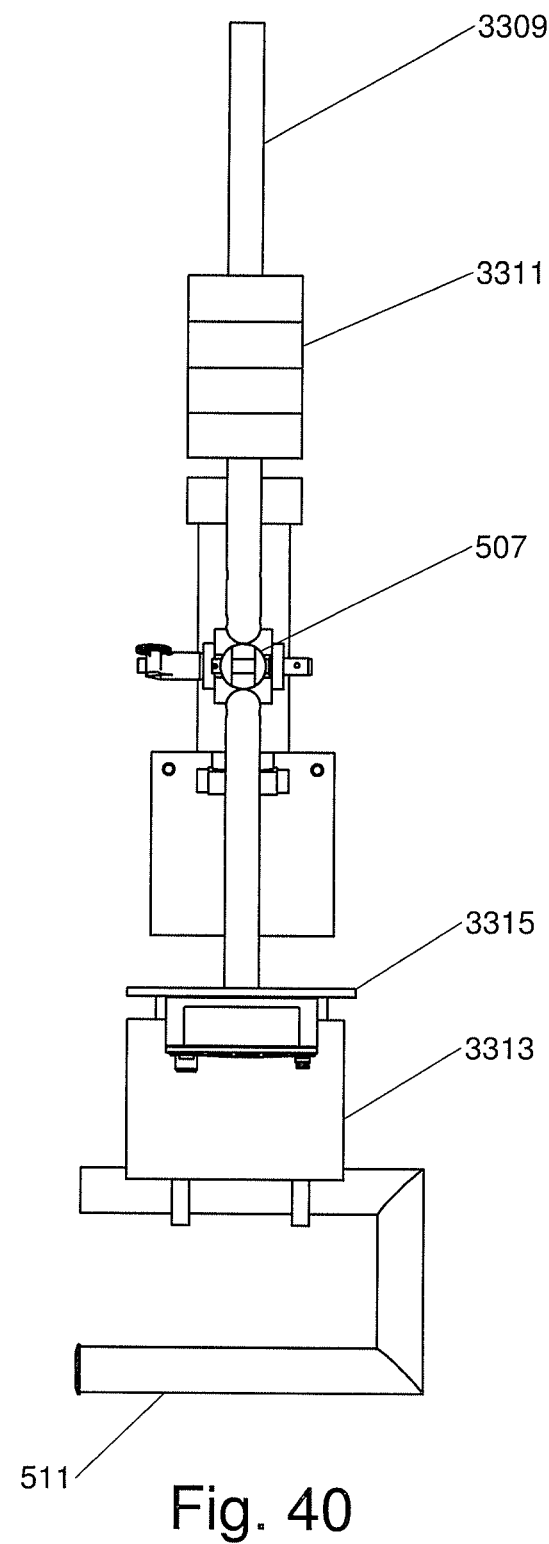
FIG. 40 is a top plan view of the building element side gripper.
Figure 41:
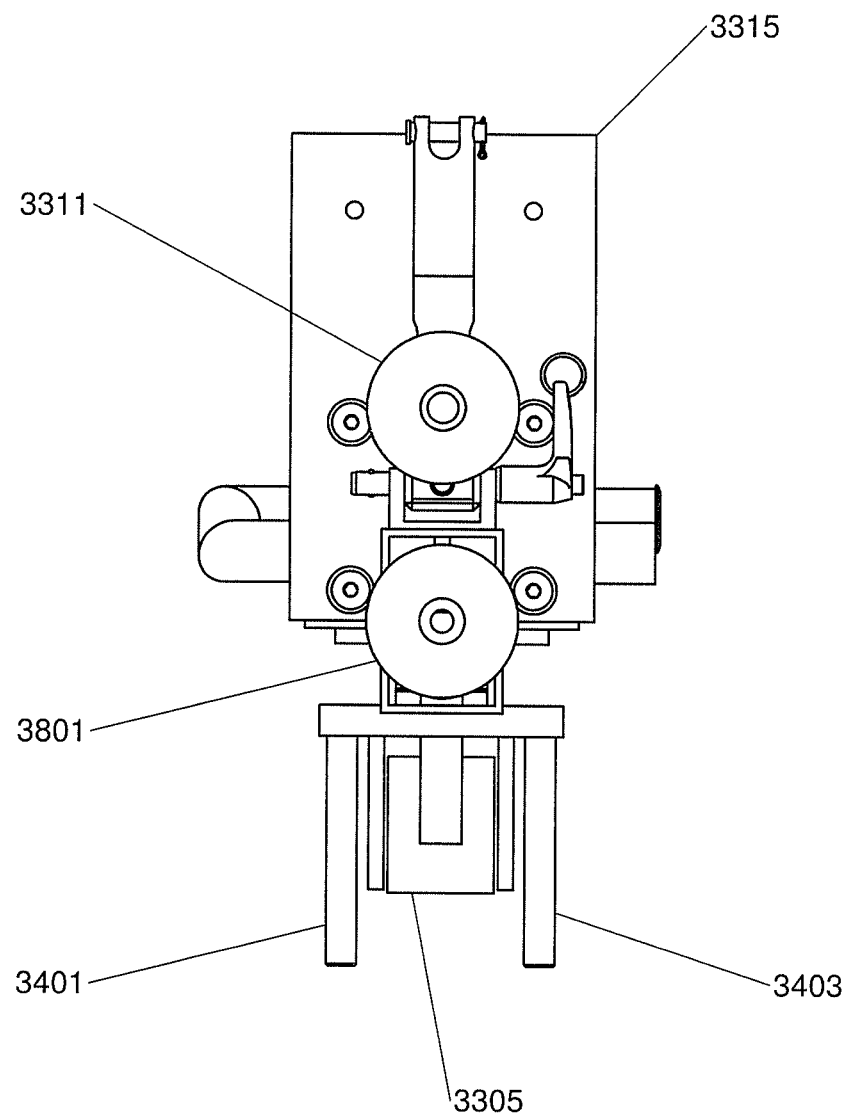
FIG. 41 is a rotated side plan view of the building element side gripper.

FIG. 38 is a perspective view of the building element side gripper retaining a larger building element 3833. An optional second counterweight shaft 3803 and a second counterweight 3801 can also be seen. FIG. 39 is a side plan view of the building element side gripper without a building element. FIG. 40 is a top plan view of the building element side gripper. FIG. 41 is a rotated side plan view of the building element side gripper.

A microprocessor(s) are employed to provide for sequencing and control of system level operations. For example, a microprocessor is employed to control the force applied to the cable by the drive motor in response to user controls and force sensor feedback.

To accomplish the task of setting a building element, the microprocessor is configured to control the building element gripper by providing a pre-set weight to the building element gripper on user demand to accomplish setting of a building element by the building element gripper.

To accomplish the task of placing a building element, the microprocessor is configured to control the building element gripper by providing a ramp down release of the building element on user demand to accomplish placing of the building element by the building element gripper.

In some embodiments of the present invention, the building element lift enhancer is configured, by way of the microprocessor and control electronics, to control the building element gripper by providing an auto retract of the building element gripper once the building element has been placed. Importantly, a retract height may be specified by the user where the height at which the building element gripper moves in auto retract mode is set. This retract height may be specified by the user on-demand so that the user specified retract height may be set dynamically and during use of the system through a user interface that may be as simple as a switch, or may include a more complex user interface such as a touch screen, a remote link to a smart phone, tablet, or other electronic device, or the like.

Figure 42:
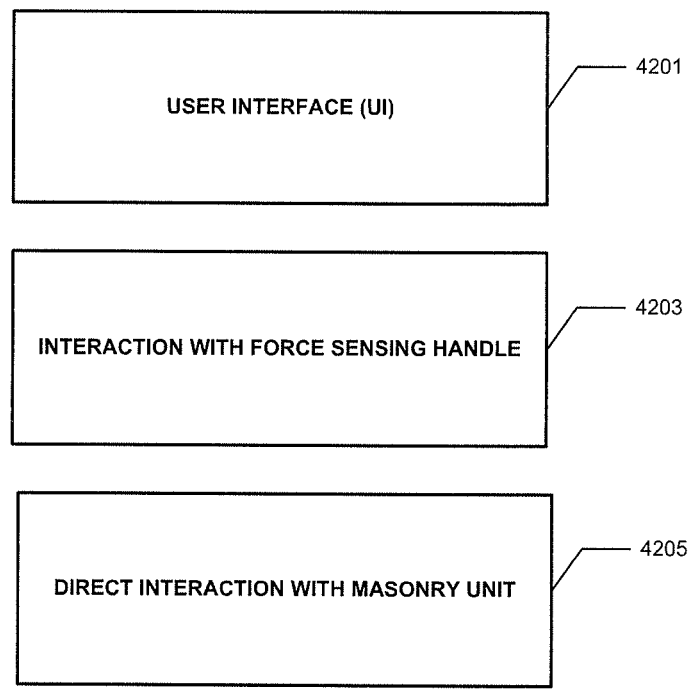
FIG. 42 is a block diagram depicting modes of user operation of the building element lift enhancer.

FIG. 42 is a block diagram depicting modes of user operation of the building element lift enhancer. A User interface 4201 such as a control panel, touch screen, buttons, switches, and the like may be employed. While this traditional form of user interface is functional, it does not facilitate direct interaction of the user with the building element, thus slowing down work flow. As previously described, the user may also interact with a handle 4203. Applying upward or downward force to the handle controls vertical movement of the building element, and lateral movement through gripping and movement of the handle results in swinging or rotation of the arms of the platform, either solely through human force or through mechanical assistance. Handles may be force sensing, displacement sensing, passive, active, or the like. Another form of user operation involves direct movement of the building element 4205, with the building element lift enhancer sensing the application of user applied force and in turn applying force to enhance or otherwise supplement or amplify the user's applied force, making movement of the building element nearly effortless.

Figure 43:
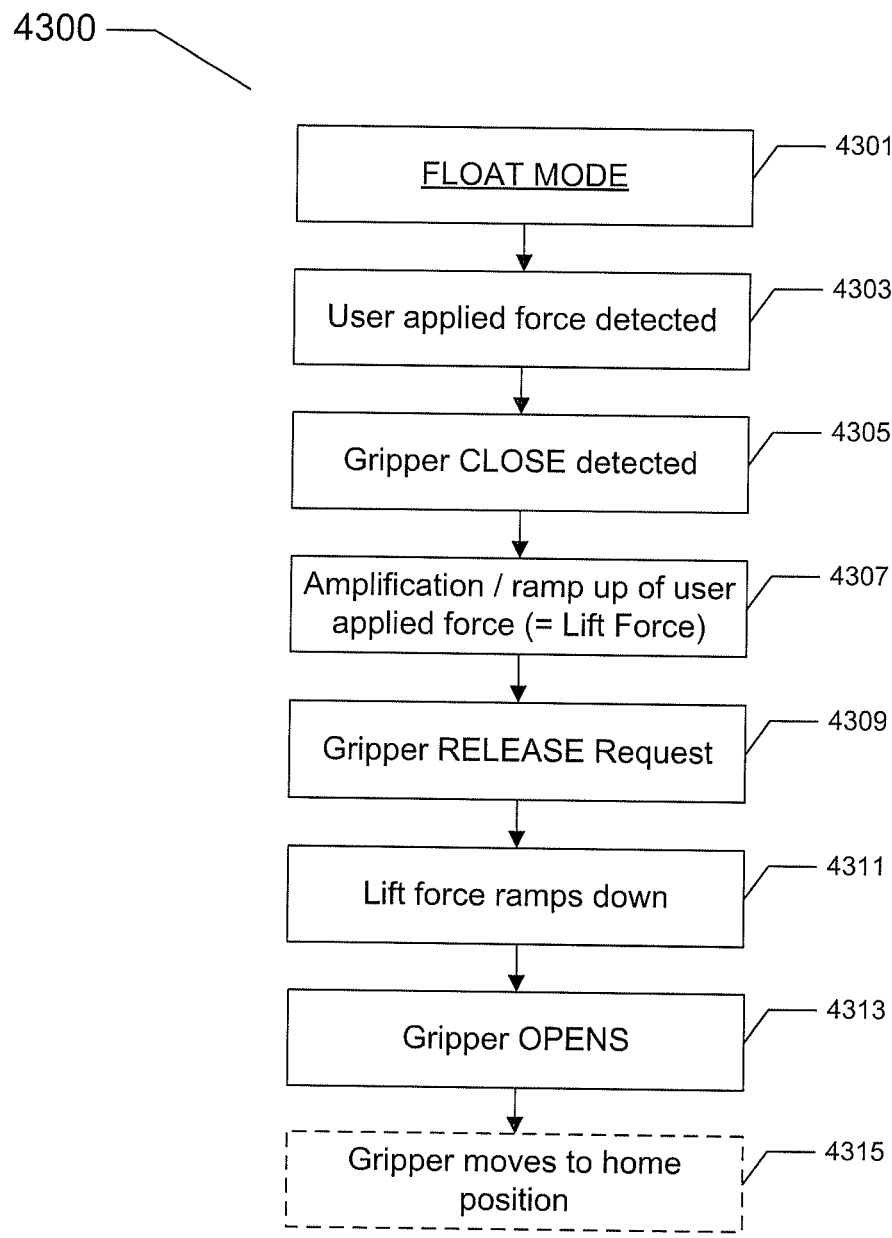
FIG. 43 is a flowchart depicting sequencing of the controller.

FIG. 43 is a flowchart depicting sequencing of the controller in a typical use operation 4300. To begin, the building element gripper or sheet retainer is suspended at a given or specified height and spatial location, essentially floating at a point in space until such time as a user takes an action to operate the building element lift enhancer. This is known as FORCE BALANCING 4301. Once a user applies force to the building element gripper or sheet retainer or the building element itself if one is being retained, the system detects this user applied force in step 4303. The user then moves the appendage (building element gripper, sheet retainer or the like) to placement on a building element to be moved, requests that the gripper or appendage CLOSES by way of a switch, motion, gesture, or the like. When the system detects a gripper CLOSE in step 4305, it begins to amplify or ramp up force that is being applied by the user to move the building element in step 4307, thus drastically reducing the force that the user must exert to move the building element, thus enhancing the lift of the building element. Once the building element is placed in it's desired location by the user, a gripper RELEASE request is initiated by way of a switch, motion, gesture, or the like, and the system detects the RELEASE request in step 4309. In turn the lift force being applied by the system ramps down in step 4311 and the gripper releases and opens in step 4313. Optionally, the gripper or appendage then moves to a home or predefined position in step 4315.

A negative tare function may also be employed. This allows the user to request the load to weigh a programmable amount while in FORCE BALANCING. This allows the user to set and tweak the load into position before releasing the load. The load has less weight, thus overcoming frictional aspects of moving the load into position.

A typical placement process for the building element gripper is as follows:

Pickup building element

Allow unit to enter FORCE BALANCING

Get block mostly in position (within a couple inches from the placement location, vertically)

Enter negative tare

Figure 44:
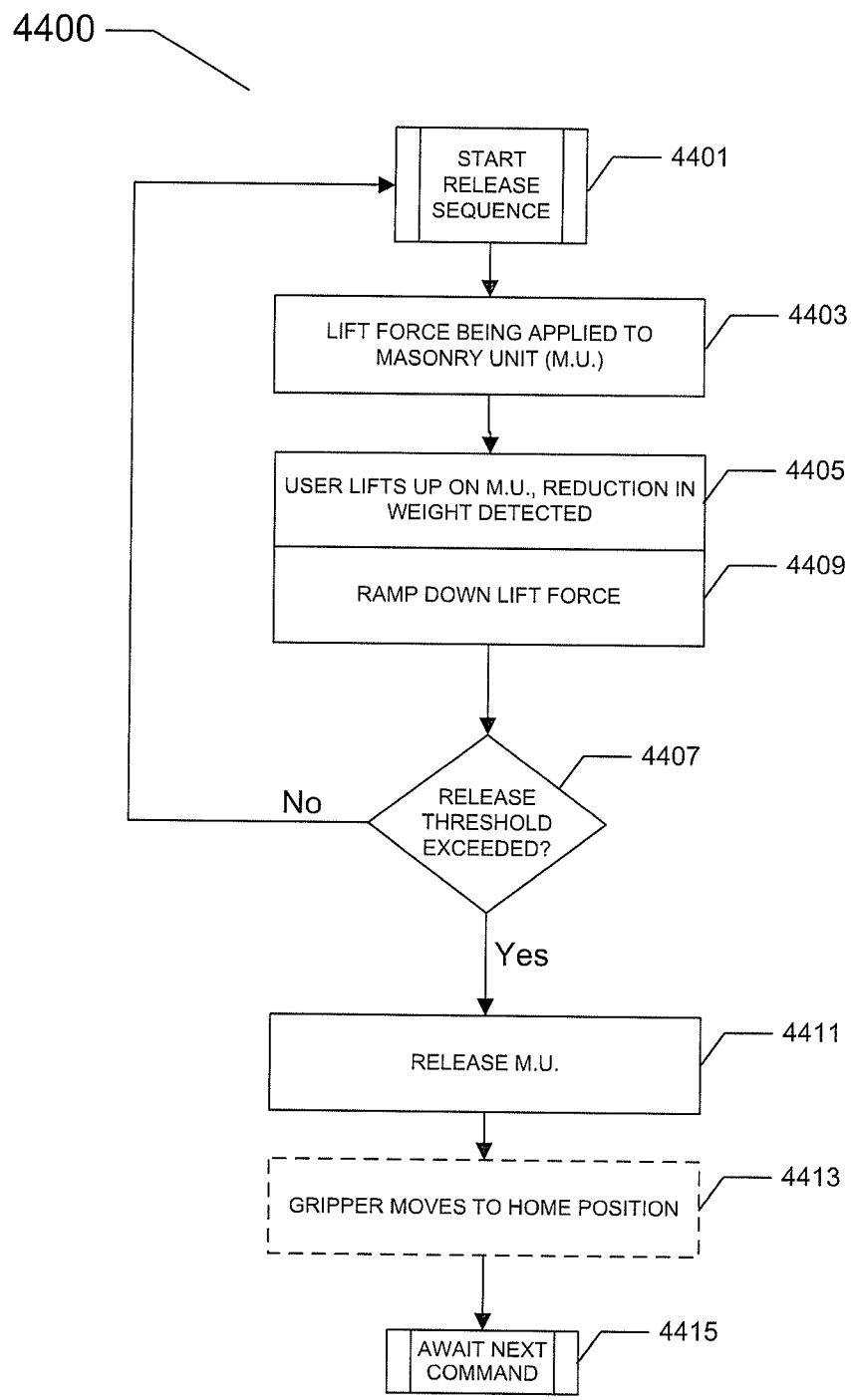
FIG. 44 is a flowchart depicting one method of building element release.

Use negative tare to help the building element sit properly in the placement location, properly locate building element Hit release button FIG. 44 is a flowchart depicting one method of building element release 4400. While actuation of a switch or similar device may be used to release a building element, detection of a desire by the user to take over lifting and control of the building element (such as a building element) allows for safer and smoother work flow. Switch actuation may still be employed to initiate this process. A release sequence starts in step 4401 where a lift force is being applied to a building element in step 4403. When the user wishes to take over lifting and control of the building element, essentially a handoff similar to the handoff between a laborer moving blocks and a mason who is setting those blocks, the user lifts up on the building element and a reduction in weight is detected in step 4405, providing a ramp down of lift force in step 4409. The system has a predetermined release threshold in step 4407. If that release threshold is not exceeded, the lift force is continued until such time as the release threshold is exceeded. If the release threshold is exceeded in step 4407, the lift force ramps down until the building element is released in step 4411. Once the building element is released, the appendage optionally will move to a home position where the system awaits the next command in step 4415.

In some embodiments of the present invention, the building element gripper employs a passive handle or a displacement sensing handle instead of a force sensing handle. User applied force to control movement of the building element is done through sensing of user applied force by way of, for example, control motor current sensing. The placement of a manual control unit will be described by way of FIGS. 45-47 and the disclosure herein.

The building element lift enhancer has at least one microprocessor for sensing and control. For example, controlling the force applied to the cable by the drive motor in response to user controls and force sensor feedback.

The microprocessor is configured to control the position of the building element gripper and assistive force applied by using force feedback to provide force balancing.

The microprocessor is also configured to control the building element gripper by providing a pre-set weight to the building element gripper on user demand to assist with setting of a building element by the building element gripper (SET). This facilitates proper placement of a building element such as a masonry unit in a wet mortar bed.

The microprocessor is also configured to control the building element gripper by providing a ramp down release of the building element on user demand to assist with placing of the building element by the building element gripper (PLACE).

The microprocessor is also configured to control the building element gripper by providing an auto retract of the building element gripper at a user triggered on-demand retract height once the building element has been placed.

Figure 45:
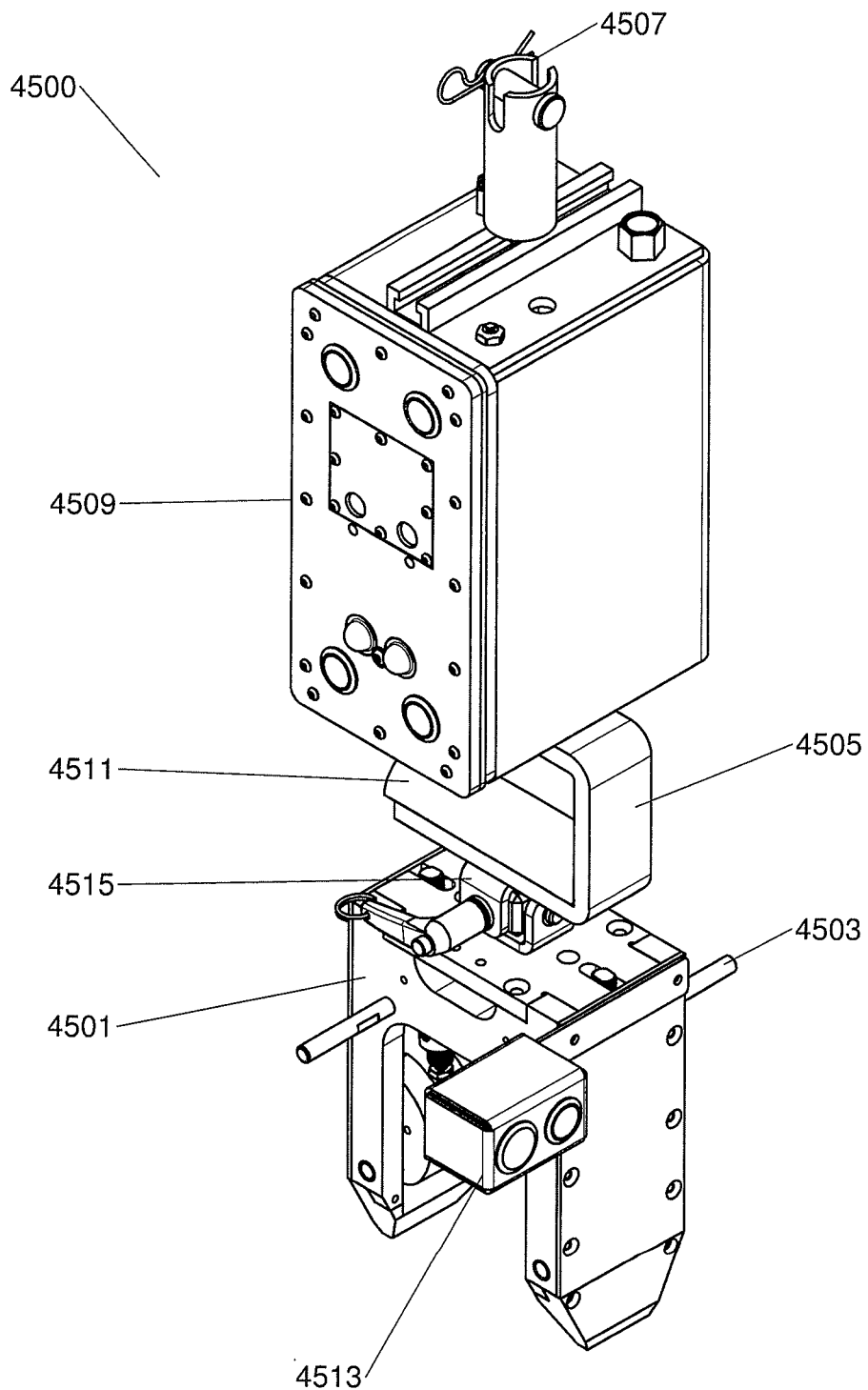
FIG. 45 is a perspective view of another embodiment of the building element gripper.

FIG. 45 is a perspective view of another embodiment of the building element gripper 4500. As previously described, a bifurcated appendage 4501 can be seen. As before, level pins 4503 are employed to provide proper placement of a building element. A control unit 4509 can be seen that houses control electronics, mechanical actuators, and the like. The control unit 4509 may contain some, all or no control electronics, mechanical actuators, or the like. The various control components may be distributed within the building element lift enhancer, or located elsewhere. A manual control handle connector 4505 is used to connect the bifurcated appendage 4501 to the upper portion of the building element gripper. In the example depicted in FIG. 45, the manual control handle connector 4505 is of an open C shaped geometry to allow for ease of operator hand placement. Other geometries may also be employed. A hand rest 4511 can also be seen, which may also be placed further up the manual control handle connector 4505 or be made of varying geometries and configurations for operator comfort, ergonomics, and the like. A universal joint 4515 can also be seen between the manual control handle connector 4505 and the bifurcated appendage 4501. The universal joint, or an additional universal joint, may be placed between the manual control handle connector 4505 and the control unit 4509. To control the actuation of the building element gripper, control tare functionality, and the like, a switch unit 4513 or similar user interface is employed, and may, in some embodiments of the present invention, be located on an alternate side of the building element gripper or even be a remote interface.

Additionally, while the building element gripper described herein is actuated pneumatically, hydraulically, mechanically, electrically, or a combination thereof, in some embodiments of the present invention the building element gripper is actuated manually, through human force combined with mechanical linkages, components, or the like.

Figure 46:
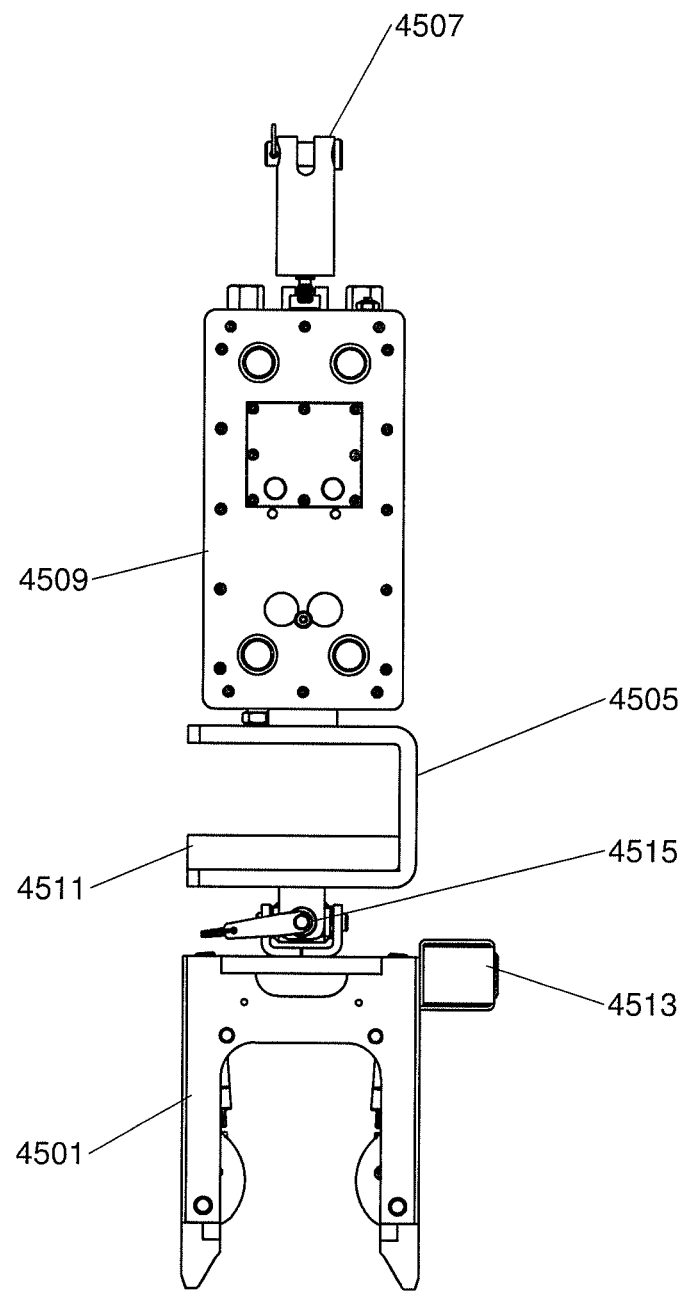
FIG. 46 is a front plan view of the building element gripper of FIG. 45.

FIG. 46 is a front plan view of the building element gripper of FIG. 45 without a building element being retained.

Figure 47:
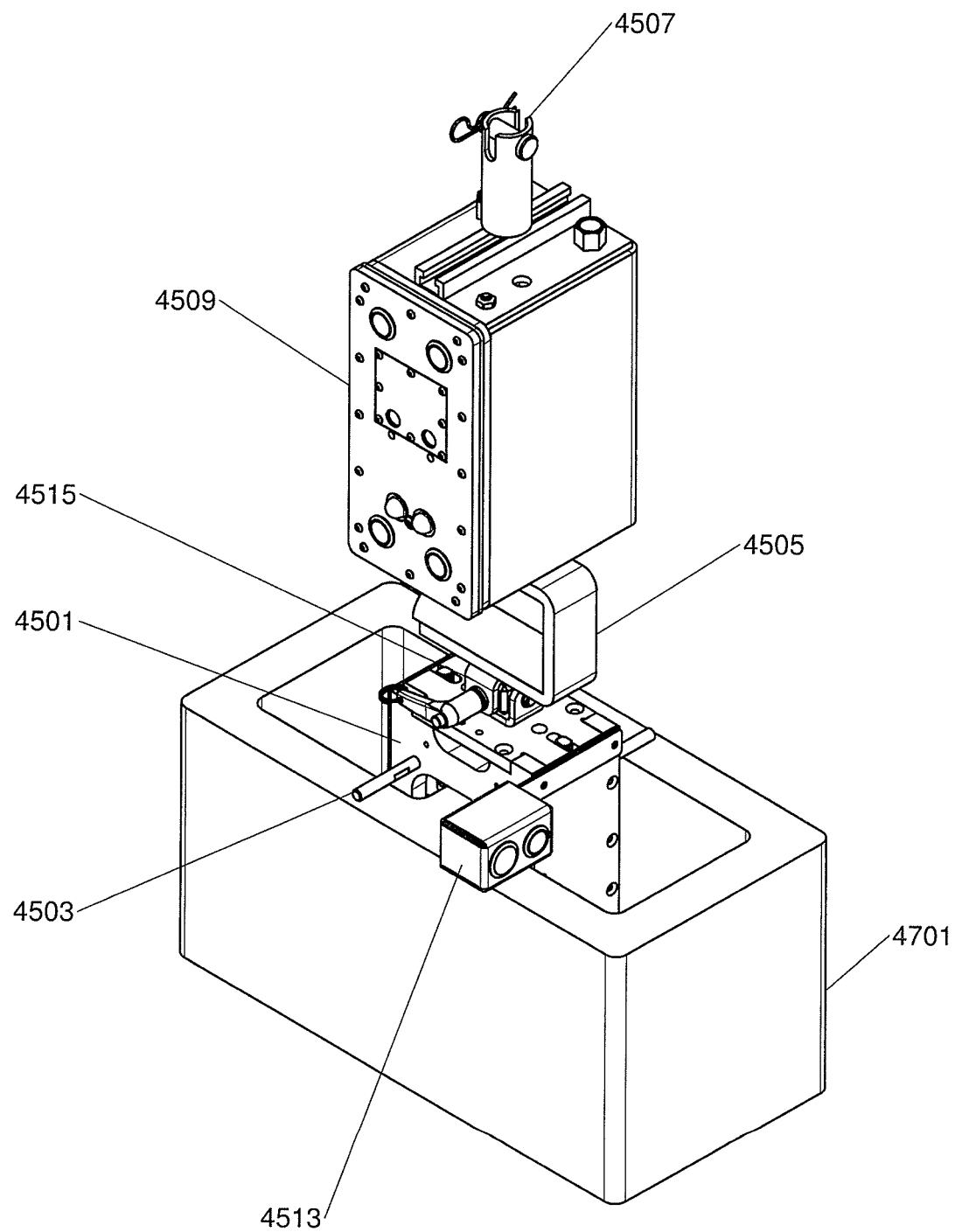
FIG. 47 is a perspective view of the building element gripper of FIG. 45 in use.

FIG. 47 is a perspective view of the building element gripper of FIG. 45 in use grasping a building element 4701.

A further embodiment of the building element lift enhancer is depicted in FIGS. 48-51.

Figure 48:
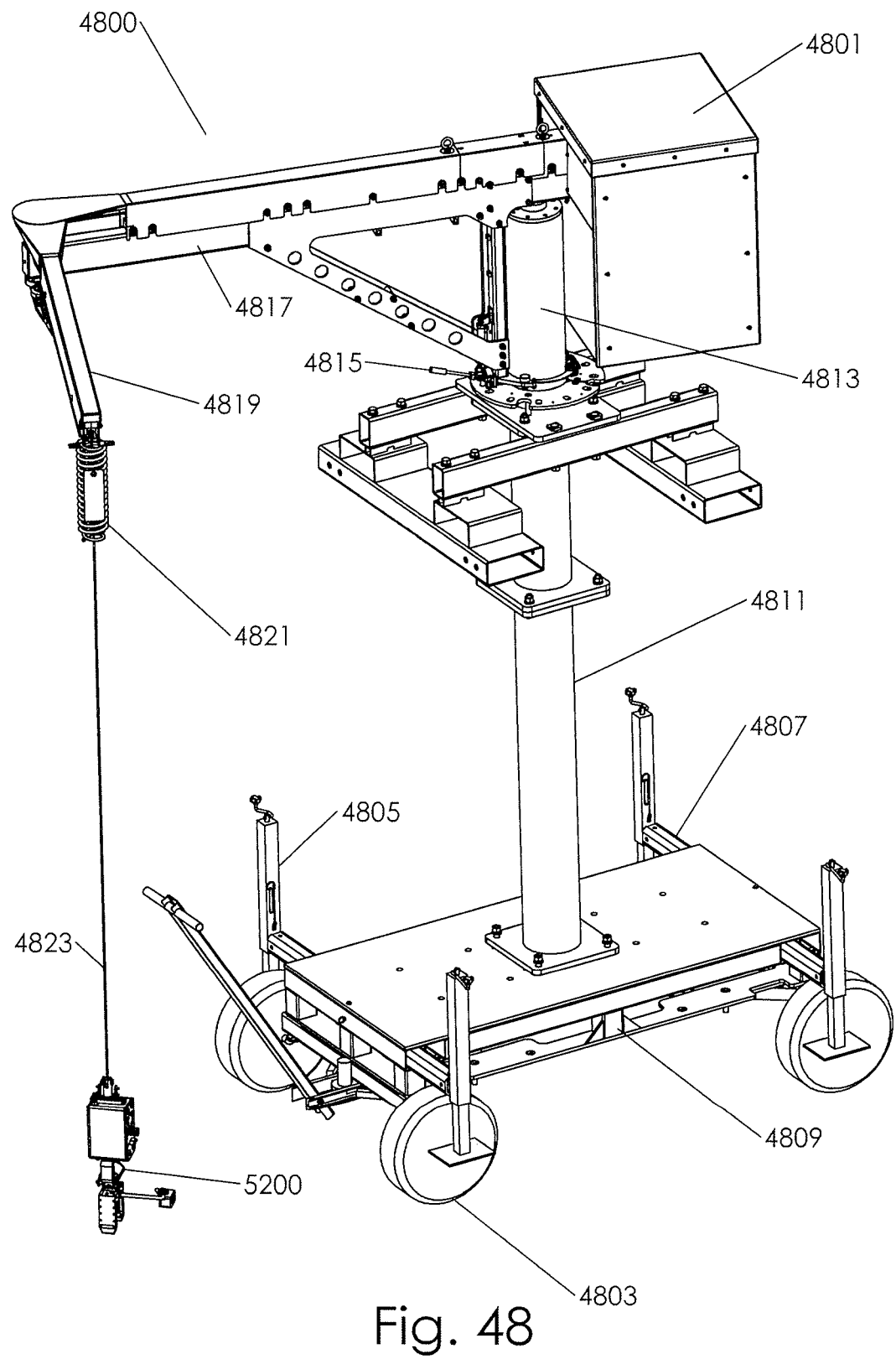
FIG. 48 is a perspective view of a further embodiment of a building element lift enhancer.

In FIG. 48, a perspective view of a building element lift enhancer can be seen with a building element gripper attached to a cable 4823. While the lift enhancer depicted is a cable based version, other embodiments may employ an arm based system, as further described herein. The building element lift enhancer 4800 has a platform or base such as a mobile platform, a scaffold arrangement, or the like. The mobile platform may include tires or wheels 4803 and a leveler jack or jacks 4805. Other platforms that include tracks, skids, or the like may also be employed. The platform can be seen with cross members 4807 as well as a support 4809. On either side of the support 4809 openings can be seen that are sufficient to accommodate forklift entry and retention. Level indicators may also be employed to ensure a proper and satisfactory installation. A modular upright section 4811 joins the mobile platform or base with a boom or arm arrangement. The upright section 4811 is modular or otherwise configurable to allow for the establishment of various heights to meet the needs of a variety of construction projects. Modular upright sections may be removably joined together with hardware elements such as bolts with flanges, or the like. The modular upright sections may be made as a cylindrical metal pipe column, for example. Further, in some embodiments, the upright section 4811 may be omitted or otherwise replaced. In some embodiments, for example, the platform or base is directly connected to the boom or similar horizontal element. In such a configuration, the boom upright section 4813 is rotationally coupled to an anti-rotation lock 4815 and then a base. The anti-rotation lock 4815 comprises a handle with a mechanism that engages with one of the holes that can be seen circumferentially placed around a metal disk. The mechanism is a pin, wedge, or similar mechanical stop that retains the selected circumferential hole and prevents the associated metal disk from rotating. Since the metal disk is attached to the rotational portion of the boom assembly, the boom assembly is prevented from rotating when the anti-rotation lock is engaged. This creates a safe work environment, preventing unwanted movement of the boom. The anti-rotation lock 4815 can be temporarily or permanently engaged. A longer handle, actuator, chain, rope or other mechanical element may also be incorporated to allow a user to elect to engage and disengage the anti-rotation lock from the ground, particularly in higher configurations. The anti-rotation lock 4815 may be spring loaded or activated to allow the mechanism that engages with a hole in the metal disk to be retained. This anti-rotation lock prevents the boom from rotating when the anti-rotation lock is engaged. The boom upright section 4813 can be seen which allows the boom or arm to swing or rotate with respect to the modular upright section 4811. The boom upright section 4813 and associated rotational elements may include moving plates, discs, bearings, or the like. A drive housing 4801 can also be seen which retains and protects a drive motor or motors, gears and drive components, compressor(s), pumps such as vacuum pumps, and related electronics. The drive housing may be weatherproof or weathertight to allow for operation and extended use in an outdoor environment. A weatherproof enclosure or cabinet, for example may be employed that has weatherproof seals, gaskets, shields, covers, or is otherwise configured to prevent the entry of water, dirt, or other contaminants. A first boom section 4817 can be seen with a cover to house and protect the cable 4823 and associated hardware. A second boom section 4819 can also be seen moveably attached to the first boom section 4817. The first boom section 4817 and the second boom section 4819 act together similar to the action of a double pendulum. In some embodiments of the present invention, additional boom sections may be added along with additional joints.

The cable 4823 may be a braided or stranded steel, stainless steel, fiber, or rope product that connects with a building element gripper. In some embodiments of the present invention, the cable may terminate elsewhere and loop or otherwise pass through the gripper or a component or attachment thereof. The building element gripper 5200 can be seen attached to the cable 4823 or similar attachment structure. Air lines and wires are connected to the building element gripper and traverse a coil arrangement 4821 through the boom sections and to electronics and pneumatic equipment contained within the drive housing 4801. In some embodiments of the present invention, the coil arrangement is replaced with a retractable and deployable reel arrangement or the like. Further embodiments may eliminate wires, hoses, or other such connecting structures.

The operator controls movement of the building element gripper and retention, movement and placement of building elements. A drive motor (contained within the drive housing 4801) moves the cable 4823 to create vertical displacement of the building element being moved, while the boom sections provide for horizontal displacement of the building element. Movement of the building element retained by the building element gripper is controlled by the operator through interaction with either the building element directly, a handle, or simply a handle or grasp for the operator to manipulate the movement of the building element.

Figure 49:
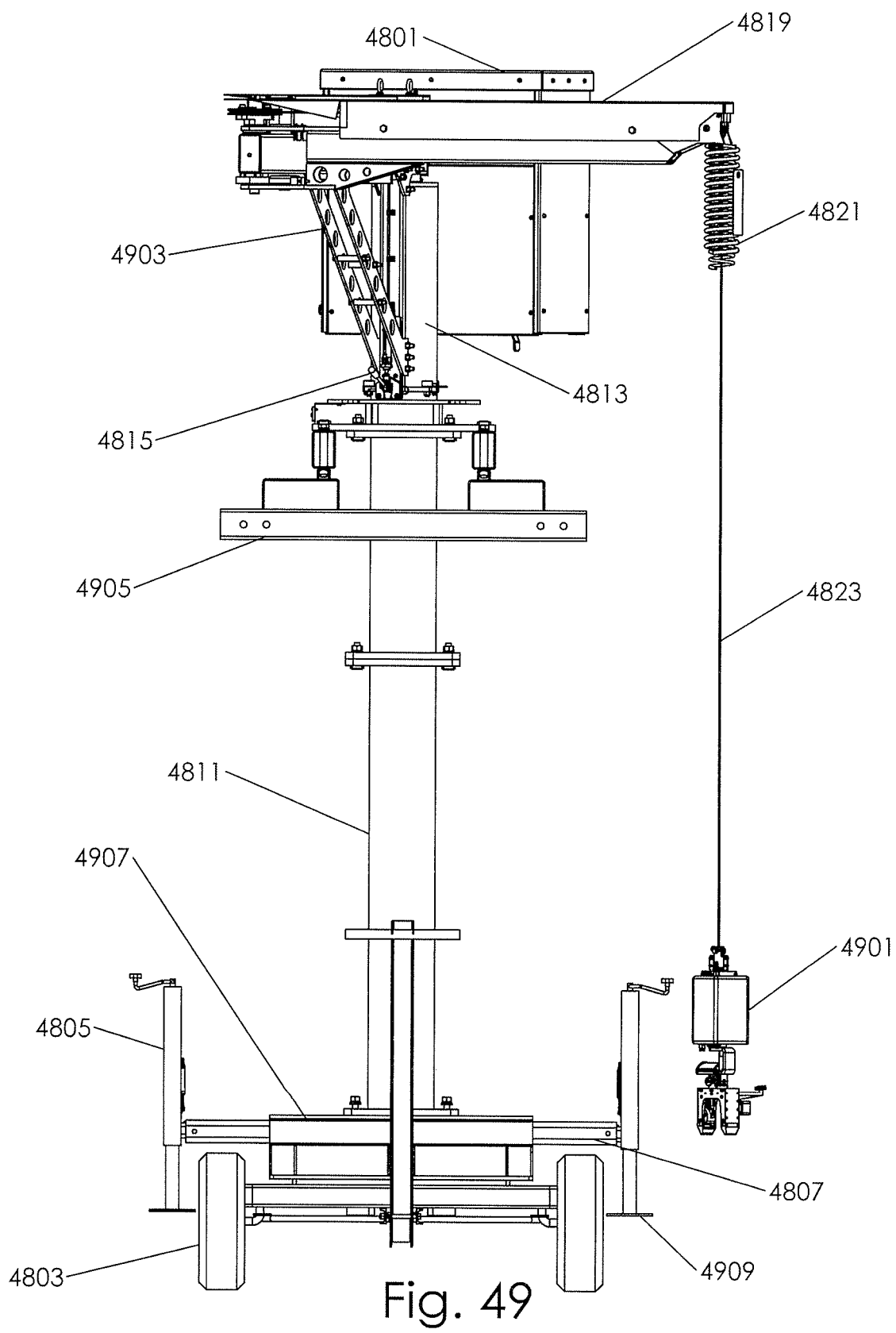
FIG. 49 is a rotated side view of the building element lift enhancer of FIG. 48.

FIG. 49 is a rotated side view of the building element lift enhancer of FIG. 48 showing the various components and their interconnectivity. A building element gripper 4901 can be seen suspended from a cable 4823. Supporting the boom is a brace 4903 that may be made from a metal or similar structurally robust material.

To further facilitate the modular aspect of the building element lift enhancer, a forklift base assembly 4905 can be seen attached to a modular section. This allows for ease of movement, assembly and placement of the upper boom section and allows ease of coupling with a modular upright section 4811 or sections. A weighted base 4907 can also be seen. Weight is required to prevent tipover or unstable operation. The weighted base may be a mass of metal or thick metal plate, or may include concrete or masonry counterweights, water filled ballast tanks or bags, or the like. Also seen in FIG. 49 is a leveler foot 4909 attached to the base of a leveler jack to prevent post-holing of the leveler jack upright in soft ground.

Figure 50:
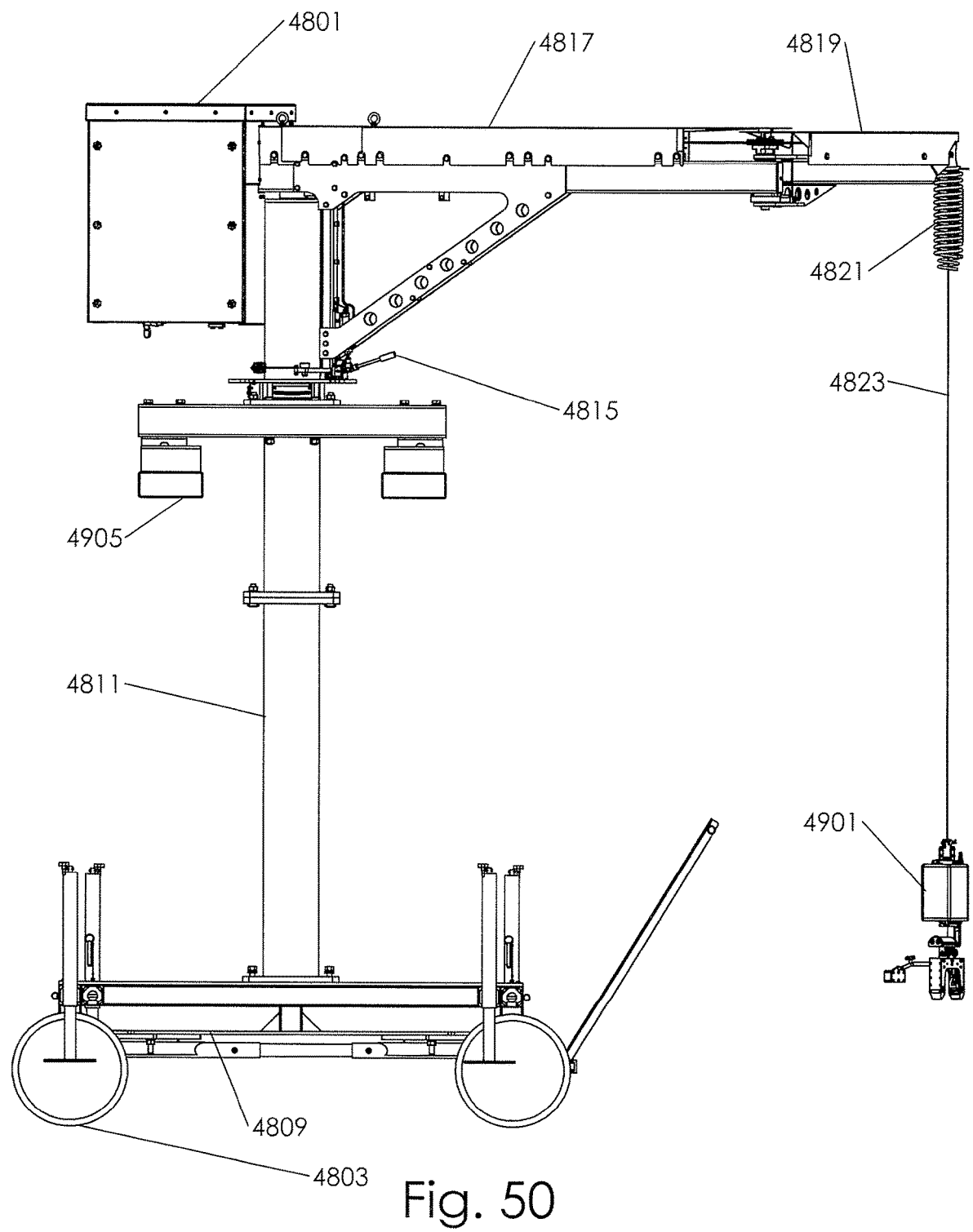
FIG. 50 is a side view of the building element lift enhancer of FIG. 48.

FIG. 50 is a side plan view of the building element lift enhancer of FIG. 48 that clearly shows the interconnection of the various components. It should be noted that while the modular upright section 4811 is affixed to the mobile platform at a center point, the modular upright section 4811 may also be affixed to the mobile platform at a side point, off-centered, or at an alternate side. In some embodiments of the present invention, the modular upright section 4811 may also be attached to the mobile platform at an angle or even horizontally to accommodate various applications such as work under a bridge or the like.

Figure 51:
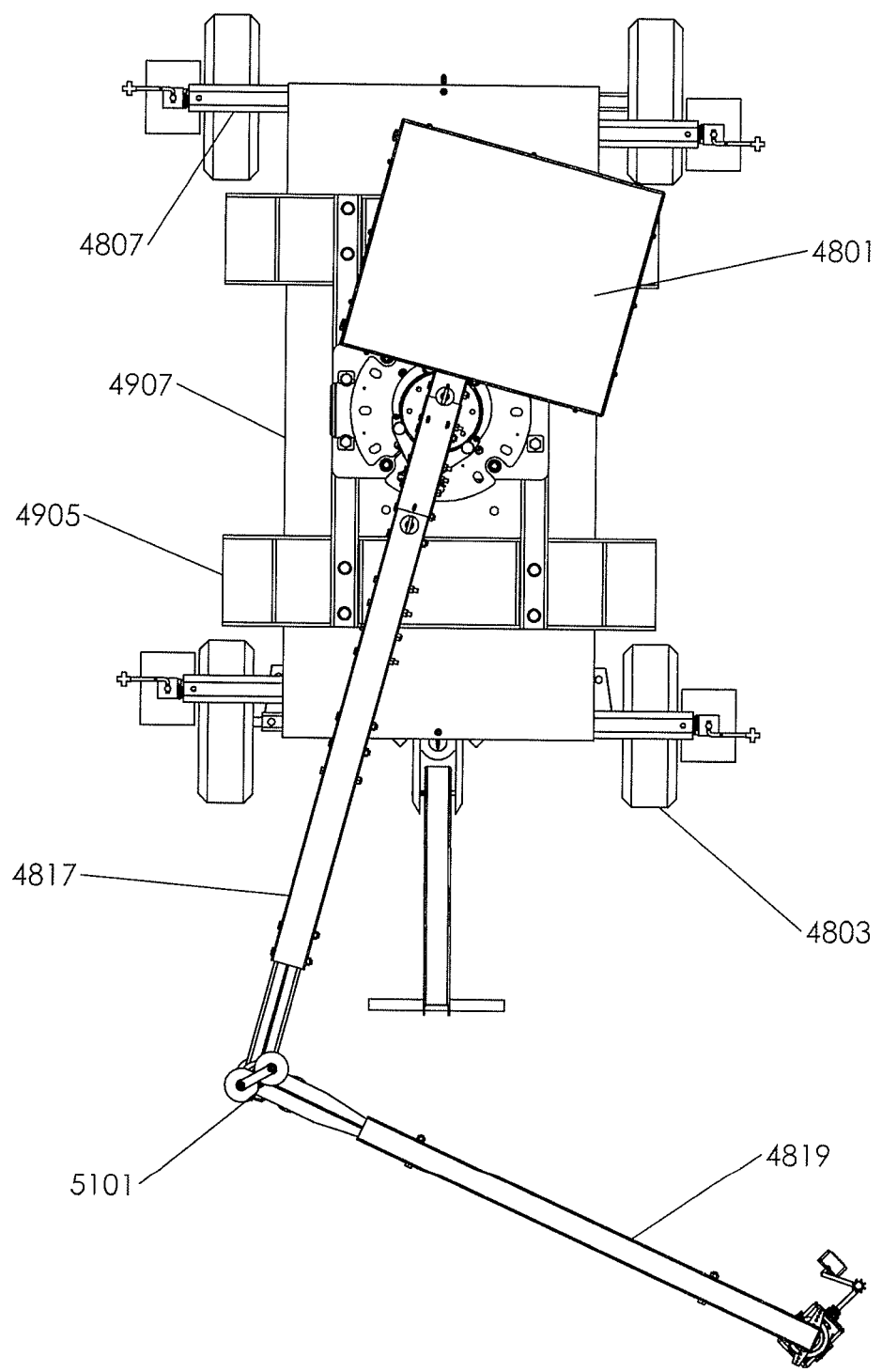
FIG. 51 is a top plan view of the building element lift enhancer of FIG. 48.

FIG. 51 is a top plan view of the building element lift enhancer of FIG. 48. The joint 5101 between the first boom section 4817 and the second boom section 4819 can be seen. The joint is configured as a pulley or hinge arrangement, as seen in FIG. 51.

FIGS. 52-61 depict a further embodiment of the building element gripper. The further embodiment depicted and described uses many of the same elements as the previous embodiments described and depicted herein. A control unit or backplate arrangement is connected to an attachment joint 5207 and an appendage such as the bifurcated appendage 5201 is coupled to the control unit or backplate to allow for interchangeability of the appendage through a quick change joint arrangement.

Figure 52:
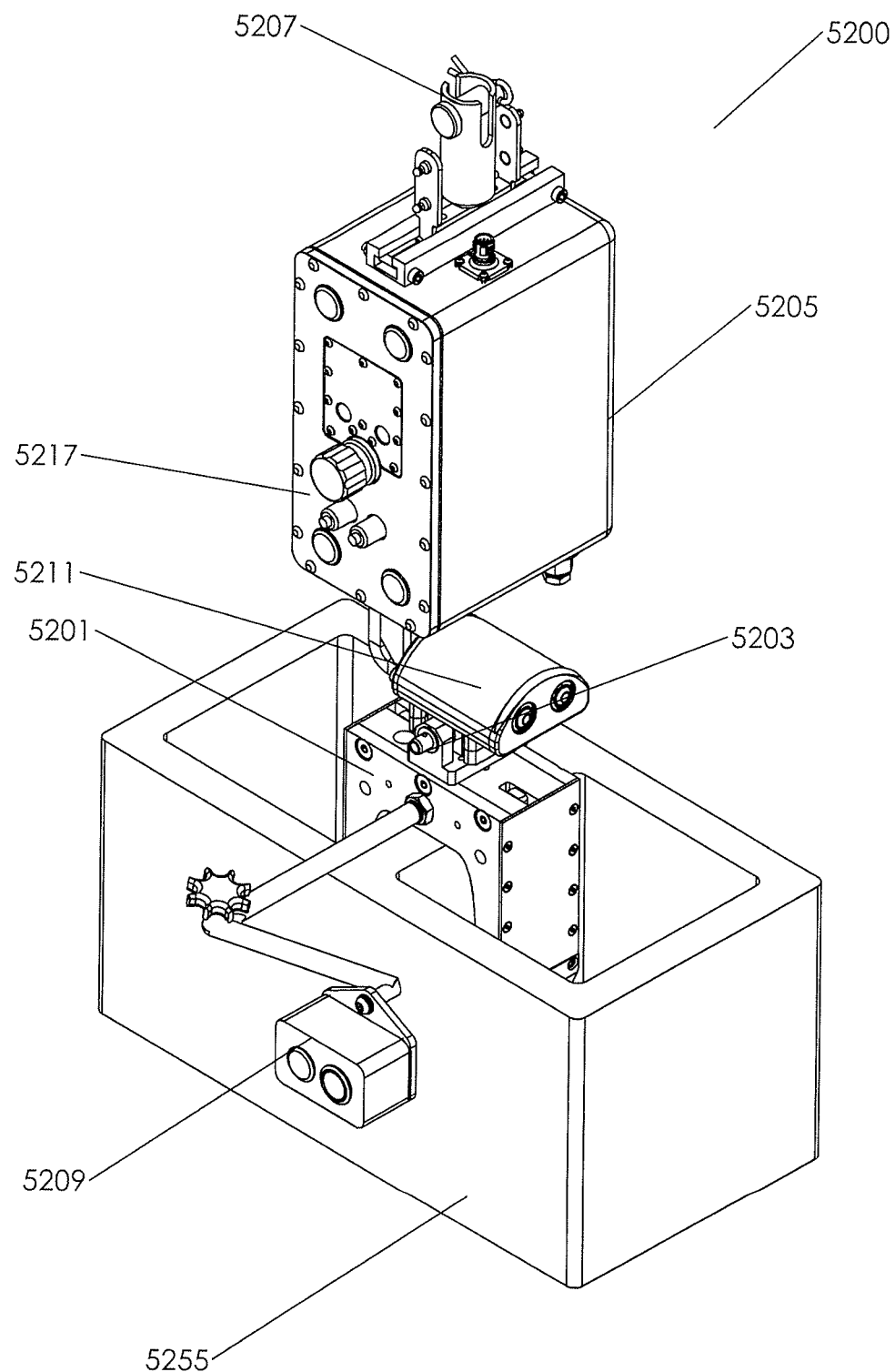
FIG. 52 is a is a perspective view of a building element gripper.

FIG. 52 is a perspective view of the building element gripper. The building element gripper 5200 that can be seen provides for grasping, retention, movement and release of a building element through either direct user interaction with the building element or interaction with the gripper itself. A bifurcated appendage 5201 can be seen straddling a building element 5255 and in turn providing a cam based platform to interact with a building element feature such as the center webbing of the block that is shown in FIG. 52. A control unit backplate 5205 can also be seen to provide attachment and structure to the overall building element gripper 5200 and to provide structure to a control unit housing and control unit 5217. To secure the building element gripper to a cable or arm in the overall system described and depicted herein, an attachment joint 5207 can be seen. The attachment joint may have a pin or similar device to facilitate removal and reattachment. The attachment joint 5207 also may have a changeable center of mass to facilitate proper balance and movement of the gripped building element 5255. Such an arrangement can be seen in FIG. 52 below the attachment joint 5207.

To provide for necessary movement of the building element gripper 5200, a universal joint or similar arrangement can be used. A control box 5217 can also be seen that contains the electronics to sense the application of force applied by a user on the building element and amplify the user applied force to move the building element 5255 by way of the motor or motors that are contained within the overall building element lift enhancer. In some embodiments of the present invention, the electronics may be distributed throughout the system or may be located in several locations. The sensing of force applied by a user to the building element 5255 and subsequent response of the system allows for direct interaction of the user with the building element 5255, negating the need for a control panel or other form of intermediary user interface. Essentially, the user moves the building element at will, with the overall system responding by reducing the weight of the building element such that there is little user effort required to lift, move and place the building element during a construction operation.

Force sensors that may also include electric motor current sensors as well as load cells, strain gauges, piezoelectric devices or similar devices sense force on the load cable. A force amplifier or other such arrangement converts user applied force received by the force sensor to mechanical force applied to the building element through the cable or other mechanical attachment. The force sensor may also provide essential data on the load to be lifted, allowing for safety overload protection in the event that a user attempts to lift a building element that exceeds the configuration limits of the building element lift enhancer or one of it's components.

A handle 5211 can be seen that facilitates user interaction with the building element gripper and associated building element. Control buttons or switches can also be seen with the handle 5211.

To facilitate changeability of the appendage, a quick change joint with a quick release pin 5203 can be seen. A control head 5209 can also be seen that includes buttons or switches that control functions such as SET and PLACE, these functions being further described herein.

Figure 53:
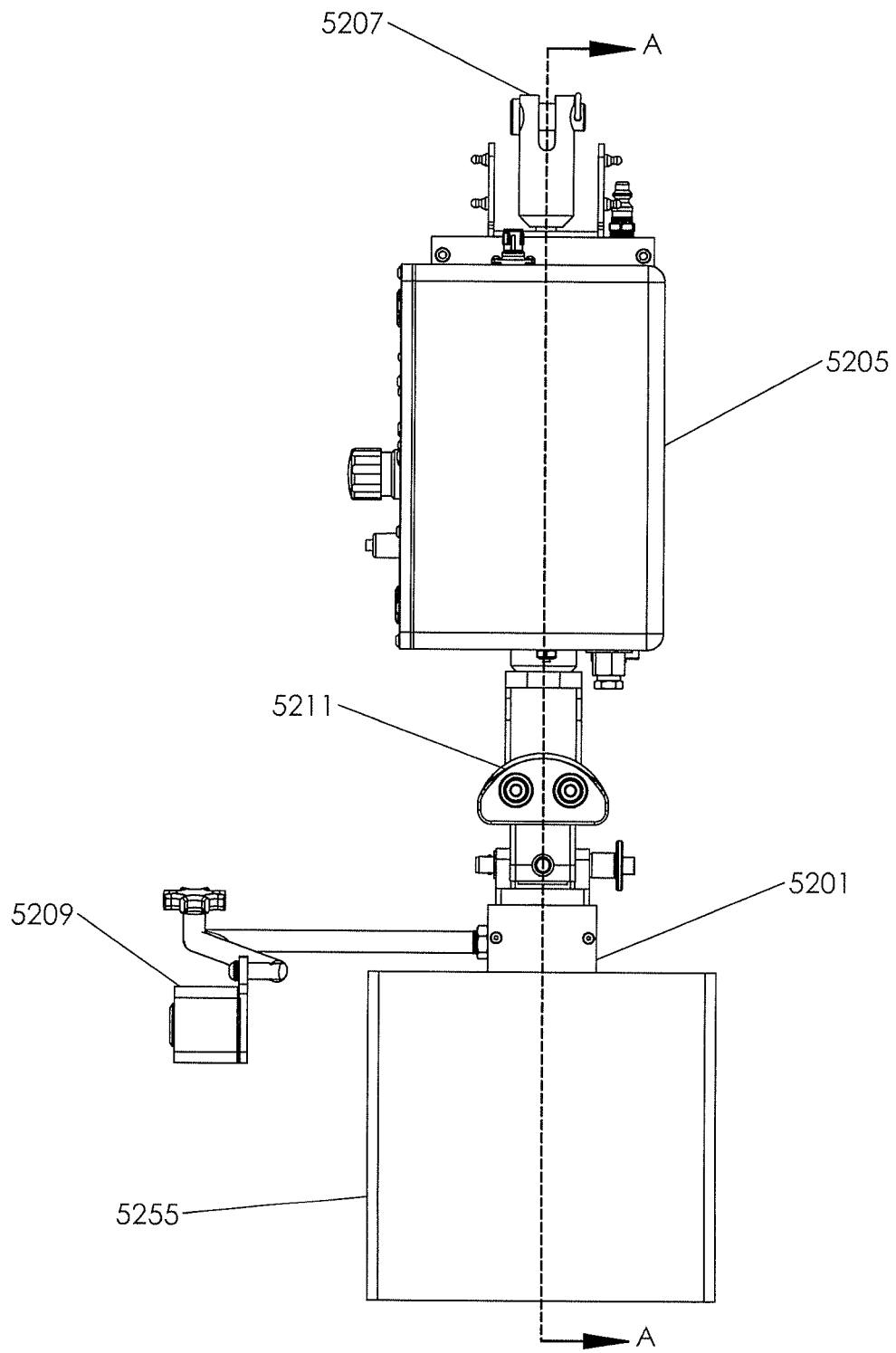
FIG. 53 is a is a side plan view of the building element gripper of FIG. 52.

FIG. 53 is a side plan view of the building element gripper of FIG. 52 that more clearly shows the constituent components of the building element gripper as well as a building element under retention by the building element gripper.

Figure 54:
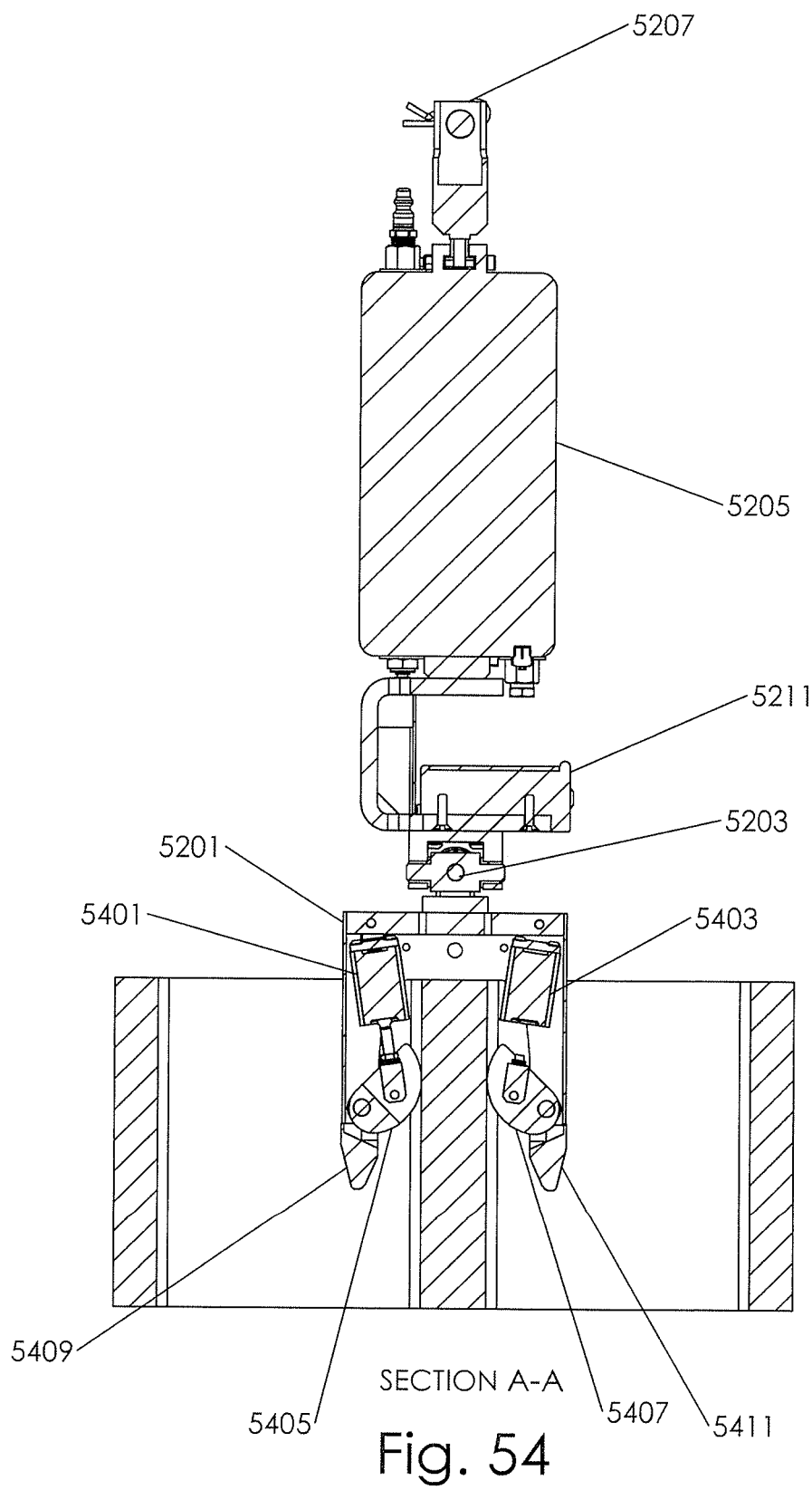
FIG. 54 is a is a cutaway view of the building element gripper taken along line A-A of FIG. 53 in an engaged position.

FIG. 54 is a cutaway view of the building element gripper taken along line A-A of FIG. 53 in an engaged position showing a building element under retention and the mechanism by which the building element is retained and subsequently released. In the embodiment depicted in FIG. 54, a first actuator 5401 and a second actuator 5403 can be seen, each mechanically coupled to a safety cam such as the first safety cam 5405 and the second safety cam 5407. The shape of the safety cams provides for secure retention of the building element 5255, and can further include a rough surface, ridges, cross hatching, coating, or other friction enhancing surface treatment. The safety cams are a safety mechanism to prevent unwanted release of a building element and associated property damage or bodily injury. The webbing or center wall of the building element 5255 is in this case secured by the cams with the actuators in an extended position. In some embodiments of the present invention, the actuators are pneumatic and are pressurized in both the extended and the retracted positions. With the shape of the safety cams as depicted in FIG. 54, a loss of air pressure or power to the actuators will not cause the building element to be released and fall. The safety cams further engage and direct force to the webbing or center wall through the weight of the building element acting on the cam structure, providing for a very important safety feature. Additionally, springs or friction enhancing failsafe elements may be incorporated into the actuator and safety cam arrangement to provide further assurance that the building element will continue to be retained in the event of a loss of air pressure. In some embodiments of the present invention, other forms of cam actuation may be employed, such as electromechanical actuation with solenoids or the like.

To ensure that the building element gripper 5200 properly straddles the webbing or center wall of the building element when grasping the building element, a first guide tip 5409 and a second guide tip 5411 can be seen at the end of each branch or fork of the bifurcated appendage 5201. The guide tips may be removable and replaceable and may be made from a material such as a metal, hard durometer plastic, or the like. The guide tips have angled faces to allow the bifurcated appendage 5201 to easily straddle or encompass the webbing center wall of the building element 5255. Optionally, deflectors or mechanical guards or plates may be installed or integrated with the building element gripper to prevent re-bars or other reinforcing material from hanging up or damaging the building element gripper 520 during operation. The shields or deflectors comprise a mechanical structure that prevents building components such as re-bars, wire, rods, or the like from damaging, fouling or hanging up the gripper. Re-bars are commonly used to provide structural integrity and reinforcement between building elements, and often protrude through the openings in a block or other such building element during construction, creating the potential for unwanted and problematic interference with the building element gripper 5200 during placement of a building element on a wall or similar structure under construction. The deflectors or guards may be made from a metal or plastic and may be fabricated as a plate or sheet with an angle to deflect or otherwise move the building element gripper when it encounters a re-bar or other reinforcing element, preventing hang up or damage to the building element gripper.

Figure 55:
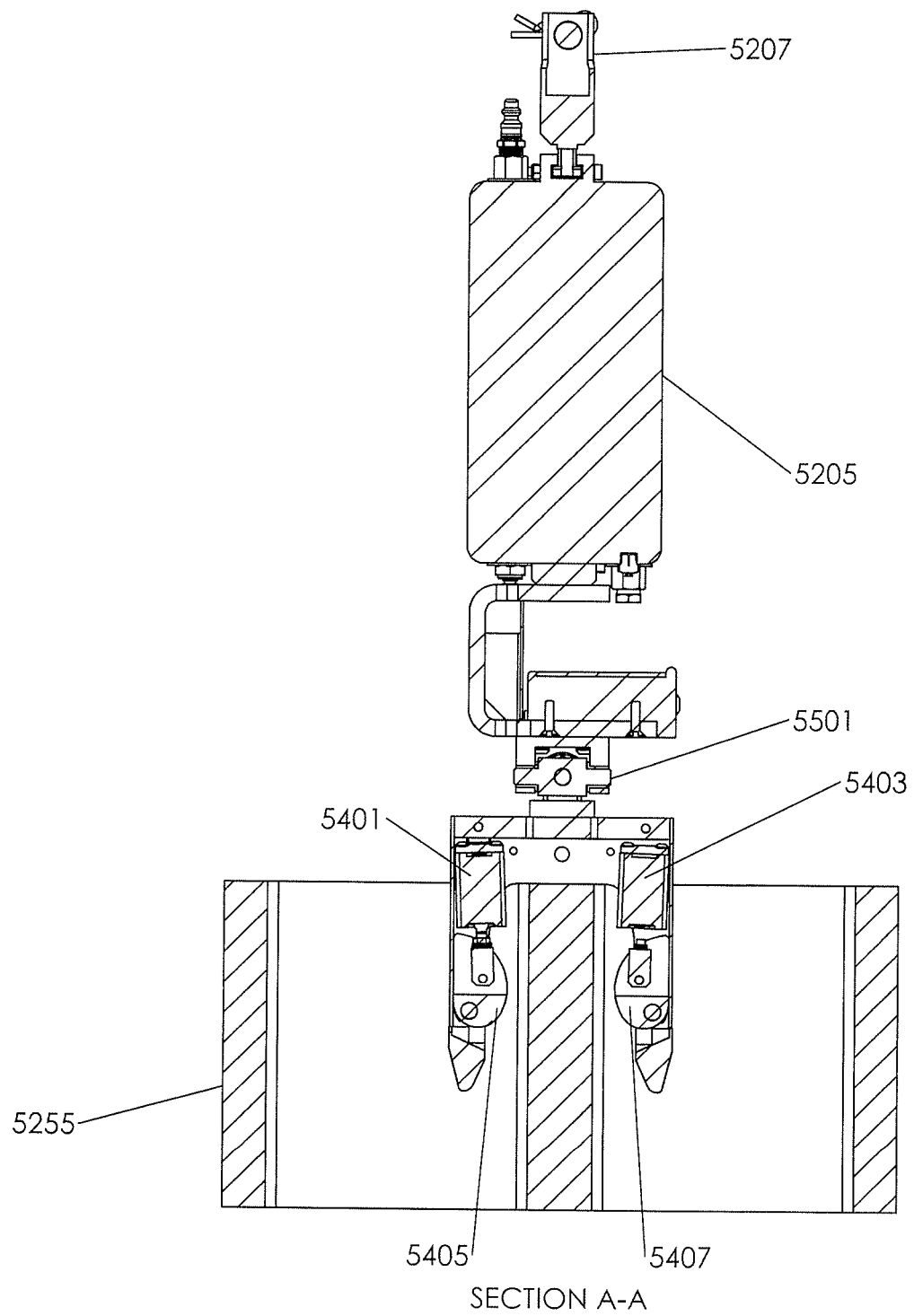
FIG. 55 is a cutaway view of the building element gripper taken along line A-A of FIG. 53 in a released position.

FIG. 55 is a cutaway view of the building element gripper taken along line A-A of FIG. 53 in a released position either ready to grasp a building element or after placement of the building element and release thereof. The quick change joint 5501 can be seen coupling the handle and control unit arrangement to the appendage. Quick release air lines and electrical connectors may also be employed to facilitate ease of appendage change out.

Figure 56:
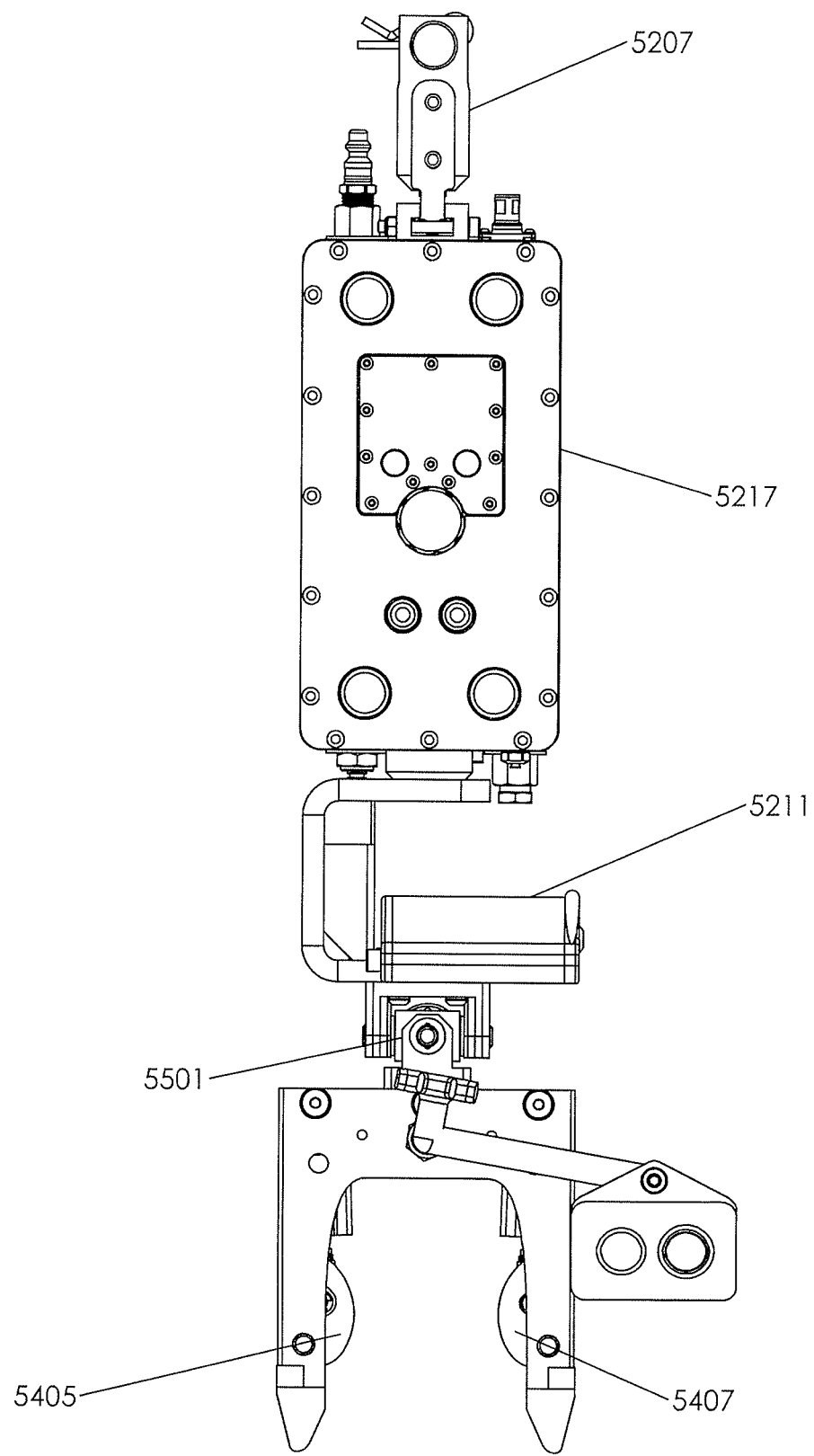
FIG. 56 is a side plan view of the building element gripper of FIG. 52 in the released position.

FIG. 56 is a side plan view of the building element gripper of FIG. 52 in the released position where the position of the safety cams in relation to the appendage can be clearly seen. The handle 5211 configured with a C-shaped member can also be seen. The handle 5211 may be used for user control, or the user may opt to hold the building element directly.

Figure 57:
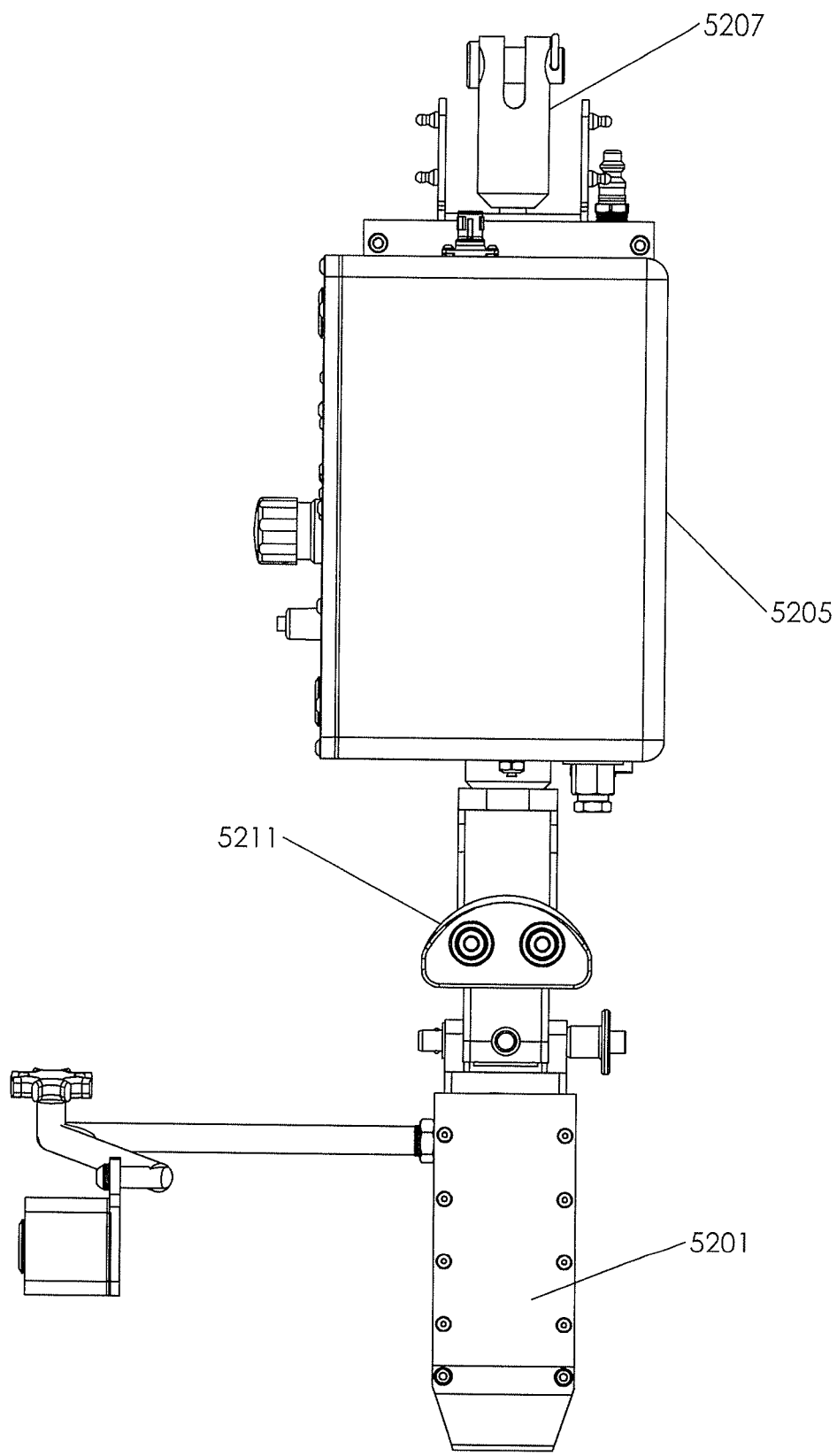
FIG. 57 is a rotated side plan view of the building element gripper of FIG. 52.

FIG. 57 is a rotated side plan view of the building element gripper of FIG. 52. Control buttons integrated or formed with the handle 5211 can be seen along with the appendage connected to the handle with a quick change joint and associated quick release pin.

Figure 58:
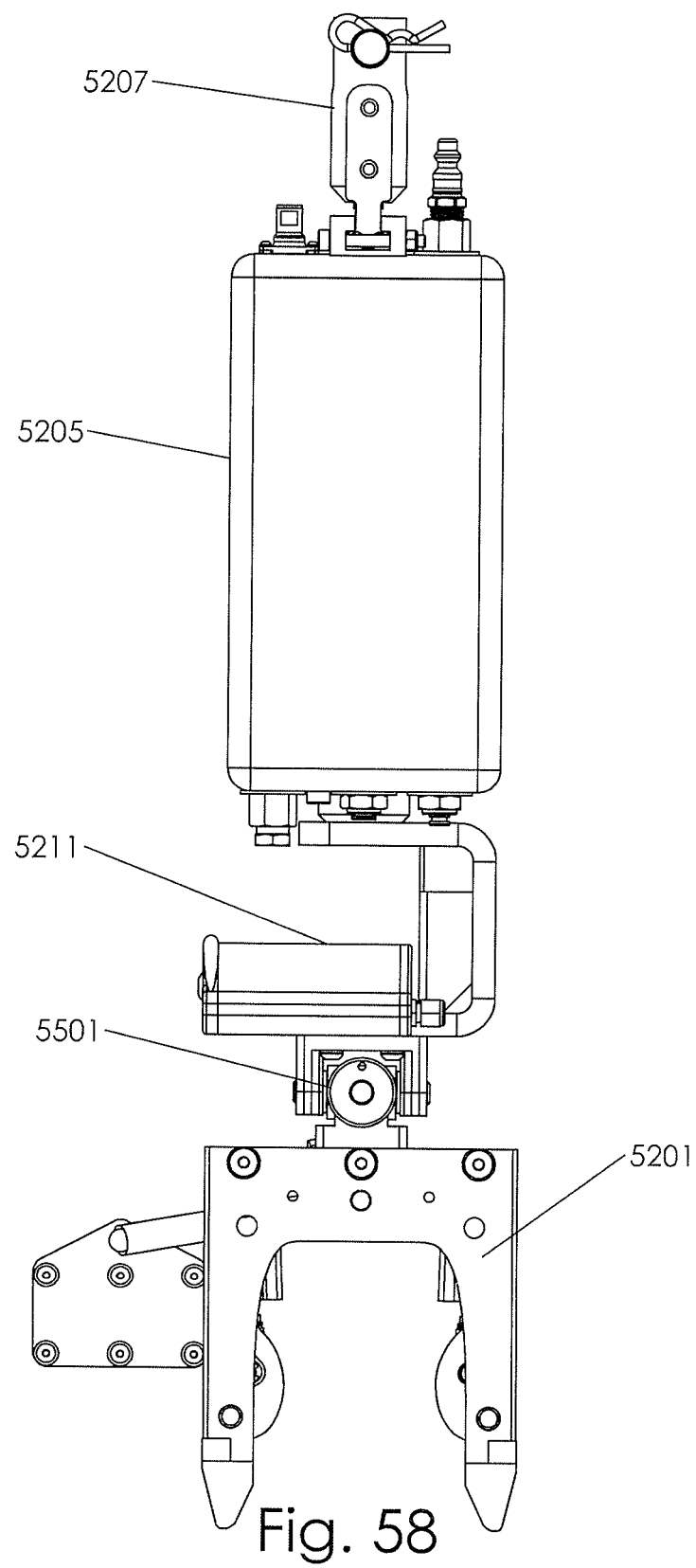
FIG. 58 is a further rotated side plan view of the building element gripper of FIG. 52.
Figure 59:
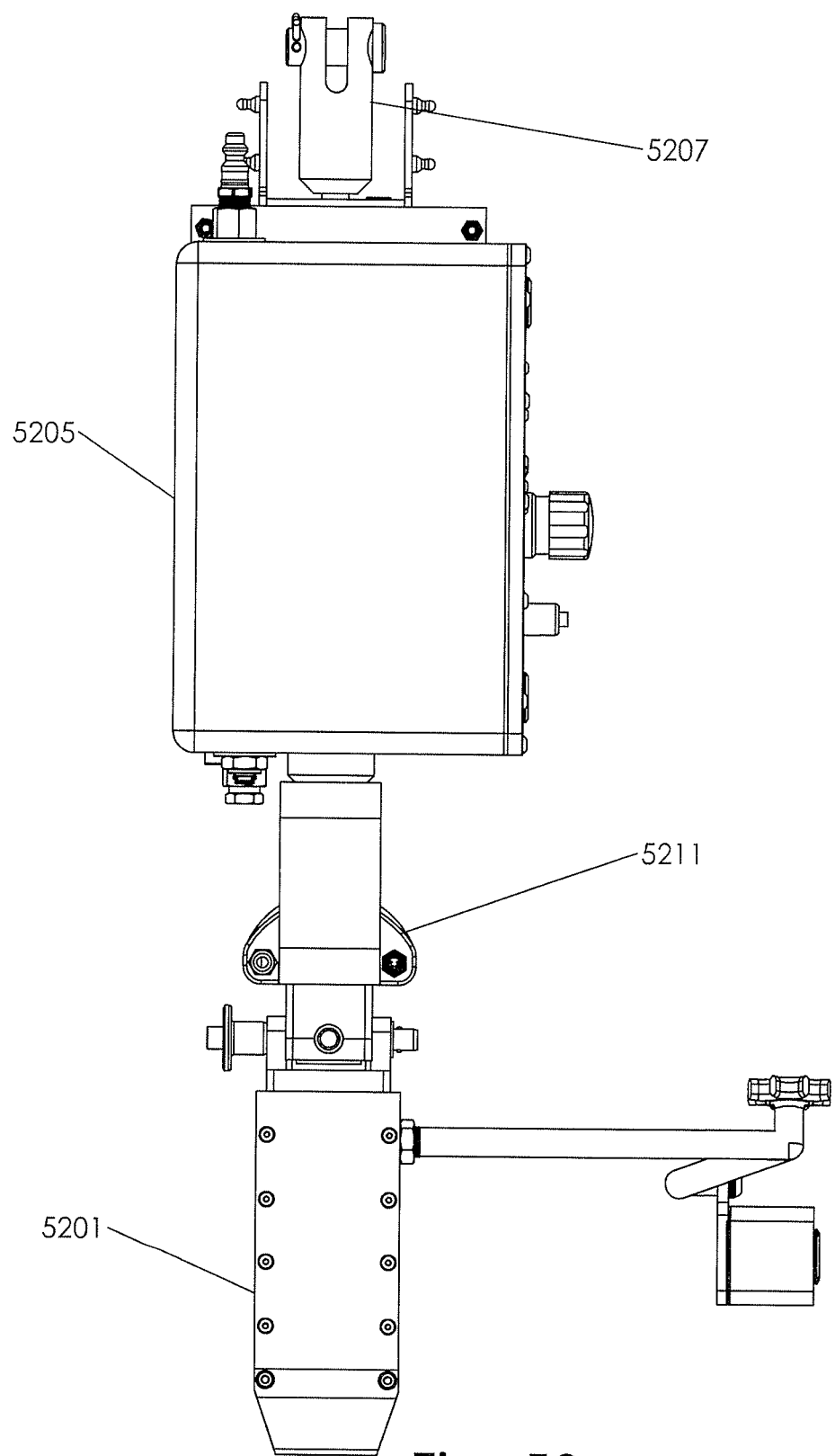
FIG. 59 is another rotated side plan view of the building element gripper of FIG. 52.

FIG. 58 is a further rotated side plan view of the building element gripper of FIG. 52. FIG. 59 is another rotated side plan view of the building element gripper of FIG. 52.

Figure 60:
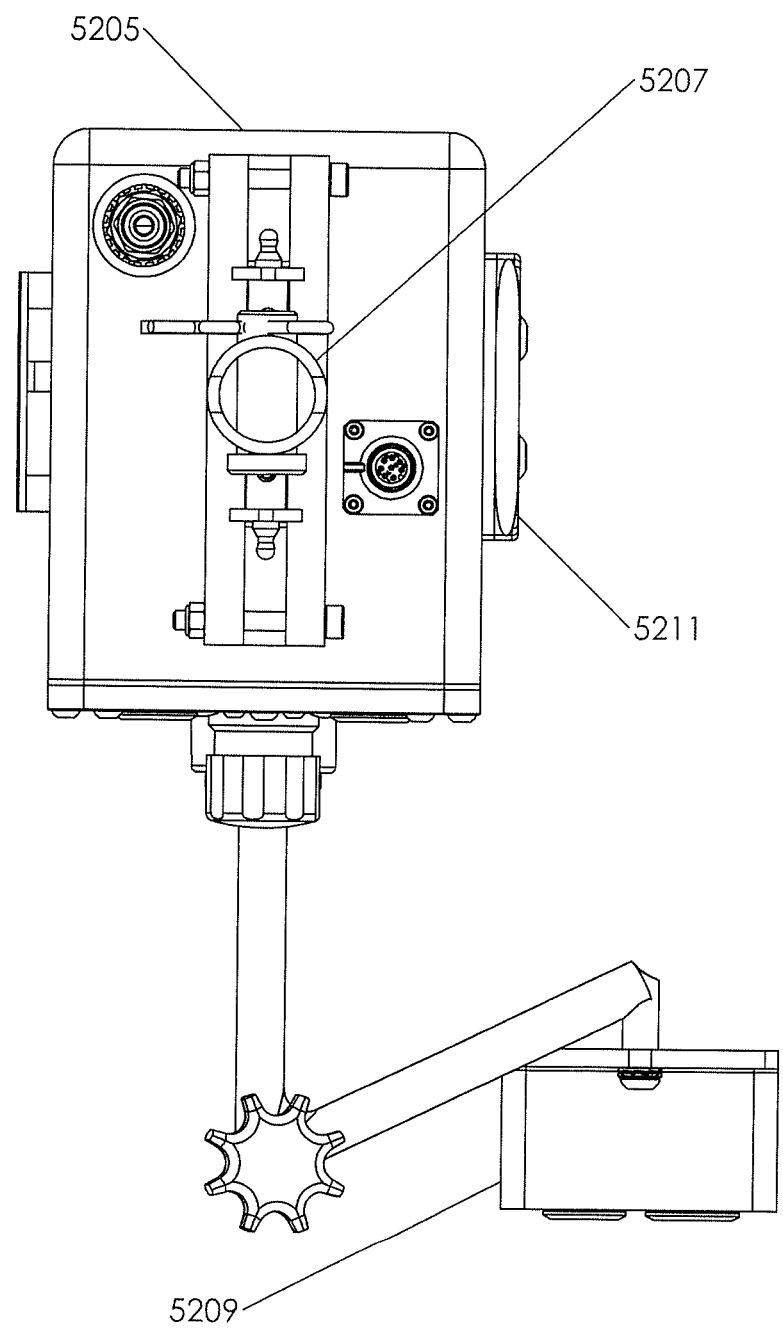
FIG. 60 is a top plan view of the building element gripper of FIG. 52.

FIG. 60 is a top plan view of the building element gripper of FIG. 52 showing the control head 5209. In some embodiments of the present invention, the control head may be remote from the building element gripper, connected wirelessly, or integral with the control unit, handle, or other component of the building element gripper.

Figure 61:
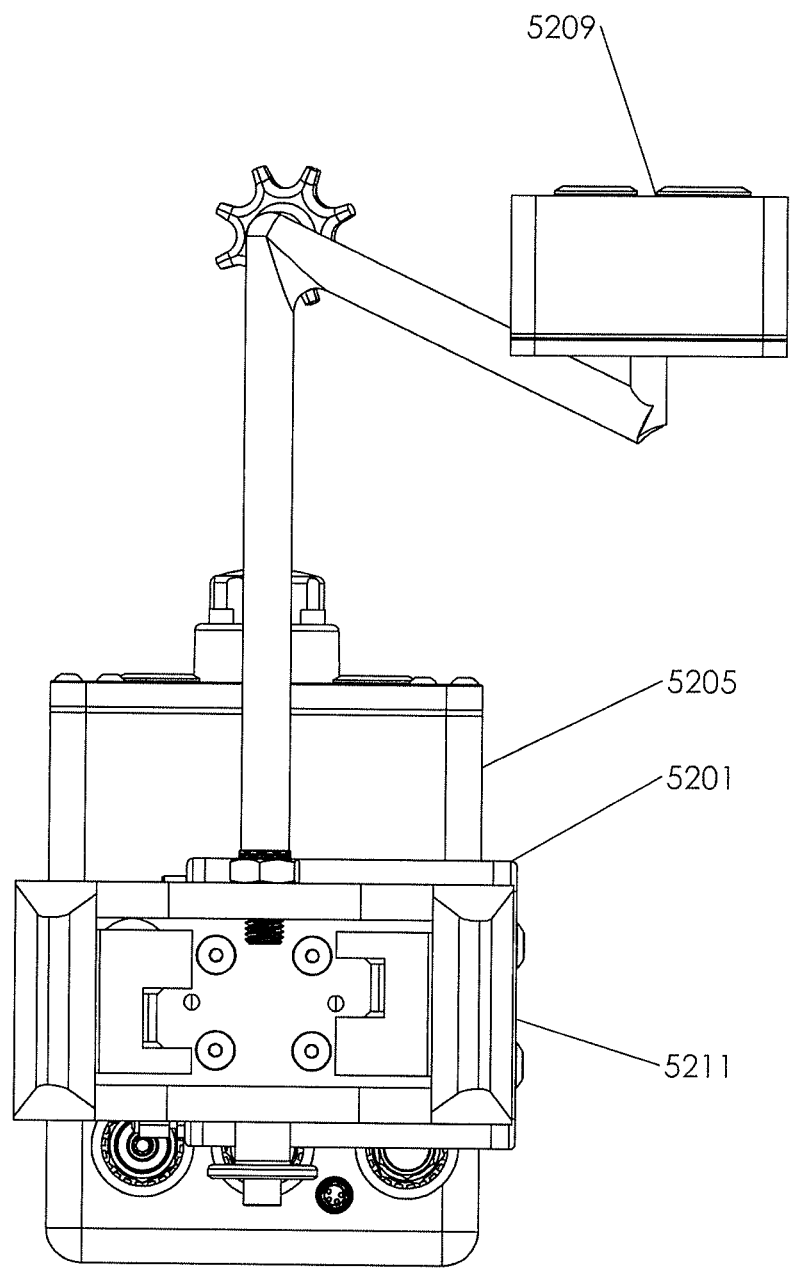
FIG. 61 is a bottom plan view of the building element gripper of FIG. 52.

Lastly, FIG. 61 is a bottom plan view of the building element gripper of FIG. 52. The underside of the appendage and associated grasping mechanisms can be clearly seen.

It is, therefore, apparent that there has been provided, in accordance with the various objects of the present invention, a Building Element Lift Enhancer.

While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification, claims and drawings appended herein.

What is claimed is:

1. A building element lift enhancer, comprising:
    a base having a modular upright section;
    a building element gripper;
    a weatherproof drive housing;
    a boom pivotally connected to the upright section of the base;
    wherein the boom comprises an anti-rotation lock;
    a cable driven by a motor where a distal end of the cable is connected to the building element gripper;
    a force sensor that detects force applied by a user;
    a force amplifier that converts user applied force received by the force sensor to mechanical force applied to the building element gripper to provide for movement of a building element by the building element gripper; and a microprocessor for controlling force applied to the cable by the drive motor in response to user controls and force sensor feedback;

wherein the microprocessor is configured to control the building element gripper by providing force balancing of a building element to suspend the building element so as to float at a point in space until such time as a user takes an action to operate the building element lift enhancer; and wherein the building element gripper has a failsafe actuator comprising a safety cam having an offset that engages with the building element to ensure that the building element will continue to be retained in position with a loss of power.

2. The building element lift enhancer in accordance with claim 1, wherein the building element gripper comprises a bifurcated appendage to retain a building element.

3. The building element lift enhancer in accordance with claim 1, wherein the building element gripper comprises a safety mechanism.

4. The building element lift enhancer in accordance with claim 1, wherein the boom comprises at least one joint.

5. The building element lift enhancer in accordance with claim 1, wherein the force sensor is operatively coupled to the cable.

6. The building element lift enhancer in accordance with claim 1, wherein the building element gripper further comprises a protective shield.

7. The building element lift enhancer in accordance with claim 1, wherein the force sensor is operatively coupled to the motor that drives the cable.

8. The building element lift enhancer in accordance with claim 1, wherein the microprocessor is configured to control the building element gripper by using force feedback to provide force balancing.

9. The building element lift enhancer in accordance with claim 1, wherein the microprocessor is configured to control the building element gripper by providing a pre-set weight to the building element gripper on user demand to assist with setting of a building element by the building element gripper.

10. The building element lift enhancer in accordance with claim 1, wherein the microprocessor is configured to control the building element gripper by providing a ramp down release of the building element on user demand to assist with placing of the building element by the building element gripper.

11. The building element lift enhancer in accordance with claim 1, wherein the microprocessor is configured to control the building element gripper by providing an auto retract of the building element gripper at a user triggered on-demand retract height once the building element has been placed.

* * * * *